US008848639B2

(12) United States Patent
Porat et al.

(10) Patent No.: US 8,848,639 B2
(45) Date of Patent: Sep. 30, 2014

(54) FREQUENCY SELECTIVE TRANSMISSION WITHIN SINGLE USER, MULTIPLE USER, MULTIPLE ACCESS, AND/OR MIMO WIRELESS COMMUNICATIONS

(75) Inventors: Ron Porat, San Diego, CA (US); Matthew James Fischer, Mountain View, CA (US); Vinko Erceg, Cardiff by the Sea, CA (US)

(73) Assignee: Broadcom Corporation, Irvine, CA (US)

( * ) Notice: Subject to any disclaimer, the term of this patent is extended or adjusted under 35 U.S.C. 154(b) by 144 days.

(21) Appl. No.: 13/448,307

(22) Filed: Apr. 16, 2012

(65) Prior Publication Data

US 2012/0263090 A1 Oct. 18, 2012

Related U.S. Application Data

(60) Provisional application No. 61/476,746, filed on Apr. 18, 2011, provisional application No. 61/478,707, filed on Apr. 25, 2011, provisional application No. 61/585,609, filed on Jan. 11, 2012.

(51) Int. Cl.
| | |
|---|---|
| *H04W 4/00* | (2009.01) |
| *H04H 20/71* | (2008.01) |
| *H04L 1/00* | (2006.01) |
| *H04L 1/06* | (2006.01) |
| *H04L 5/00* | (2006.01) |
| *H04W 72/08* | (2009.01) |
| *H04B 7/04* | (2006.01) |
| *H04W 88/08* | (2009.01) |

(52) U.S. Cl.
CPC ............ *H04L 5/0044* (2013.01); *H04L 5/0037* (2013.01); *H04W 72/085* (2013.01); *H04L 1/0003* (2013.01); *H04L 1/0041* (2013.01); *H04L 2001/0096* (2013.01); *H04L 1/0009* (2013.01); *H04L 5/0023* (2013.01); *H04B 7/0452* (2013.01); *H04L 1/06* (2013.01); *H04W 88/08* (2013.01); *H04L 5/0094* (2013.01); *H04B 7/0417* (2013.01); *H04L 5/003* (2013.01)
USPC .......................................... 370/329; 370/312

(58) Field of Classification Search
USPC .......................................................... 370/329
See application file for complete search history.

(56) References Cited

U.S. PATENT DOCUMENTS

| | | |
|---|---|---|
| 2003/0137955 A1 | 7/2003 | Kim et al. |
| 2005/0025039 A1 | 2/2005 | Hwang et al. |

(Continued)

FOREIGN PATENT DOCUMENTS

WO 02/49306 A2 6/2002

OTHER PUBLICATIONS

Heejung Yu (ETRI): Coverage extension for IEEE 802.11ah; IEEE P802.11—Task Group AH—Meeting Update; Jan. 13, 2011; pp. 1-10.
Aust, et al.; IEEE 802.11ah: Advantages in standards and further challenges for sub 1 GHz Wi-Fi; 2012 IEEE International Conference on Communications (ICC); Jun. 10, 2012; pp. 6885-6889.

(Continued)

*Primary Examiner* — Shaq Taha
(74) *Attorney, Agent, or Firm* — Garlick & Markison; Shayne X. Short

(57) ABSTRACT

Frequency selective transmission within single user, multiple user, multiple access, and/or MIMO wireless communications. Adaptation among different respective sub-channels and/or channels is effectuated within a wireless communication system. Such a wireless communication system may include an access point (AP) and one or more wireless stations (STAs). The respective channelization employed for various communications between the devices within such a wireless communication system may be adapted based upon any of a number of considerations. For example, a receiver communication device may indicate to a transmitter communication device one or more preferred sub-channels and/or channels on which subsequent communications are to be performed. Alternatively, a transmitter communication device may employ such information provided from one or more receiver communication devices as one of multiple respective considerations regarding which one or more sub-channels and/or channels on which subsequent communications are to be performed.

20 Claims, 30 Drawing Sheets

(56) References Cited

U.S. PATENT DOCUMENTS

| | | | |
|---|---|---|---|
| 2008/0043610 A1* | 2/2008 | Li et al. | 370/203 |
| 2010/0098005 A1* | 4/2010 | Lee et al. | 370/329 |
| 2010/0215114 A1 | 8/2010 | Kim et al. | |
| 2011/0299508 A1* | 12/2011 | Suzuki | 370/336 |
| 2012/0014244 A1* | 1/2012 | Kishigami et al. | 370/209 |

OTHER PUBLICATIONS

European Patent Office; European Search Report; EP Application No. 12002704.0; Apr. 12, 2013; 3 pgs.

* cited by examiner

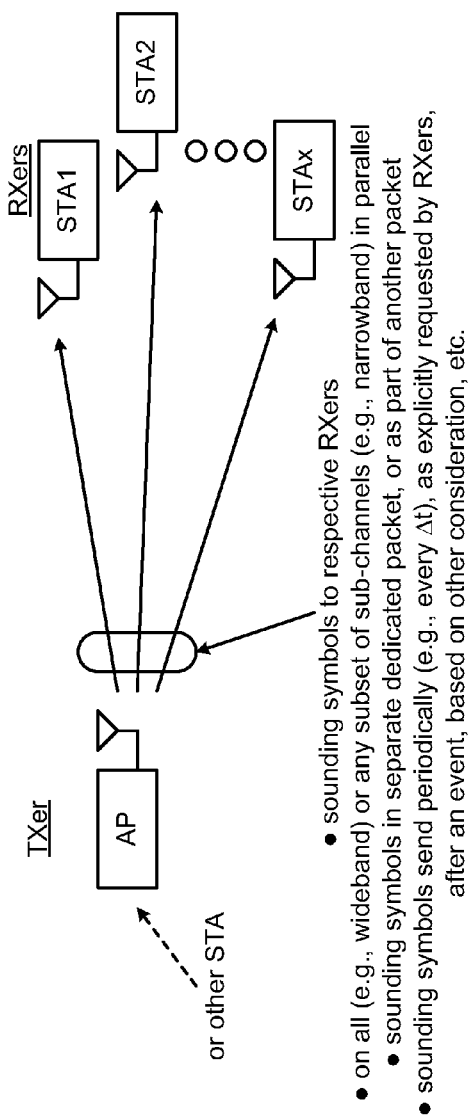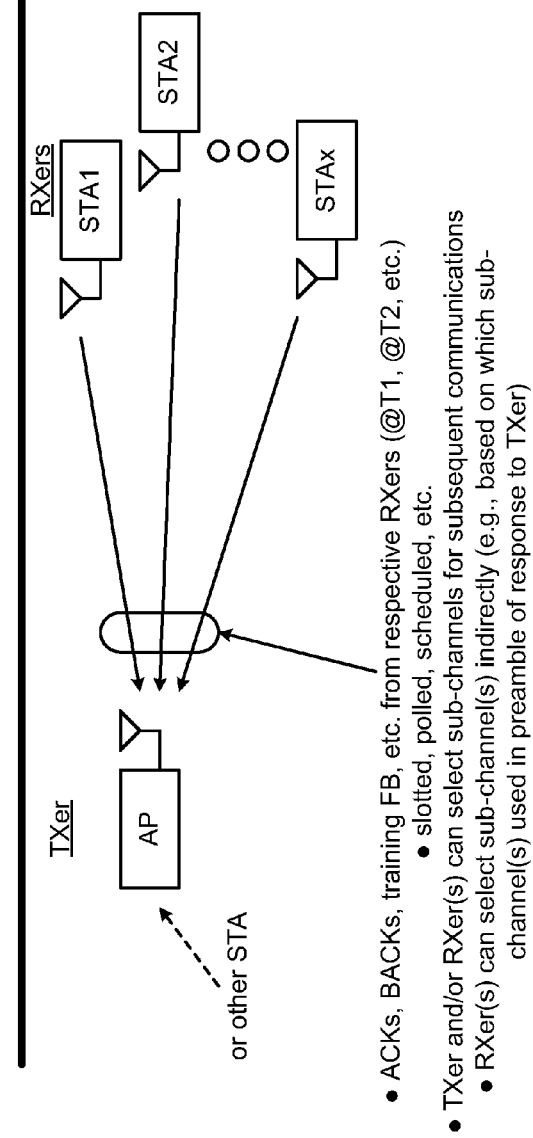
FIG. 23

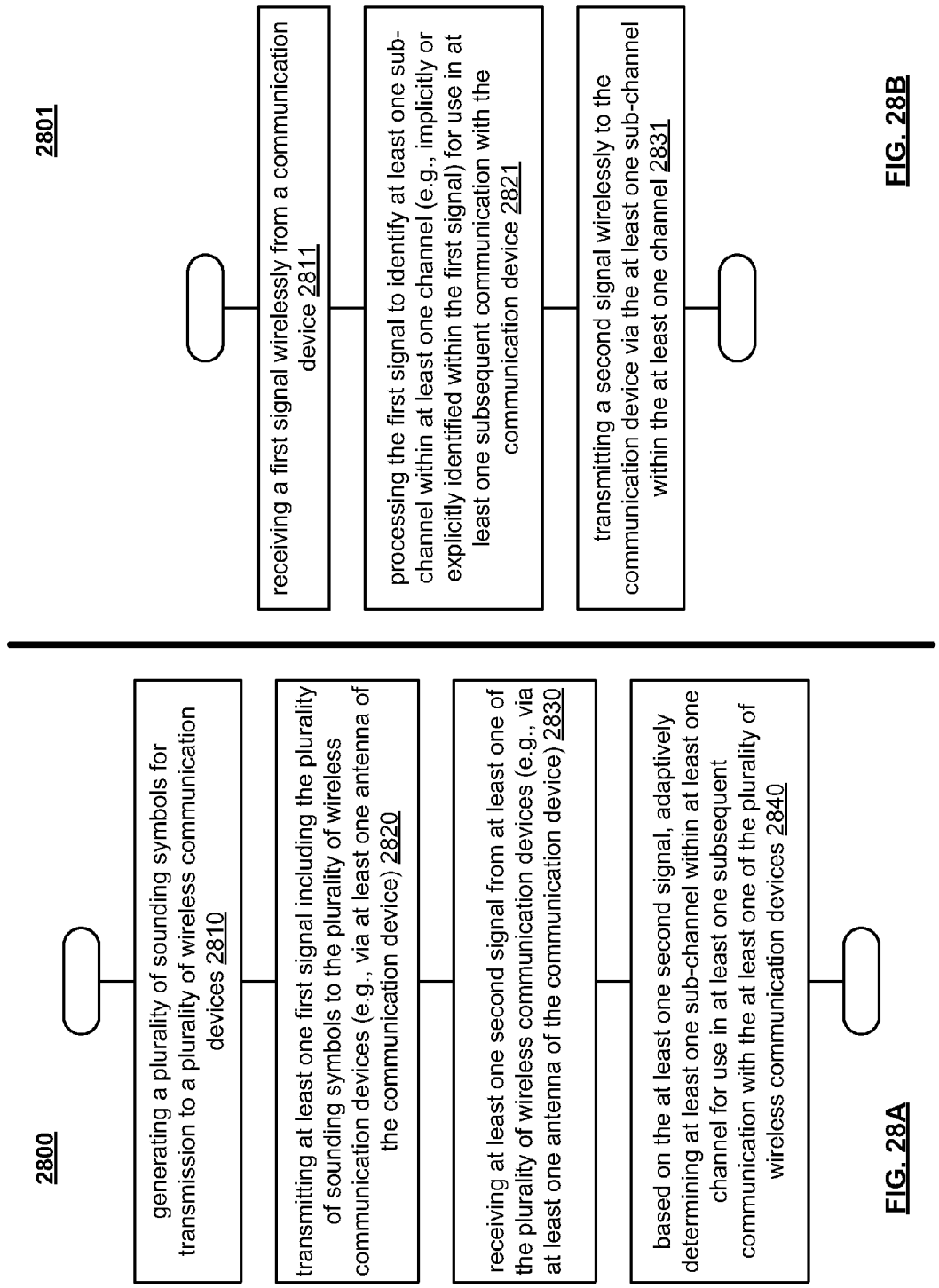

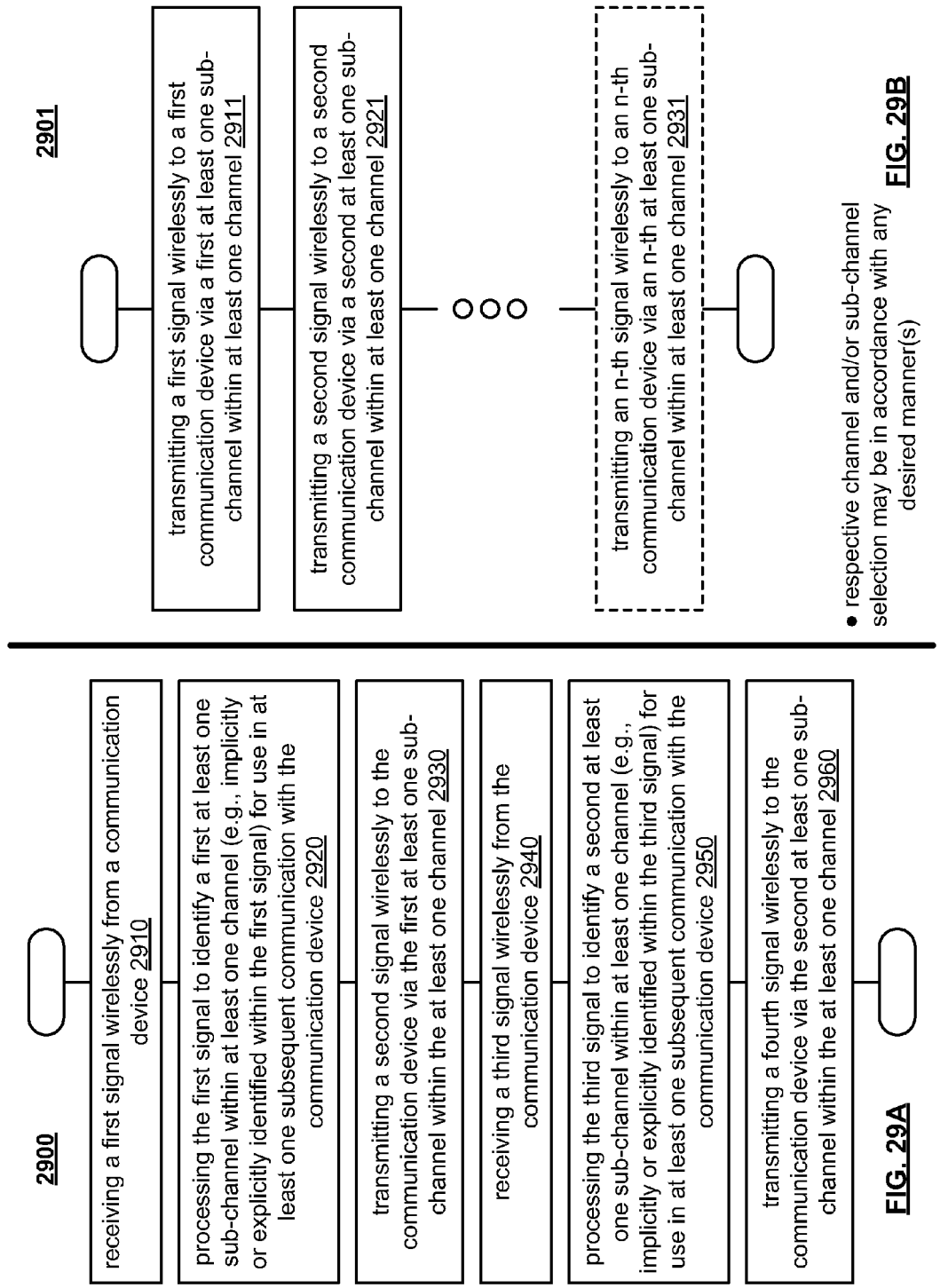

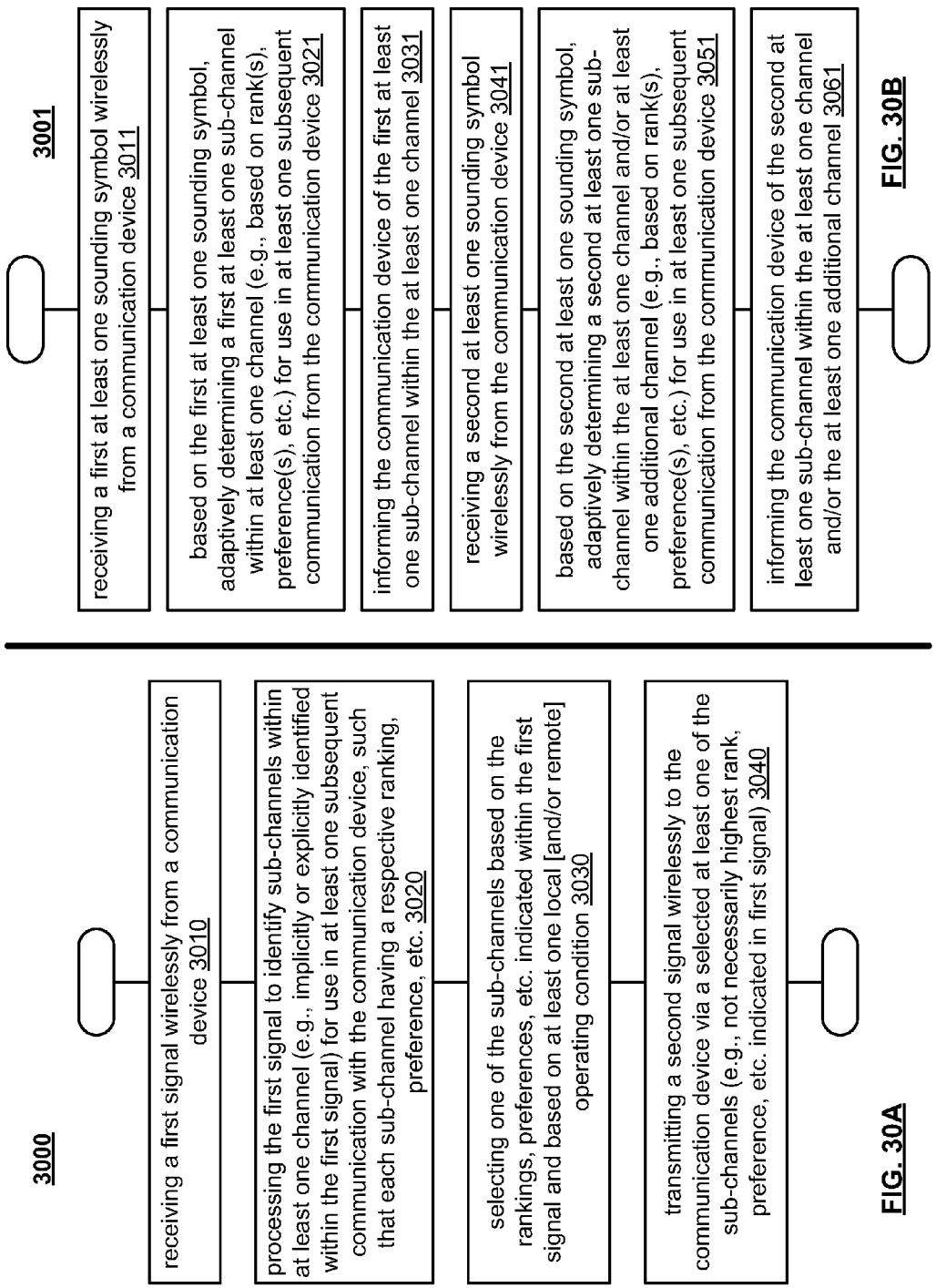

FREQUENCY SELECTIVE TRANSMISSION WITHIN SINGLE USER, MULTIPLE USER, MULTIPLE ACCESS, AND/OR MIMO WIRELESS COMMUNICATIONS

CROSS REFERENCE TO RELATED PATENTS/PATENT APPLICATIONS

Provisional Priority Claims

The present U.S. Utility Patent Application claims priority pursuant to 35 U.S.C. §119(e) to the following U.S. Provisional Patent Applications which are hereby incorporated herein by reference in their entirety and made part of the present U.S. Utility Patent Application for all purposes:

1. U.S. Provisional Patent Application Ser. No. 61/476,746, entitled "Range extension within multiple user, multiple access, and/or MIMO wireless communications,", filed Apr. 18, 2011.

2. U.S. Provisional Patent Application Ser. No. 61/478,707, entitled "Frequency selective transmission within multiple user, multiple access, and/or MIMO wireless communications,", filed Apr. 25, 2011.

3. U.S. Provisional Patent Application Ser. No. 61/585,609, entitled "Media access control (MAC) for single user, multiple user, multiple access, and/or MIMO wireless communications,", filed Jan. 11, 2012.

INCORPORATION BY REFERENCE

The following U.S. Utility Patent Application is hereby incorporated herein by reference in its entirety and made part of the present U.S. Utility Patent Application for all purposes:

1. U.S. Utility patent application Ser. No. 13/448,301, entitled "Range extension within multiple user, multiple access, and/or MIMO wireless communications,", filed concurrently on Apr. 16, 2012, pending.

INCORPORATION BY REFERENCE

The following IEEE standards/draft IEEE standards are hereby incorporated herein by reference in their entirety and are made part of the present U.S. Utility Patent Application for all purposes:

1. IEEE Std 802.11™-2012, "IEEE Standard for Information technology—Telecommunications and information exchange between systems—Local and metropolitan area networks—Specific requirements; Part 11: Wireless LAN Medium Access Control (MAC) and Physical Layer (PHY) Specifications," IEEE Computer Society, Sponsored by the LAN/MAN Standards Committee, IEEE Std 802.11™-2012, (Revision of IEEE Std 802.11-2007), 2793 total pages (incl. pp. i-xcvi, 1-2695).

2. IEEE Std 802.11n™-2009, "IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 5: Enhancements for Higher Throughput," IEEE Computer Society, IEEE Std 802.11n™-2009, (Amendment to IEEE Std 802.11™-2007 as amended by IEEE Std 802.11k™-2008, IEEE Std 802.11r™-2008, IEEE Std 802.11y™-2008, and IEEE Std 802.11r™-2009), 536 total pages (incl. pp. i-xxxii, 1-502).

3. IEEE Draft P802.11-REVmb™/D12, November 2011 (Revision of IEEE Std 802.11™-2007 as amended by IEEE Std 802.11k™-2008, IEEE Std 802.11r™-2008, IEEE Std 802.11y™-2008, IEEE Std 802.11w™-2009, IEEE Std 802.11n™-2009, IEEE Std 802.11p™-2010, IEEE Std 802.11z™-2010, IEEE Std 802.11v™-2011, IEEE Std 802.11u™-2011, and IEEE Std 802.11s™-2011), "IEEE Standard for Information technology—Telecommunications and information exchange between systems—Local and metropolitan area networks—Specific requirements; Part 11: Wireless LAN Medium Access Control (MAC) and Physical Layer (PHY) Specifications," Prepared by the 802.11 Working Group of the LAN/MAN Standards Committee of the IEEE Computer Society, 2910 total pages (incl. pp. i-cxxviii, 1-2782).

4. IEEE P802.11ac™/D2.1, March 2012, "Draft STANDARD for Information Technology—Telecommunications and information exchange between systems—Local and metropolitan area networks—Specific requirements, Part 11: Wireless LAN Medium Access Control (MAC) and Physical Layer (PHY) specifications, Amendment 4: Enhancements for Very High Throughput for Operation in Bands below 6 GHz," Prepared by the 802.11 Working Group of the 802 Committee, 363 total pages (incl. pp. i-xxv, 1-338).

5. IEEE P802.11ad™/D6.0, March 2012, (Draft Amendment based on IEEE P802.11REVmb D12.0), (Amendment to IEEE P802.11REVmb D12.0 as amended by IEEE 802.11ae D8.0 and IEEE 802.11aa D9.0), "IEEE P802.11ad™/D6.0 Draft Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 3: Enhancements for Very High Throughput in the 60 GHz Band," Sponsor: IEEE 802.11 Committee of the IEEE Computer Society, IEEE-SA Standards Board, 664 total pages.

6. IEEE Std 802.11ae™-2012, "IEEE Standard for Information technology—Telecommunications and information exchange between systems—Local and metropolitan area networks—Specific requirements; Part 11: Wireless LAN Medium Access Control (MAC) and Physical Layer (PHY) Specifications," "Amendment 1: Prioritization of Management Frames," IEEE Computer Society, Sponsored by the LAN/MAN Standards Committee, IEEE Std 802.11ae™-2012, (Amendment to IEEE Std 802.11™-2012), 52 total pages (incl. pp. i-xii, 1-38).

7. IEEE P802.11af™/D1.06, March 2012, (Amendment to IEEE Std 802.11REVmb™/D12.0 as amended by IEEE Std 802.11ae™/D8.0, IEEE Std 802.11aa™/D9.0, IEEE Std 802.11ad™/D5.0, and IEEE Std 802.11ac™/D2.0), "Draft Standard for Information Technology—Telecommunications and information exchange between systems—Local and metropolitan area networks—Specific requirements—Part 11: Wireless LAN Medium Access Control (MAC) and Physical Layer (PHY) Specifications—Amendment 5: TV White Spaces Operation," Prepared by the 802.11 Working Group of the IEEE 802 Committee, 140 total pages (incl. pp. i-xxii, 1-118).

BACKGROUND OF THE INVENTION

1. Technical Field of the Invention

The invention relates generally to communication systems; and, more particularly, it relates to frequency selective transmission within such communication systems.

2. Description of Related Art

Communication systems are known to support wireless and wire lined communications between wireless and/or wire lined communication devices. Such communication systems range from national and/or international cellular telephone systems to the Internet to point-to-point in-home wireless networks. Each type of communication system is constructed, and hence operates, in accordance with one or more communication standards. For instance, wireless communication systems may operate in accordance with one or more standards including, but not limited to, IEEE 802.11x, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), and/or variations thereof.

Depending on the type of wireless communication system, a wireless communication device, such as a cellular telephone, two-way radio, personal digital assistant (PDA), personal computer (PC), laptop computer, home entertainment equipment, et cetera communicates directly or indirectly with other wireless communication devices. For direct communications (also known as point-to-point communications), the participating wireless communication devices tune their receivers and transmitters to the same channel or channels (e.g., one of the plurality of radio frequency (RF) carriers of the wireless communication system) and communicate over that channel(s). For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via the public switch telephone network, via the Internet, and/or via some other wide area network.

For each wireless communication device to participate in wireless communications, it includes a built-in radio transceiver (i.e., receiver and transmitter) or is coupled to an associated radio transceiver (e.g., a station for in-home and/or in-building wireless communication networks, RF modem, etc.). As is known, the receiver is coupled to the antenna and includes a low noise amplifier, one or more intermediate frequency stages, a filtering stage, and a data recovery stage. The low noise amplifier receives inbound RF signals via the antenna and amplifies then. The one or more intermediate frequency stages mix the amplified RF signals with one or more local oscillations to convert the amplified RF signal into baseband signals or intermediate frequency (IF) signals. The filtering stage filters the baseband signals or the IF signals to attenuate unwanted out of band signals to produce filtered signals. The data recovery stage recovers raw data from the filtered signals in accordance with the particular wireless communication standard.

As is also known, the transmitter includes a data modulation stage, one or more intermediate frequency stages, and a power amplifier. The data modulation stage converts raw data into baseband signals in accordance with a particular wireless communication standard. The one or more intermediate frequency stages mix the baseband signals with one or more local oscillations to produce RF signals. The power amplifier amplifies the RF signals prior to transmission via an antenna.

Typically, the transmitter will include one antenna for transmitting the RF signals, which are received by a single antenna, or multiple antennae (alternatively, antennas), of a receiver. When the receiver includes two or more antennae, the receiver will select one of them to receive the incoming RF signals. In this instance, the wireless communication between the transmitter and receiver is a single-output-single-input (SISO) communication, even if the receiver includes multiple antennae that are used as diversity antennae (i.e., selecting one of them to receive the incoming RF signals). For SISO wireless communications, a transceiver includes one transmitter and one receiver. Currently, most wireless local area networks (WLAN) that are IEEE 802.11, 802.11a, 802.11b, or 802.11g employ SISO wireless communications.

Other types of wireless communications include single-input-multiple-output (SIMO), multiple-input-single-output (MISO), and multiple-input-multiple-output (MIMO). In a SIMO wireless communication, a single transmitter processes data into radio frequency signals that are transmitted to a receiver. The receiver includes two or more antennae and two or more receiver paths. Each of the antennae receives the RF signals and provides them to a corresponding receiver path (e.g., LNA, down conversion module, filters, and ADCs). Each of the receiver paths processes the received RF signals to produce digital signals, which are combined and then processed to recapture the transmitted data.

For a multiple-input-single-output (MISO) wireless communication, the transmitter includes two or more transmission paths (e.g., digital to analog converter, filters, up-conversion module, and a power amplifier) that each converts a corresponding portion of baseband signals into RF signals, which are transmitted via corresponding antennae to a receiver. The receiver includes a single receiver path that receives the multiple RF signals from the transmitter. In this instance, the receiver uses beam forming to combine the multiple RF signals into one signal for processing.

For a multiple-input-multiple-output (MIMO) wireless communication, the transmitter and receiver each include multiple paths. In such a communication, the transmitter parallel processes data using a spatial and time encoding function to produce two or more streams of data. The transmitter includes multiple transmission paths to convert each stream of data into multiple RF signals. The receiver receives the multiple RF signals via multiple receiver paths that recapture the streams of data utilizing a spatial and time decoding function. The recaptured streams of data are combined and subsequently processed to recover the original data.

With the various types of wireless communications (e.g., SISO, MISO, SIMO, and MIMO), it would be desirable to use one or more types of wireless communications to enhance data throughput within a WLAN. For example, high data rates can be achieved with MIMO communications in comparison to SISO communications. However, most WLAN include legacy wireless communication devices (i.e., devices that are compliant with an older version of a wireless communication standard). As such, a transmitter capable of MIMO wireless communications should also be backward compatible with legacy devices to function in a majority of existing WLANs.

Therefore, a need exists for a WLAN device that is capable of high data throughput and is backward compatible with legacy devices.

BRIEF DESCRIPTION OF THE SEVERAL VIEWS OF THE DRAWINGS

FIG. 23 is a diagram illustrating an embodiment of a wireless communication system in which communications are made between various wireless communication devices therein.

FIG. 28A, FIG. 28B, FIG. 29A, FIG. 29B, FIG. 30A, and FIG. 30B are diagrams illustrating embodiments of methods for operating one or more wireless communication devices.

DETAILED DESCRIPTION OF THE INVENTION

Figure 1:
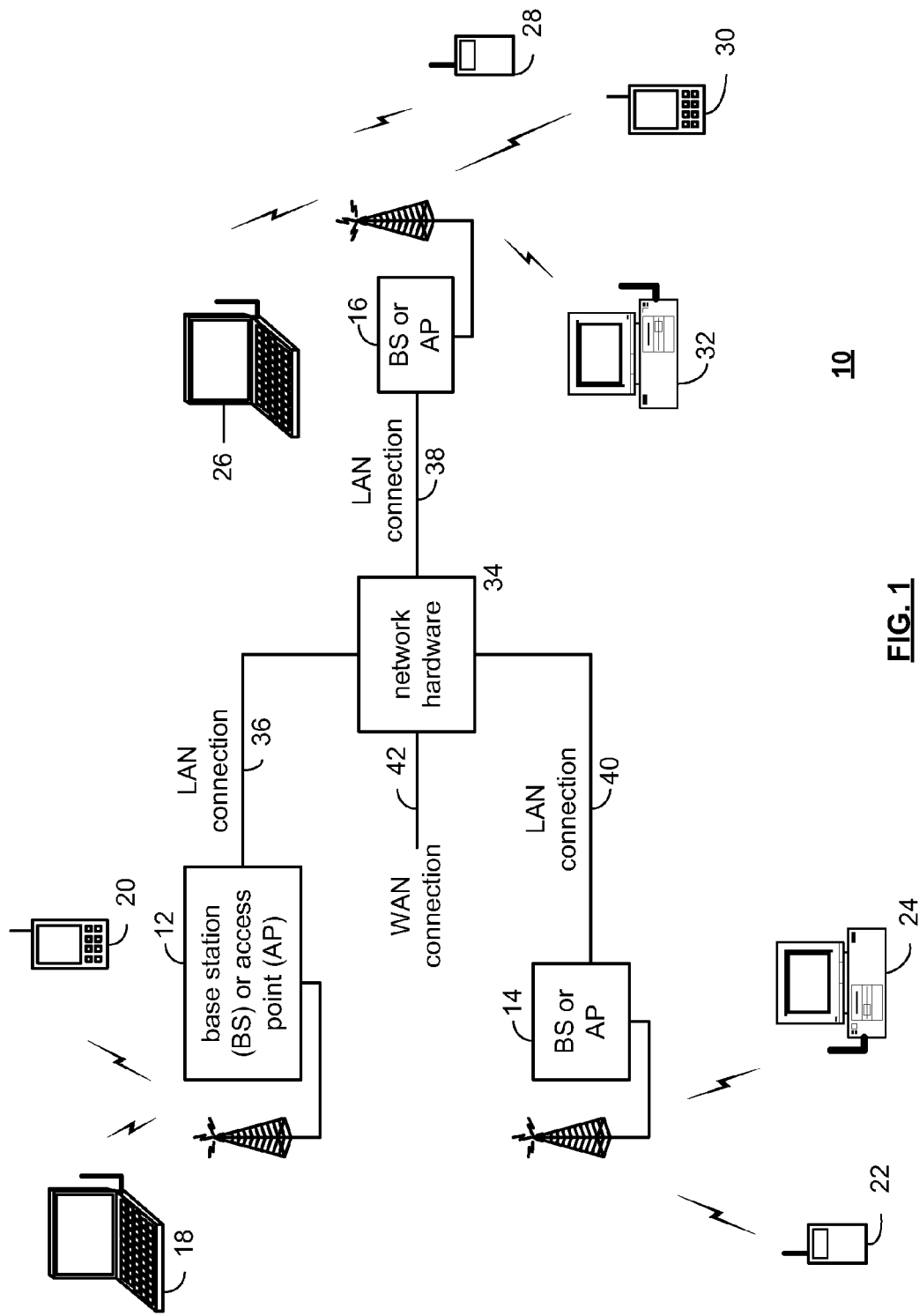
FIG. 1 is a diagram illustrating an embodiment of a wireless communication system.

FIG. 1 is a diagram illustrating an embodiment of a wireless communication system 10 that includes a plurality of base stations and/or access points 12-16, a plurality of wireless communication devices 18-32 and a network hardware component 34. The wireless communication devices 18-32 may be laptop host computers 18 and 26, personal digital assistant hosts 20 and 30, personal computer hosts 24 and 32 and/or cellular telephone hosts 22 and 28. The details of an embodiment of such wireless communication devices are described in greater detail with reference to FIG. 2.

The base stations (BSs) or access points (APs) 12-16 are operably coupled to the network hardware 34 via local area network connections 36, 38 and 40. The network hardware 34, which may be a router, switch, bridge, modem, system controller, etc., provides a wide area network connection 42 for the communication system 10. Each of the base stations or access points 12-16 has an associated antenna or antenna array to communicate with the wireless communication devices in its area. Typically, the wireless communication devices register with a particular base station or access point 12-14 to receive services from the communication system 10. For direct connections (i.e., point-to-point communications), wireless communication devices communicate directly via an allocated channel.

Typically, base stations are used for cellular telephone systems (e.g., advanced mobile phone services (AMPS), digital AMPS, global system for mobile communications (GSM), code division multiple access (CDMA), local multi-point distribution systems (LMDS), multi-channel-multi-point distribution systems (MMDS), Enhanced Data rates for GSM Evolution (EDGE), General Packet Radio Service (GPRS), high-speed downlink packet access (HSDPA), high-speed uplink packet access (HSUPA and/or variations thereof) and like-type systems, while access points are used for in-home or in-building wireless networks (e.g., IEEE 802.11, Bluetooth, ZigBee, any other type of radio frequency based network protocol and/or variations thereof). Regardless of the particular type of communication system, each wireless communication device includes a built-in radio and/or is coupled to a radio. Such wireless communication devices may operate in accordance with the various aspects of the invention as presented herein to enhance performance, reduce costs, reduce size, and/or enhance broadband applications.

Figure 2:
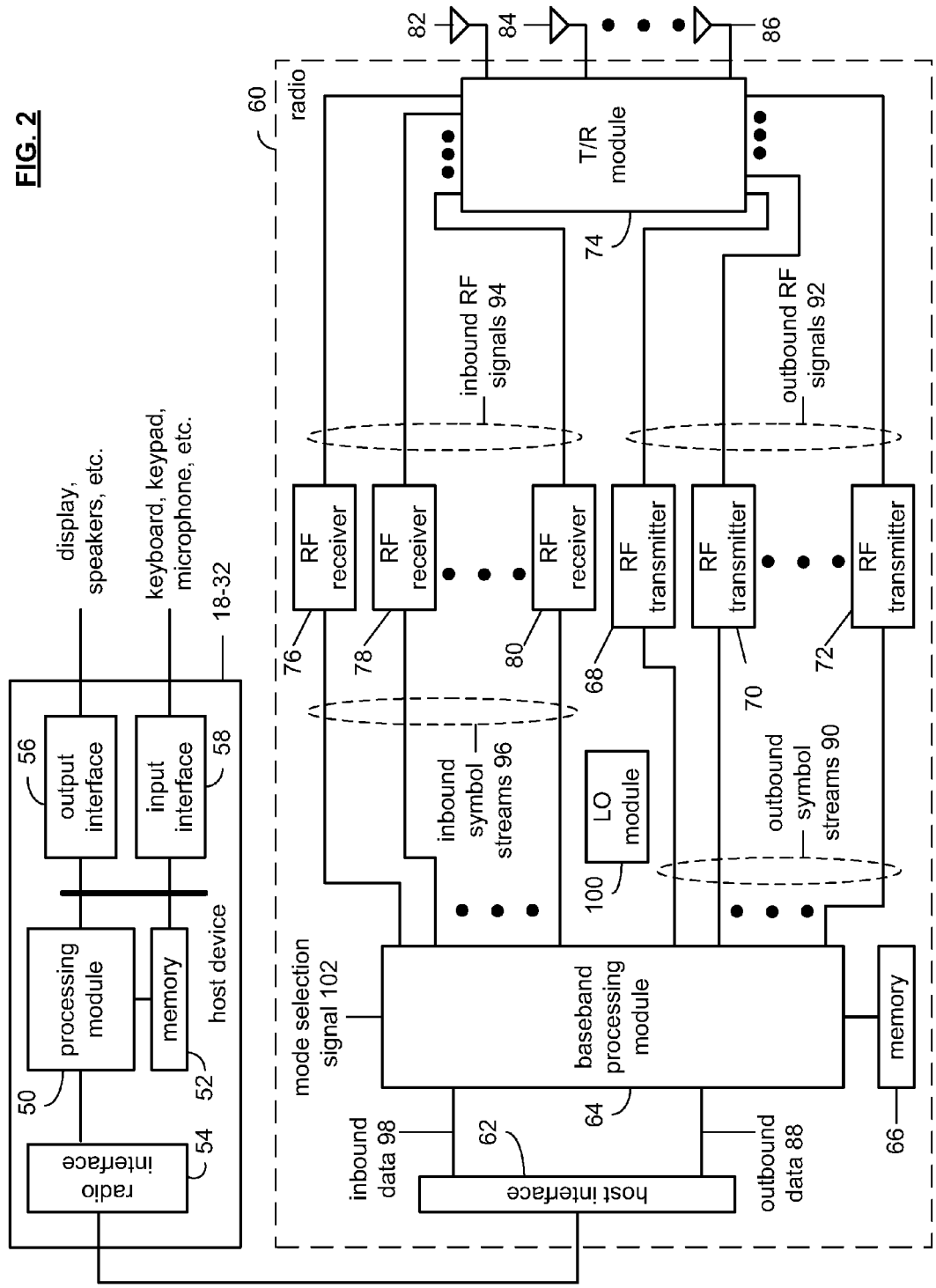
FIG. 2 is a diagram illustrating an embodiment of a wireless communication device.

FIG. 2 is a diagram illustrating an embodiment of a wireless communication device that includes the host device 18-32 and an associated radio 60. For cellular telephone hosts, the radio 60 is a built-in component. For personal digital assistants hosts, laptop hosts, and/or personal computer hosts, the radio 60 may be built-in or an externally coupled component. For access points or base stations, the components are typically housed in a single structure.

As illustrated, the host device 18-32 includes a processing module 50, memory 52, radio interface 54, input interface 58 and output interface 56. The processing module 50 and memory 52 execute the corresponding instructions that are typically done by the host device. For example, for a cellular telephone host device, the processing module 50 performs the corresponding communication functions in accordance with a particular cellular telephone standard.

The radio interface 54 allows data to be received from and sent to the radio 60. For data received from the radio 60 (e.g., inbound data), the radio interface 54 provides the data to the processing module 50 for further processing and/or routing to the output interface 56. The output interface 56 provides connectivity to an output display device such as a display, monitor, speakers, etc. such that the received data may be displayed. The radio interface 54 also provides data from the processing module 50 to the radio 60. The processing module 50 may receive the outbound data from an input device such as a keyboard, keypad, microphone, etc. via the input interface 58 or generate the data itself. For data received via the input interface 58, the processing module 50 may perform a corresponding host function on the data and/or route it to the radio 60 via the radio interface 54.

Radio 60 includes a host interface 62, a baseband processing module 64, memory 66, a plurality of radio frequency (RF) transmitters 68-72, a transmit/receive (T/R) module 74, a plurality of antennae 82-86, a plurality of RF receivers 76-80, and a local oscillation module 100. The baseband processing module 64, in combination with operational instructions stored in memory 66, execute digital receiver functions and digital transmitter functions, respectively. The digital receiver functions, as will be described in greater detail with reference to FIG. 11B, include, but are not limited to, digital intermediate frequency to baseband conversion, demodulation, constellation demapping, decoding, de-interleaving, fast Fourier transform, cyclic prefix removal, space and time decoding, and/or descrambling. The digital transmitter functions, as will be described in greater detail with reference to later Figures, include, but are not limited to, scrambling, encoding, interleaving, constellation mapping, modulation, inverse fast Fourier transform, cyclic prefix addition, space and time encoding, and/or digital baseband to IF conversion. The baseband processing modules 64 may be implemented using one or more processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory 66 may be a single memory device or a plurality of memory devices. Such a memory device may be a read-only memory, random access memory, volatile memory, non-volatile memory, static memory, dynamic memory, flash memory, and/or any device that stores digital information. Note that when the processing module 64 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

In operation, the radio 60 receives outbound data 88 from the host device via the host interface 62. The baseband processing module 64 receives the outbound data 88 and, based on a mode selection signal 102, produces one or more outbound symbol streams 90. The mode selection signal 102 will indicate a particular mode as are illustrated in the mode selection tables, which appear at the end of the detailed discussion. For example, the mode selection signal 102, with reference to table 1 may indicate a frequency band of 2.4 GHz or 5 GHz, a channel bandwidth of 20 or 22 MHz (e.g., channels of 20 or 22 MHz width) and a maximum bit rate of 54 megabits-per-second. In other embodiments, the channel bandwidth may extend up to 1.28 GHz or wider with supported maximum bit rates extending to 1 gigabit-per-second or greater. In this general category, the mode selection signal will further indicate a particular rate ranging from 1 megabit-per-second to 54 megabits-per-second. In addition, the mode selection signal will indicate a particular type of modulation, which includes, but is not limited to, Barker Code Modulation, BPSK, QPSK, CCK, 16 QAM and/or 64 QAM. As is further illustrated in table 1, a code rate is supplied as well as number of coded bits per sub-carrier (NBPSC), coded bits per OFDM symbol (NCBPS), data bits per OFDM symbol (NDBPS).

The mode selection signal may also indicate a particular channelization for the corresponding mode which for the information in table 1 is illustrated in table 2. As shown, table 2 includes a channel number and corresponding center frequency. The mode select signal may further indicate a power spectral density mask value which for table 1 is illustrated in table 3. The mode select signal may alternatively indicate rates within table 4 that has a 5 GHz frequency band, 20 MHz channel bandwidth and a maximum bit rate of 54 megabits-per-second. If this is the particular mode select, the channelization is illustrated in table 5. As a further alternative, the mode select signal 102 may indicate a 2.4 GHz frequency band, 20 MHz channels and a maximum bit rate of 192 megabits-per-second as illustrated in table 6. In table 6, a number of antennae may be utilized to achieve the higher bit rates. In this instance, the mode select would further indicate the number of antennae to be utilized. Table 7 illustrates the channelization for the set-up of table 6. Table 8 illustrates yet another mode option where the frequency band is 2.4 GHz, the channel bandwidth is 20 MHz and the maximum bit rate is 192 megabits-per-second. The corresponding table 8 includes various bit rates ranging from 12 megabits-per-second to 216 megabits-per-second utilizing 2-4 antennae and a spatial time encoding rate as indicated. Table 9 illustrates the channelization for table 8. The mode select signal 102 may further indicate a particular operating mode as illustrated in table 10, which corresponds to a 5 GHz frequency band having 40 MHz frequency band having 40 MHz channels and a maximum bit rate of 486 megabits-per-second. As shown in table 10, the bit rate may range from 13.5 megabits-per-second to 486 megabits-per-second utilizing 1-4 antennae and a corresponding spatial time code rate. Table 10 further illustrates a particular modulation scheme code rate and NBPSC values. Table 11 provides the power spectral density mask for table 10 and table 12 provides the channelization for table 10.

It is of course noted that other types of channels, having different bandwidths, may be employed in other embodiments without departing from the scope and spirit of the invention. For example, various other channels such as those having 80 MHz, 120 MHz, and/or 160 MHz of bandwidth may alternatively be employed such as in accordance with IEEE Task Group ac (TGac VHTL6).

The baseband processing module 64, based on the mode selection signal 102 produces the one or more outbound symbol streams 90, as will be further described with reference to FIGS. 5-9 from the output data 88. For example, if the mode selection signal 102 indicates that a single transmit antenna is being utilized for the particular mode that has been selected, the baseband processing module 64 will produce a single outbound symbol stream 90. Alternatively, if the mode select signal indicates 2, 3 or 4 antennae, the baseband processing module 64 will produce 2, 3 or 4 outbound symbol streams 90 corresponding to the number of antennae from the output data 88.

Depending on the number of outbound streams 90 produced by the baseband module 64, a corresponding number of the RF transmitters 68-72 will be enabled to convert the outbound symbol streams 90 into outbound RF signals 92. The implementation of the RF transmitters 68-72 will be further described with reference to FIG. 3. The transmit/receive module 74 receives the outbound RF signals 92 and provides each outbound RF signal to a corresponding antenna 82-86.

When the radio 60 is in the receive mode, the transmit/receive module 74 receives one or more inbound RF signals via the antennae 82-86. The T/R module 74 provides the inbound RF signals 94 to one or more RF receivers 76-80. The RF receiver 76-80, which will be described in greater detail with reference to FIG. 4, converts the inbound RF signals 94 into a corresponding number of inbound symbol streams 96. The number of inbound symbol streams 96 will correspond to the particular mode in which the data was received (recall that the mode may be any one of the modes illustrated in tables 1-12). The baseband processing module 64 receives the inbound symbol streams 90 and converts them into inbound data 98, which is provided to the host device 18-32 via the host interface 62.

In one embodiment of radio 60 it includes a transmitter and a receiver. The transmitter may include a MAC module, a PLCP module, and a PMD module. The Medium Access Control (MAC) module, which may be implemented with the processing module 64, is operably coupled to convert a MAC Service Data Unit (MSDU) into a MAC Protocol Data Unit (MPDU) in accordance with a WLAN protocol. The Physical Layer Convergence Procedure (PLCP) Module, which may be implemented in the processing module 64, is operably coupled to convert the MPDU into a PLCP Protocol Data Unit (PPDU) in accordance with the WLAN protocol. The Physical Medium Dependent (PMD) module is operably coupled to convert the PPDU into a plurality of radio frequency (RF) signals in accordance with one of a plurality of operating modes of the WLAN protocol, wherein the plurality of operating modes includes multiple input and multiple output combinations.

An embodiment of the Physical Medium Dependent (PMD) module, which will be described in greater detail with reference to FIGS. 10A and 10B, includes an error protection module, a demultiplexing module, and a plurality of direction conversion modules. The error protection module, which may be implemented in the processing module 64, is operably coupled to restructure a PPDU (PLCP (Physical Layer Convergence Procedure) Protocol Data Unit) to reduce transmission errors producing error protected data. The demultiplexing module is operably coupled to divide the error protected data into a plurality of error protected data streams The plurality of direct conversion modules is operably coupled to convert the plurality of error protected data streams into a plurality of radio frequency (RF) signals.

As one of average skill in the art will appreciate, the wireless communication device of FIG. 2 may be implemented using one or more integrated circuits. For example, the host device may be implemented on one integrated circuit, the baseband processing module 64 and memory 66 may be implemented on a second integrated circuit, and the remaining components of the radio 60, less the antennae 82-86, may be implemented on a third integrated circuit. As an alternate example, the radio 60 may be implemented on a single integrated circuit. As yet another example, the processing module 50 of the host device and the baseband processing module 64 may be a common processing device implemented on a single integrated circuit. Further, the memory 52 and memory 66 may be implemented on a single integrated circuit and/or on the same integrated circuit as the common processing modules of processing module 50 and the baseband processing module 64.

Figure 3:
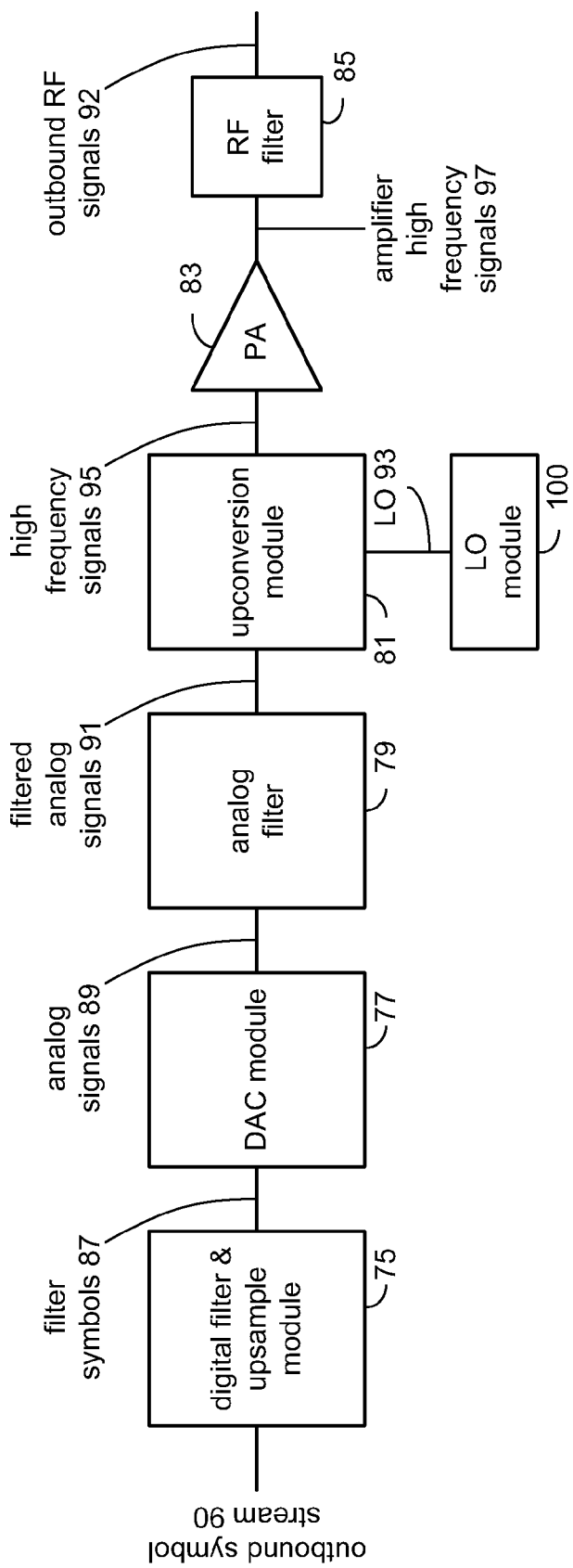
FIG. 3 is a diagram illustrating an embodiment of a radio frequency (RF) transmitter.

FIG. 3 is a diagram illustrating an embodiment of a radio frequency (RF) transmitter 68-72, or RF front-end, of the WLAN transmitter. The RF transmitter 68-72 includes a digital filter and up-sampling module 75, a digital-to-analog conversion module 77, an analog filter 79, and up-conversion module 81, a power amplifier 83 and a RF filter 85. The digital filter and up-sampling module 75 receives one of the outbound symbol streams 90 and digitally filters it and then up-samples the rate of the symbol streams to a desired rate to produce the filtered symbol streams 87. The digital-to-analog conversion module 77 converts the filtered symbols 87 into analog signals 89. The analog signals may include an in-phase component and a quadrature component.

The analog filter 79 filters the analog signals 89 to produce filtered analog signals 91. The up-conversion module 81, which may include a pair of mixers and a filter, mixes the filtered analog signals 91 with a local oscillation 93, which is produced by local oscillation module 100, to produce high frequency signals 95. The frequency of the high frequency signals 95 corresponds to the frequency of the outbound RF signals 92.

The power amplifier 83 amplifies the high frequency signals 95 to produce amplified high frequency signals 97. The RF filter 85, which may be a high frequency band-pass filter, filters the amplified high frequency signals 97 to produce the desired output RF signals 92.

As one of average skill in the art will appreciate, each of the radio frequency transmitters 68-72 will include a similar architecture as illustrated in FIG. 3 and further include a shut-down mechanism such that when the particular radio frequency transmitter is not required, it is disabled in such a manner that it does not produce interfering signals and/or noise.

Figure 4:
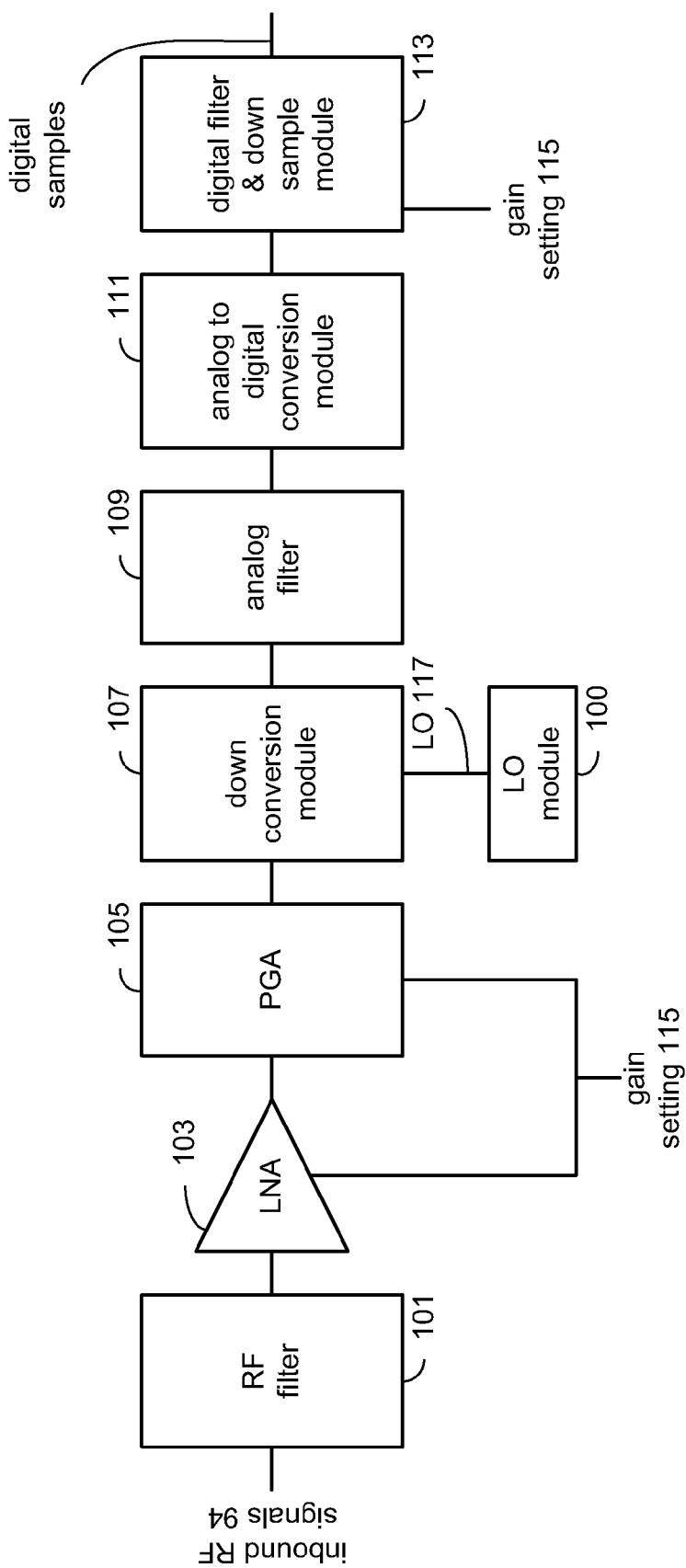
FIG. 4 is a diagram illustrating an embodiment of an RF receiver.

FIG. 4 is a diagram illustrating an embodiment of an RF receiver. This may depict any one of the RF receivers 76-80. In this embodiment, each of the RF receivers 76-80 includes an RF filter 101, a low noise amplifier (LNA) 103, a programmable gain amplifier (PGA) 105, a down-conversion module 107, an analog filter 109, an analog-to-digital conversion module 111 and a digital filter and down-sampling module 113. The RF filter 101, which may be a high frequency band-pass filter, receives the inbound RF signals 94 and filters them to produce filtered inbound RF signals. The low noise amplifier 103 amplifies the filtered inbound RF signals 94 based on a gain setting and provides the amplified signals to the programmable gain amplifier 105. The programmable gain amplifier further amplifies the inbound RF signals 94 before providing them to the down-conversion module 107.

The down-conversion module 107 includes a pair of mixers, a summation module, and a filter to mix the inbound RF signals with a local oscillation (LO) that is provided by the local oscillation module to produce analog baseband signals. The analog filter 109 filters the analog baseband signals and provides them to the analog-to-digital conversion module 111 which converts them into a digital signal. The digital filter and down-sampling module 113 filters the digital signals and then adjusts the sampling rate to produce the digital samples (corresponding to the inbound symbol streams 96).

Figure 5:
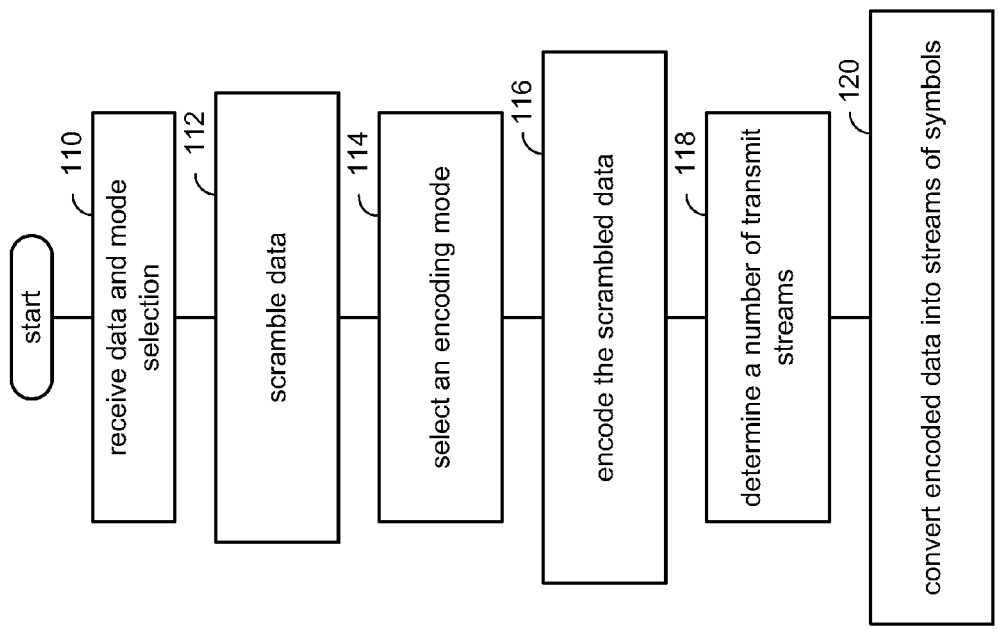
FIG. 5 is a diagram illustrating an embodiment of a method for baseband processing of data.

FIG. 5 is a diagram illustrating an embodiment of a method for baseband processing of data. This diagram shows a method for converting outbound data 88 into one or more outbound symbol streams 90 by the baseband processing module 64. The process begins at Step 110 where the baseband processing module receives the outbound data 88 and a mode selection signal 102. The mode selection signal may indicate any one of the various modes of operation as indicated in tables 1-12. The process then proceeds to Step 112 where the baseband processing module scrambles the data in accordance with a pseudo random sequence to produce scrambled data. Note that the pseudo random sequence may be generated from a feedback shift register with the generator polynomial of $S(x)=x^7+x^4+1$.

The process then proceeds to Step 114 where the baseband processing module selects one of a plurality of encoding modes based on the mode selection signal. The process then proceeds to Step 116 where the baseband processing module encodes the scrambled data in accordance with a selected encoding mode to produce encoded data. The encoding may be done utilizing any one or more a variety of coding schemes (e.g., convolutional coding, Reed-Solomon (RS) coding, turbo coding, turbo trellis coded modulation (TTCM) coding, LDPC (Low Density Parity Check) coding, etc.).

The process then proceeds to Step 118 where the baseband processing module determines a number of transmit streams based on the mode select signal. For example, the mode select signal will select a particular mode which indicates that 1, 2, 3, 4 or more antennae may be utilized for the transmission. Accordingly, the number of transmit streams will correspond to the number of antennae indicated by the mode select signal. The process then proceeds to Step 120 where the baseband processing module converts the encoded data into streams of symbols in accordance with the number of transmit streams in the mode select signal. This step will be described in greater detail with reference to FIG. 6.

Figure 6:
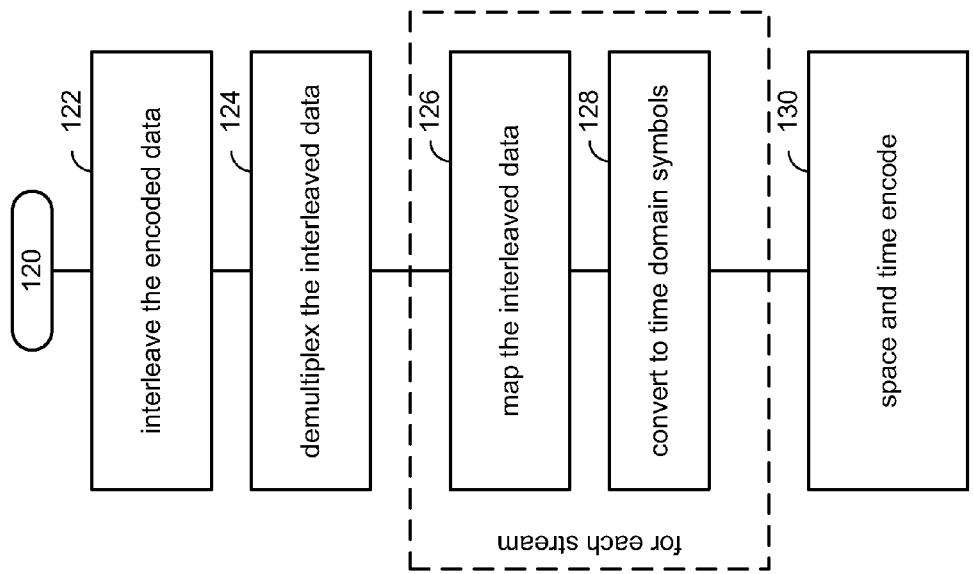
FIG. 6 is a diagram illustrating an embodiment of a method that further defines Step 120 of FIG. 5.

FIG. 6 is a diagram illustrating an embodiment of a method that further defines Step 120 of FIG. 5. This diagram shows a method performed by the baseband processing module to convert the encoded data into streams of symbols in accordance with the number of transmit streams and the mode select signal. Such processing begins at Step 122 where the baseband processing module interleaves the encoded data over multiple symbols and sub-carriers of a channel to produce interleaved data. In general, the interleaving process is designed to spread the encoded data over multiple symbols and transmit streams. This allows improved detection and error correction capability at the receiver. In one embodiment, the interleaving process will follow the IEEE 802.11(a) or (g) standard for backward compatible modes. For higher performance modes (e.g., IEEE 802.11(n), the interleaving will also be done over multiple transmit paths or streams.

The process then proceeds to Step 124 where the baseband processing module demultiplexes the interleaved data into a number of parallel streams of interleaved data. The number of parallel streams corresponds to the number of transmit streams, which in turn corresponds to the number of antennae indicated by the particular mode being utilized. The process then continues to Steps 126 and 128, where for each of the parallel streams of interleaved data, the baseband processing module maps the interleaved data into a quadrature amplitude modulated (QAM) symbol to produce frequency domain symbols at Step 126. At Step 128, the baseband processing module converts the frequency domain symbols into time domain symbols, which may be done utilizing an inverse fast Fourier transform. The conversion of the frequency domain symbols into the time domain symbols may further include adding a cyclic prefix to allow removal of intersymbol interference at the receiver. Note that the length of the inverse fast Fourier transform and cyclic prefix are defined in the mode tables of tables 1-12. In general, a 64-point inverse fast Fourier transform is employed for 20 MHz channels and 128-point inverse fast Fourier transform is employed for 40 MHz channels.

The process then proceeds to Step 130 where the baseband processing module space and time encodes the time domain symbols for each of the parallel streams of interleaved data to produce the streams of symbols. In one embodiment, the space and time encoding may be done by space and time encoding the time domain symbols of the parallel streams of interleaved data into a corresponding number of streams of symbols utilizing an encoding matrix. Alternatively, the space and time encoding may be done by space and time encoding the time domain symbols of M-parallel streams of interleaved data into P-streams of symbols utilizing the encoding matrix, where P=2M. In one embodiment the encoding matrix may comprise a form of:

$$\begin{bmatrix} C_1 & C_2 & C_3 & C_4 & \ldots & C_{2M-1} & C_{2M} \\ -C_2^* & C_1^* & -C_4^* & C_3^* & \ldots & -C_{2M}^* & C_{2M-1}^* \end{bmatrix}$$

The number of rows of the encoding matrix corresponds to M and the number of columns of the encoding matrix corresponds to P. The particular symbol values of the constants within the encoding matrix may be real or imaginary numbers.

Figure 9:
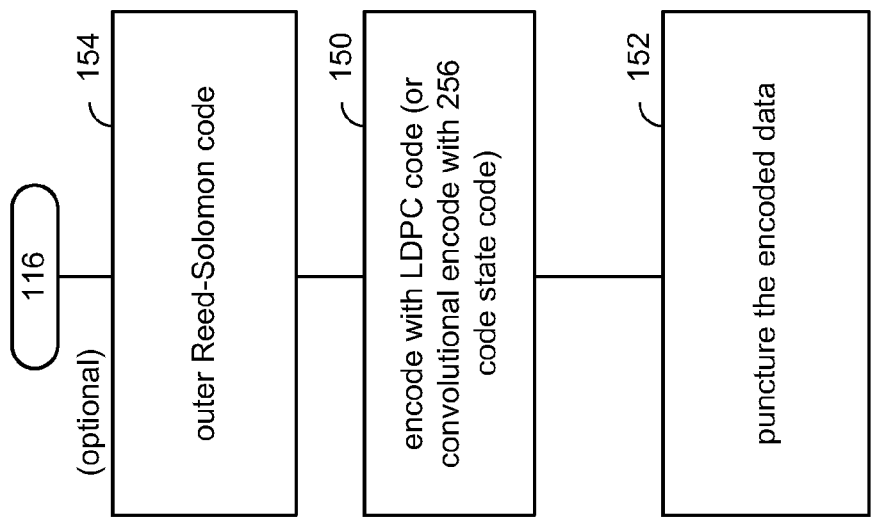
FIGS. 7-9 are diagrams illustrating various embodiments for encoding the scrambled data.
Figure 8:
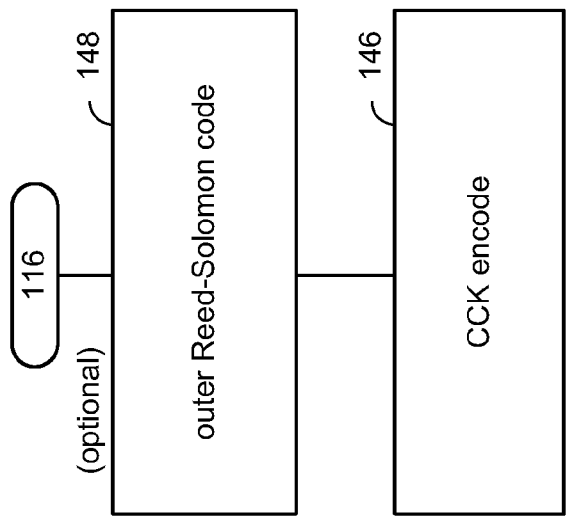
Figure 7:
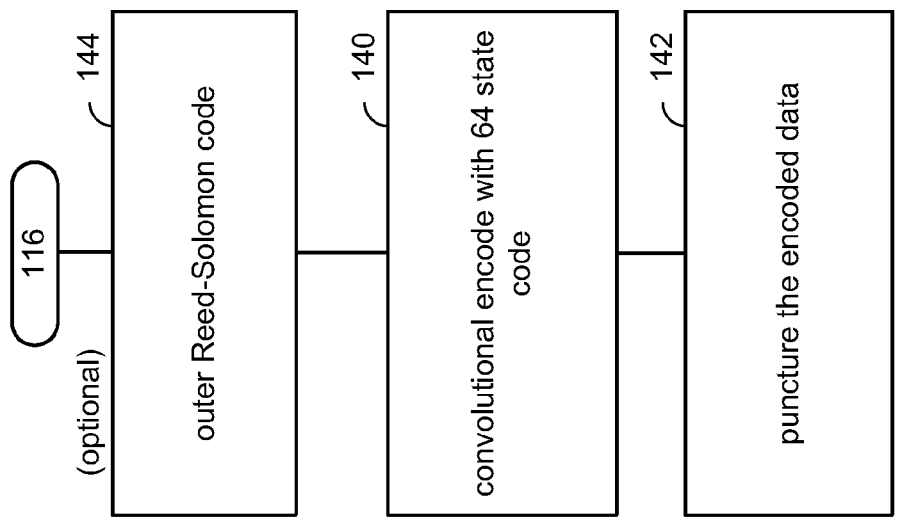

FIGS. 7-9 are diagrams illustrating various embodiments for encoding the scrambled data.

FIG. 7 is a diagram of one method that may be utilized by the baseband processing module to encode the scrambled data at Step 116 of FIG. 5. In this method, the encoding of FIG. 7 may include an optional Step 144 where the baseband processing module may optionally perform encoding with an outer Reed-Solomon (RS) code to produce RS encoded data. It is noted that Step 144 may be conducted in parallel with Step 140 described below.

Also, the process continues at Step 140 where the baseband processing module performs a convolutional encoding with a 64 state code and generator polynomials of $G_0=133_8$ and $G_1=171_8$ on the scrambled data (that may or may not have undergone RS encoding) to produce convolutional encoded data. The process then proceeds to Step 142 where the baseband processing module punctures the convolutional encoded data at one of a plurality of rates in accordance with the mode selection signal to produce the encoded data. Note that the puncture rates may include 1/2, 2/3 and/or 3/4, or any rate as specified in tables 1-12. Note that, for a particular, mode, the rate may be selected for backward compatibility with IEEE 802.11(a), IEEE 802.11(g), or IEEE 802.11(n) rate requirements.

FIG. 8 is a diagram of another encoding method that may be utilized by the baseband processing module to encode the scrambled data at Step 116 of FIG. 5. In this embodiment, the encoding of FIG. 8 may include an optional Step 148 where the baseband processing module may optionally perform encoding with an outer RS code to produce RS encoded data. It is noted that Step 148 may be conducted in parallel with Step 146 described below.

The method then continues at Step 146 where the baseband processing module encodes the scrambled data (that may or may not have undergone RS encoding) in accordance with a complimentary code keying (CCK) code to produce the encoded data. This may be done in accordance with IEEE 802.11(b) specifications, IEEE 802.11(g), and/or IEEE 802.11(n) specifications.

FIG. 9 is a diagram of yet another method for encoding the scrambled data at Step 116, which may be performed by the baseband processing module. In this embodiment, the encoding of FIG. 9 may include an optional Step 154 where the baseband processing module may optionally perform encoding with an outer RS code to produce RS encoded data.

Then, in some embodiments, the process continues at Step 150 where the baseband processing module performs LDPC (Low Density Parity Check) coding on the scrambled data (that may or may not have undergone RS encoding) to produce LDPC coded bits. Alternatively, the Step 150 may operate by performing convolutional encoding with a 256 state code and generator polynomials of $G_0=561_8$ and $G_1=753_8$ on the scrambled data the scrambled data (that may or may not have undergone RS encoding) to produce convolutional encoded data. The process then proceeds to Step 152 where the baseband processing module punctures the convolutional encoded data at one of the plurality of rates in accordance with a mode selection signal to produce encoded data. Note that the puncture rate is indicated in the tables 1-12 for the corresponding mode.

The encoding of FIG. 9 may further include the optional Step 154 where the baseband processing module combines the convolutional encoding with an outer Reed Solomon code to produce the convolutional encoded data.

Figure 10A:
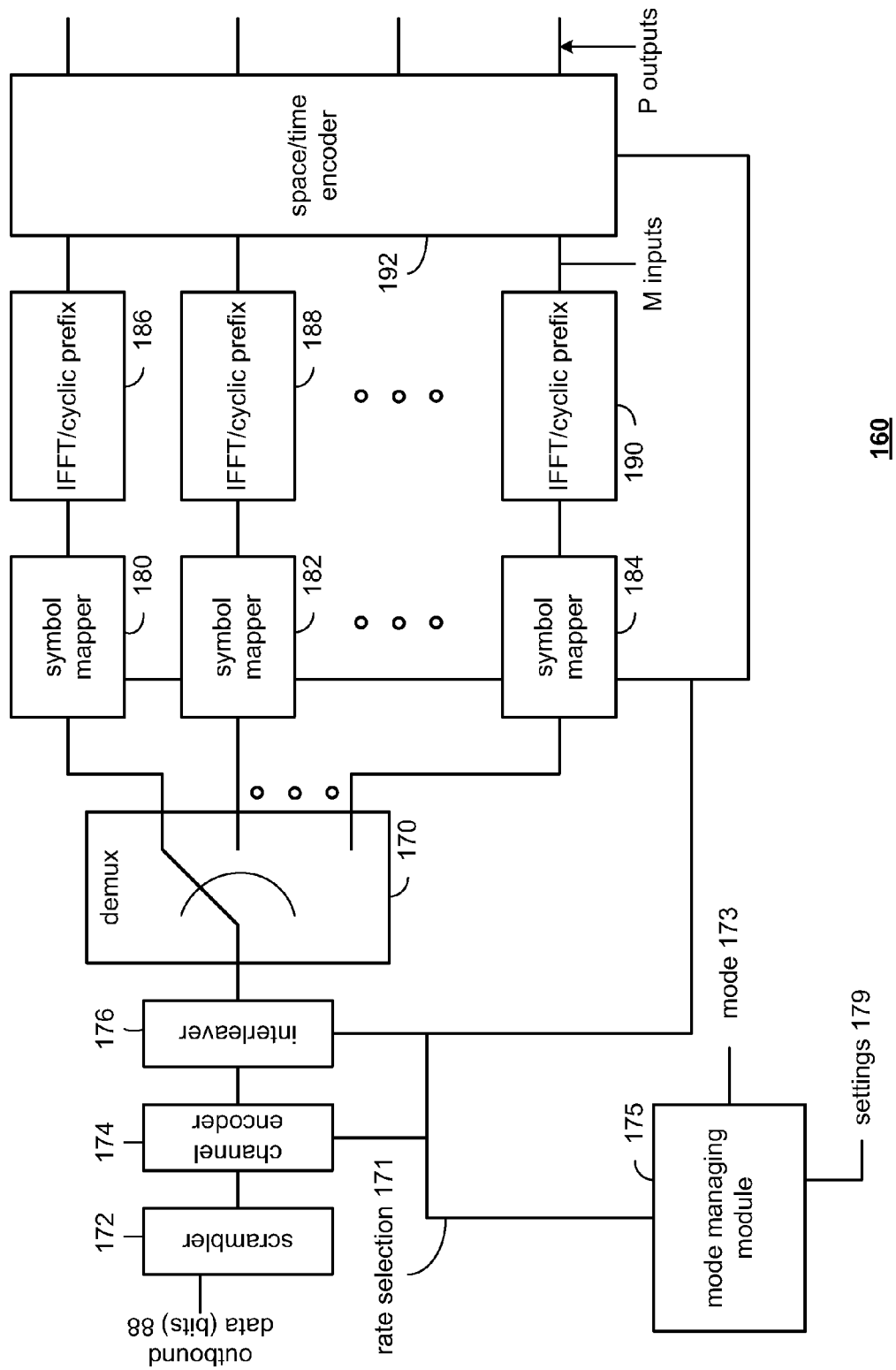
FIGS. 10A and 10B are diagrams illustrating embodiments of a radio transmitter.
Figure 10B:
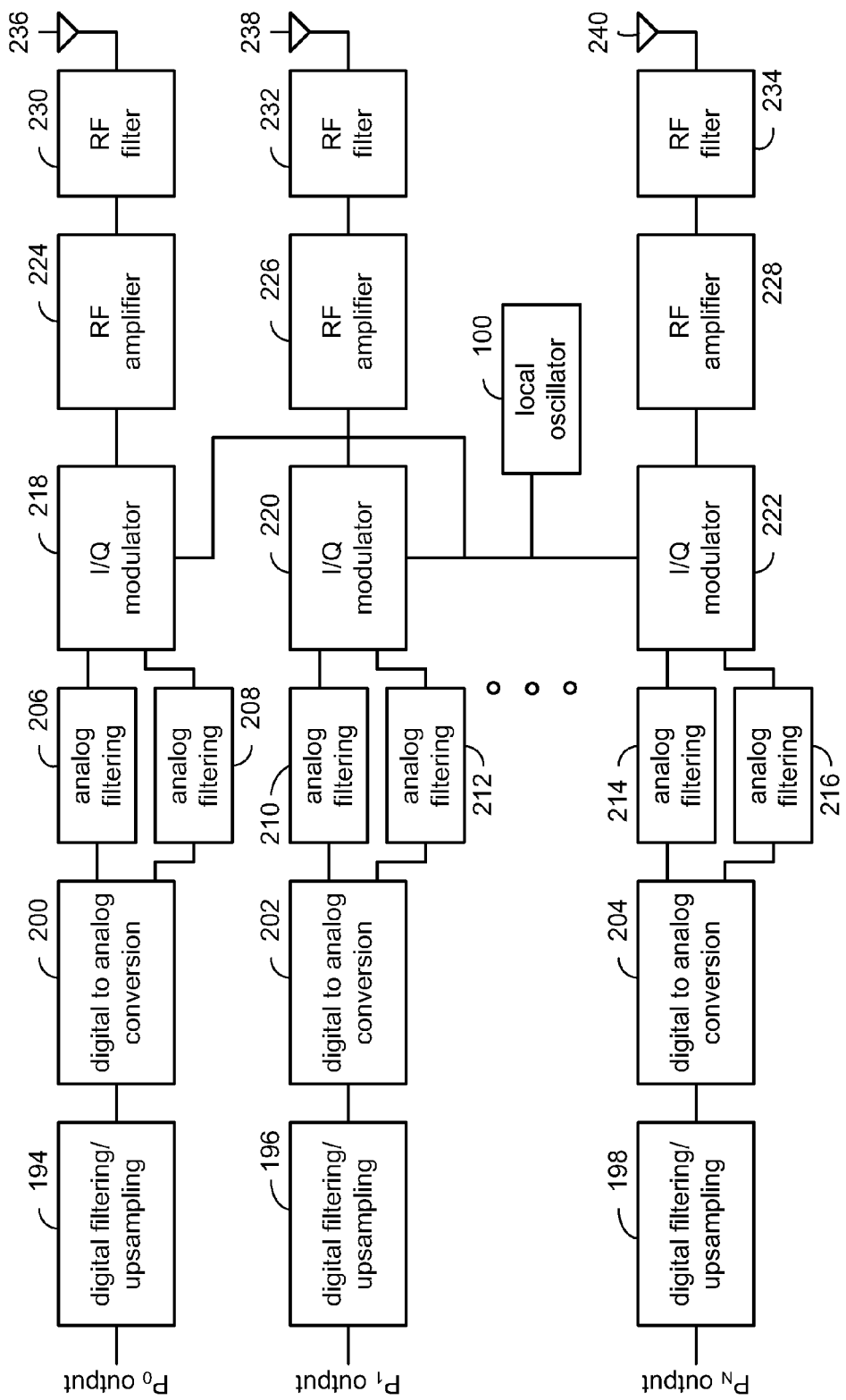

FIGS. 10A and 10B are diagrams illustrating embodiments of a radio transmitter. This may involve the PMD module of a WLAN transmitter. In FIG. 10A, the baseband processing is shown to include a scrambler 172, channel encoder 174, interleaver 176, demultiplexer 170, a plurality of symbol mappers 180-184, a plurality of inverse fast Fourier transform (IFFT)/cyclic prefix addition modules 186-190 and a space/time encoder 192. The baseband portion of the transmitter may further include a mode manager module 175 that receives the mode selection signal 173 and produces settings 179 for the radio transmitter portion and produces the rate selection 171 for the baseband portion. In this embodiment, the scrambler 172, the channel encoder 174, and the interleaver 176 comprise an error protection module. The symbol mappers 180-184, the plurality of IFFT/cyclic prefix modules 186-190, the space time encoder 192 comprise a portion of the digital baseband processing module.

In operations, the scrambler 172 adds (e.g., in a Galois Finite Field (GF2)) a pseudo random sequence to the outbound data bits 88 to make the data appear random. A pseudo random sequence may be generated from a feedback shift register with the generator polynomial of $S(x)=x^7+x^4+1$ to produce scrambled data. The channel encoder 174 receives the scrambled data and generates a new sequence of bits with redundancy. This will enable improved detection at the receiver. The channel encoder 174 may operate in one of a plurality of modes. For example, for backward compatibility with IEEE 802.11(a) and IEEE 802.11(g), the channel encoder has the form of a rate 1/2 convolutional encoder with 64 states and a generator polynomials of $G_0=133_8$ and $G_1=171_8$. The output of the convolutional encoder may be punctured to rates of 1/2, 2/3, and 3/4 according to the specified rate tables (e.g., tables 1-12). For backward compatibility with IEEE 802.11(b) and the CCK modes of IEEE 802.11(g), the channel encoder has the form of a CCK code as defined in IEEE 802.11(b). For higher data rates (such as those illustrated in tables 6, 8 and 10), the channel encoder may use the same convolution encoding as described above or it may use a more powerful code, including a convolutional code with more states, any one or more of the various types of error correction codes (ECCs) mentioned above (e.g., RS, LDPC, turbo, TTCM, etc.) a parallel concatenated (turbo) code and/or a low density parity check (LDPC) block code. Further, any one of these codes may be combined with an outer Reed Solomon code. Based on a balancing of performance, backward compatibility and low latency, one or more of these codes may be optimal. Note that the concatenated turbo encoding and low density parity check will be described in greater detail with reference to subsequent Figures.

The interleaver 176 receives the encoded data and spreads it over multiple symbols and transmit streams. This allows improved detection and error correction capabilities at the receiver. In one embodiment, the interleaver 176 will follow the IEEE 802.11(a) or (g) standard in the backward compatible modes. For higher performance modes (e.g., such as those illustrated in tables 6, 8 and 10), the interleaver will interleave data over multiple transmit streams. The demultiplexer 170 converts the serial interleave stream from interleaver 176 into M-parallel streams for transmission.

Each symbol mapper 180-184 receives a corresponding one of the M-parallel paths of data from the demultiplexer. Each symbol mapper 180-182 lock maps bit streams to quadrature amplitude modulated QAM symbols (e.g., BPSK, QPSK, 16 QAM, 64 QAM, 256 QAM, etc.) according to the rate tables (e.g., tables 1-12). For IEEE 802.11(a) backward compatibility, double Gray coding may be used.

The map symbols produced by each of the symbol mappers 180-184 are provided to the IFFT/cyclic prefix addition modules 186-190, which performs frequency domain to time domain conversions and adds a prefix, which allows removal of inter-symbol interference at the receiver. Note that the length of the IFFT and cyclic prefix are defined in the mode tables of tables 1-12. In general, a 64-point IFFT will be used for 20 MHz channels and 128-point IFFT will be used for 40 MHz channels.

The space/time encoder 192 receives the M-parallel paths of time domain symbols and converts them into P-output symbols. In one embodiment, the number of M-input paths will equal the number of P-output paths. In another embodiment, the number of output paths P will equal 2M paths. For each of the paths, the space/time encoder multiples the input symbols with an encoding matrix that has the form of $$\begin{bmatrix} C_1 & C_2 & C_3 & C_4 & \ldots & C_{2M-1} & C_{2M} \\ -C_2^* & C_1^* & -C_4^* & C_3^* & \ldots & -C_{2M}^* & C_{2M-1}^* \end{bmatrix}.$$

The rows of the encoding matrix correspond to the number of input paths and the columns correspond to the number of output paths.

FIG. 10B illustrates the radio portion of the transmitter that includes a plurality of digital filter/up-sampling modules 194-198, digital-to-analog conversion modules 200-204, analog filters 206-216, I/Q modulators 218-222, RF amplifiers 224-228, RF filters 230-234 and antennae 236-240. The P-outputs from the space/time encoder 192 are received by respective digital filtering/up-sampling modules 194-198. In one embodiment, the digital filters/up sampling modules 194-198 are part of the digital baseband processing module and the remaining components comprise the plurality of RF front-ends. In such an embodiment, the digital baseband processing module and the RF front end comprise a direct conversion module.

In operation, the number of radio paths that are active correspond to the number of P-outputs. For example, if only one P-output path is generated, only one of the radio transmitter paths will be active. As one of average skill in the art will appreciate, the number of output paths may range from one to any desired number.

The digital filtering/up-sampling modules 194-198 filter the corresponding symbols and adjust the sampling rates to correspond with the desired sampling rates of the digital-to-analog conversion modules 200-204. The digital-to-analog conversion modules 200-204 convert the digital filtered and up-sampled signals into corresponding in-phase and quadrature analog signals. The analog filters 206-214 filter the corresponding in-phase and/or quadrature components of the analog signals, and provide the filtered signals to the corresponding I/Q modulators 218-222. The I/Q modulators 218-222 based on a local oscillation, which is produced by a local oscillator 100, up-converts the I/Q signals into radio frequency signals.

The RF amplifiers 224-228 amplify the RF signals which are then subsequently filtered via RF filters 230-234 before being transmitted via antennae 236-240.

Figure 11A:
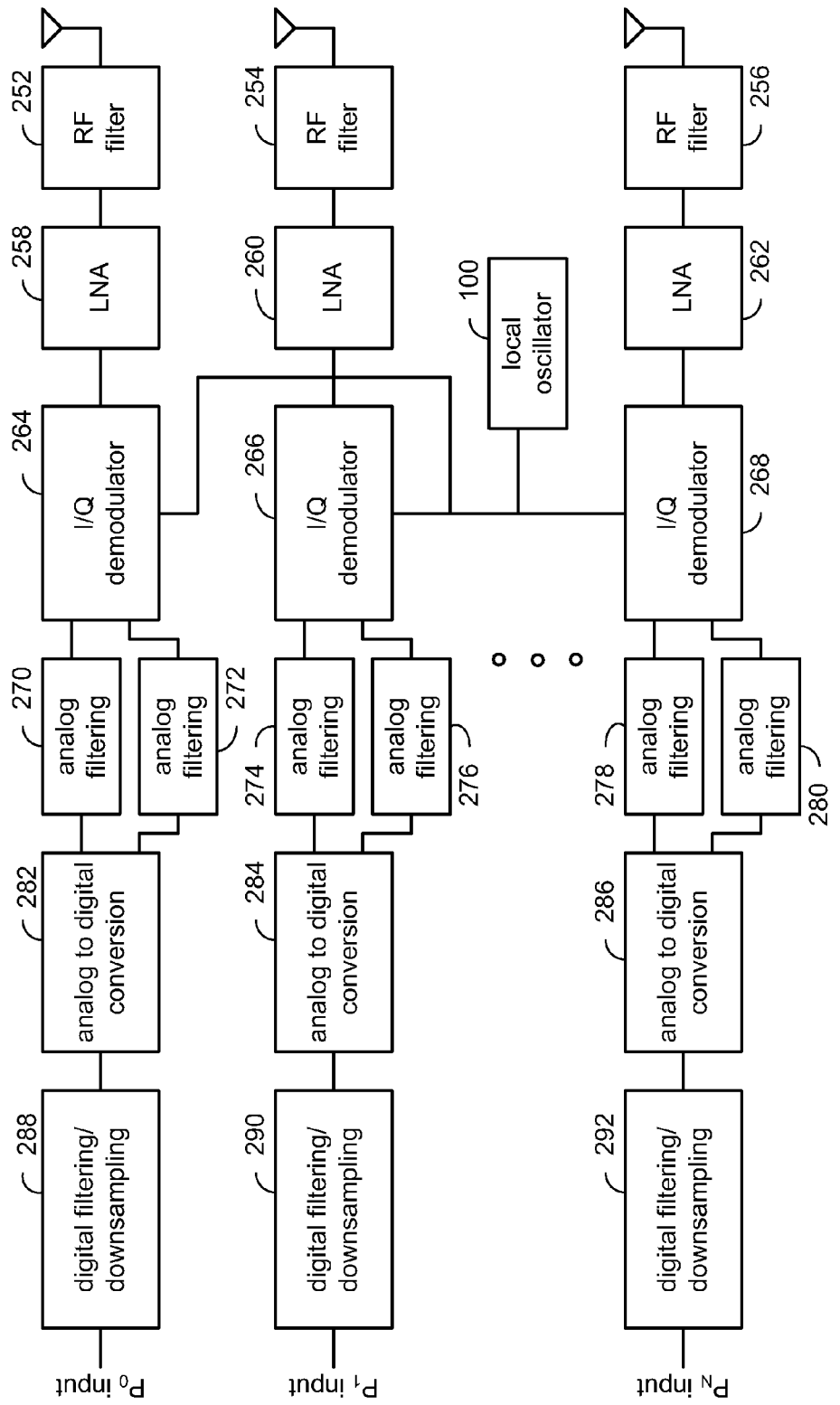
FIGS. 11A and 11B are diagrams illustrating embodiments of a radio receiver.
Figure 11B:
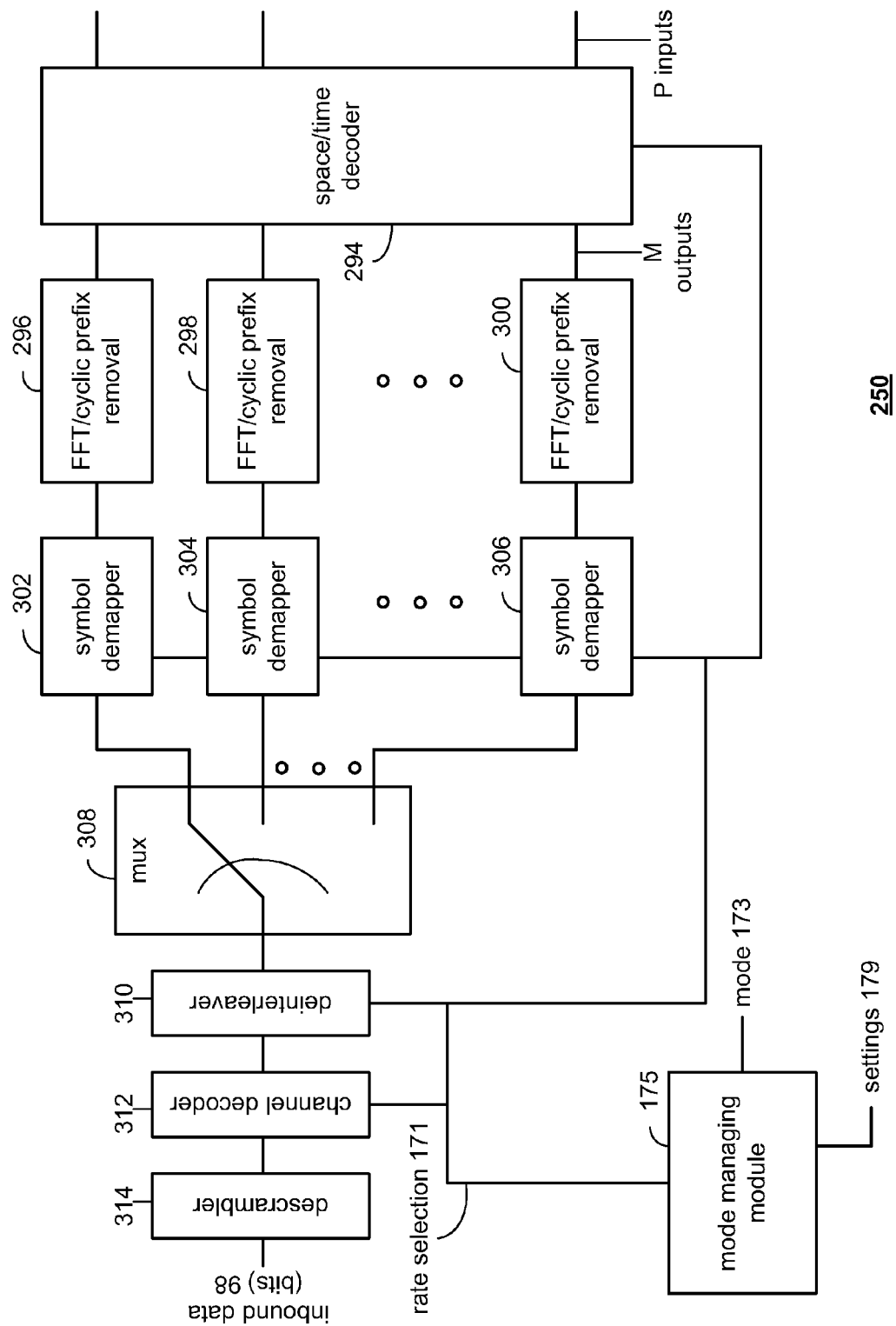

FIGS. 11A and 11B are diagrams illustrating embodiments of a radio receiver (as shown by reference numeral 250). These diagrams illustrate a schematic block diagram of another embodiment of a receiver. FIG. 11A illustrates the analog portion of the receiver which includes a plurality of receiver paths. Each receiver path includes an antenna, RF filters 252-256, low noise amplifiers 258-262, I/Q demodulators 264-268, analog filters 270-280, analog-to-digital converters 282-286 and digital filters and down-sampling modules 288-290.

In operation, the antennae receive inbound RF signals, which are band-pass filtered via the RF filters 252-256. The corresponding low noise amplifiers 258-262 amplify the filtered signals and provide them to the corresponding I/Q demodulators 264-268. The I/Q demodulators 264-268, based on a local oscillation, which is produced by local oscillator 100, down-converts the RF signals into baseband in-phase and quadrature analog signals.

The corresponding analog filters 270-280 filter the in-phase and quadrature analog components, respectively. The analog-to-digital converters 282-286 convert the in-phase and quadrature analog signals into a digital signal. The digital filtering and down-sampling modules 288-290 filter the digital signals and adjust the sampling rate to correspond to the rate of the baseband processing, which will be described in FIG. 11B.

FIG. 11B illustrates the baseband processing of a receiver. The baseband processing includes a space/time decoder 294, a plurality of fast Fourier transform (FFT)/cyclic prefix removal modules 296-300, a plurality of symbol demapping modules 302-306, a multiplexer 308, a deinterleaver 310, a channel decoder 312, and a descramble module 314. The baseband processing module may further include a mode managing module 175, which produces rate selections 171 and settings 179 based on mode selections 173. The space/time decoding module 294, which performs the inverse function of space/time encoder 192, receives P-inputs from the receiver paths and produce M-output paths. The M-output paths are processed via the FFT/cyclic prefix removal modules 296-300 which perform the inverse function of the IFFT/cyclic prefix addition modules 186-190 to produce frequency domain symbols.

The symbol demapping modules 302-306 convert the frequency domain symbols into data utilizing an inverse process of the symbol mappers 180-184. The multiplexer 308 combines the demapped symbol streams into a single path.

The deinterleaver 310 deinterleaves the single path utilizing an inverse function of the function performed by interleaver 176. The deinterleaved data is then provided to the channel decoder 312 which performs the inverse function of channel encoder 174. The descrambler 314 receives the decoded data and performs the inverse function of scrambler 172 to produce the inbound data 98.

Figure 12:
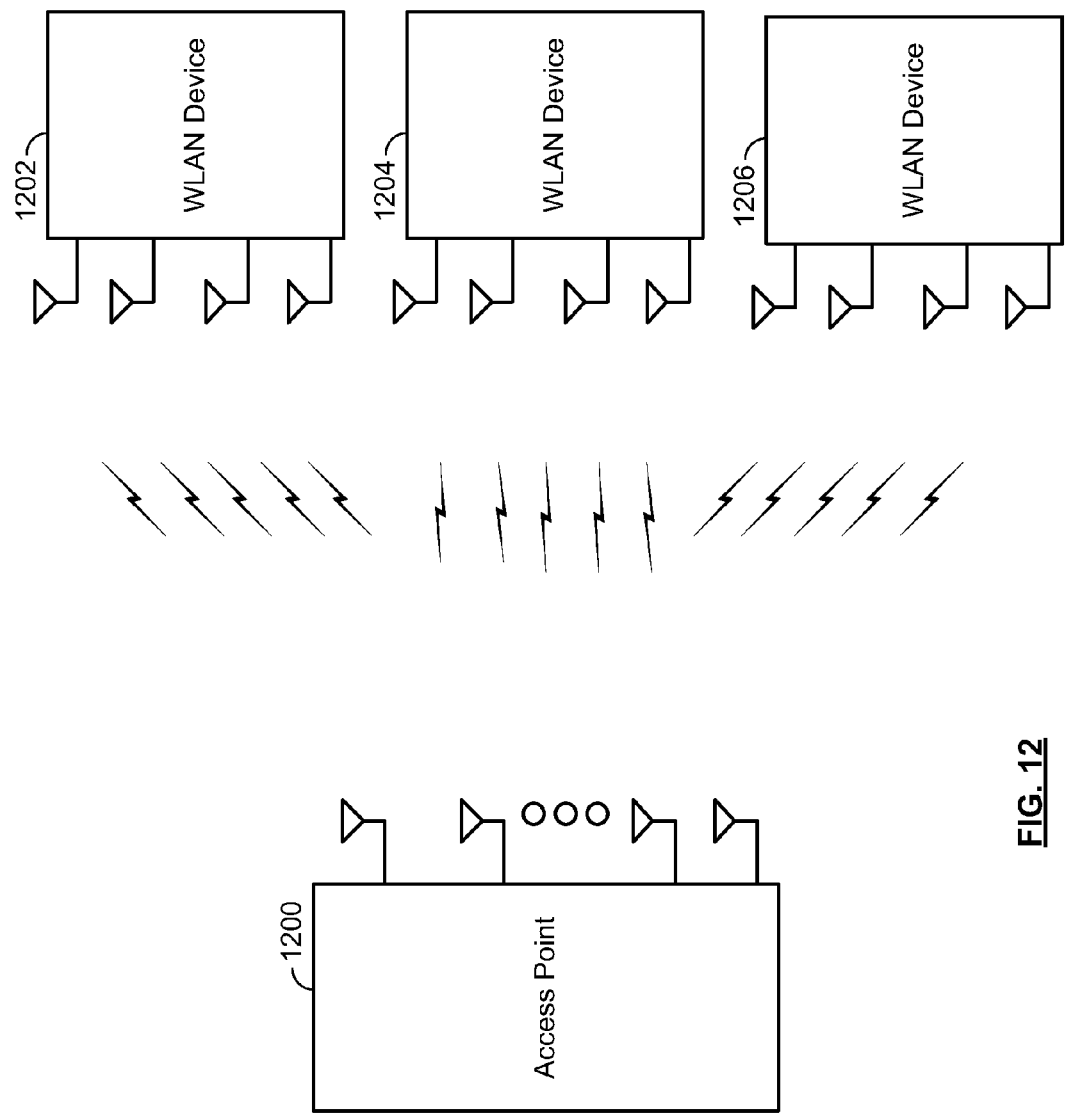
FIG. 12 is a diagram illustrating an embodiment of an access point (AP) and multiple wireless local area network (WLAN) devices operating according to one or more various aspects and/or embodiments of the invention.

FIG. 12 is a diagram illustrating an embodiment of an access point (AP) and multiple wireless local area network (WLAN) devices operating according to one or more various aspects and/or embodiments of the invention. The AP point 1200 may compatible with any number of communication protocols and/or standards, e.g., IEEE 802.11(a), IEEE 802.11(b), IEEE 802.11(g), IEEE 802.11(n), as well as in accordance with various aspects of invention. According to certain aspects of the present invention, the AP supports backwards compatibility with prior versions of the IEEE 802.11x standards as well. According to other aspects of the present invention, the AP 1200 supports communications with the WLAN devices 1202, 1204, and 1206 with channel bandwidths, MIMO dimensions, and at data throughput rates unsupported by the prior IEEE 802.11x operating standards. For example, the access point 1200 and WLAN devices 1202, 1204, and 1206 may support channel bandwidths from those of prior version devices and from 40 MHz to 1.28 GHz and above. The access point 1200 and WLAN devices 1202, 1204, and 1206 support MIMO dimensions to 4×4 and greater. With these characteristics, the access point 1200 and WLAN devices 1202, 1204, and 1206 may support data throughput rates to 1 GHz and above.

The AP 1200 supports simultaneous communications with more than one of the WLAN devices 1202, 1204, and 1206. Simultaneous communications may be serviced via OFDM tone allocations (e.g., certain number of OFDM tones in a given cluster), MIMO dimension multiplexing, or via other techniques. With some simultaneous communications, the AP 1200 may allocate one or more of the multiple antennae thereof respectively to support communication with each WLAN device 1202, 1204, and 1206, for example.

Further, the AP 1200 and WLAN devices 1202, 1204, and 1206 are backwards compatible with the IEEE 802.11(a), (b), (g), and (n) operating standards. In supporting such backwards compatibility, these devices support signal formats and structures that are consistent with these prior operating standards.

Generally, communications as described herein may be targeted for reception by a single receiver or for multiple individual receivers (e.g. via multi-user multiple input multiple output (MU-MIMO), and/or OFDMA transmissions, which are different than single transmissions with a multi-receiver address). For example, a single OFDMA transmission uses different tones or sets of tones (e.g., clusters or channels) to send distinct sets of information, each set of set of information transmitted to one or more receivers simultaneously in the time domain. Again, an OFDMA transmission sent to one user is equivalent to an OFDM transmission (e.g., OFDM may be viewed as being a subset of OFDMA). A single MU-MIMO transmission may include spatially-diverse signals over a common set of tones, each containing distinct information and each transmitted to one or more distinct receivers. Some single transmissions may be a combination of OFDMA and MU-MIMO. Multi-user (MU), as described herein, may be viewed as being multiple users sharing at least one cluster (e.g., at least one channel within at least one band) at a same time.

MIMO transceivers illustrated may include SISO, SIMO, and MISO transceivers. The clusters employed for such communications (e.g., OFDMA communications) may be continuous (e.g., adjacent to one another) or discontinuous (e.g., separated by a guard interval of band gap). Transmissions on different OFDMA clusters may be simultaneous or non-simultaneous. Such wireless communication devices as described herein may be capable of supporting communications via a single cluster or any combination thereof. Legacy users and new version users (e.g., TGac MU-MIMO, OFDMA, MU-MIMO/OFDMA, etc.) may share bandwidth at a given time or they can be scheduled at different times for certain embodiments. Such a MU-MIMO/OFDMA transmitter (e.g., an AP or a STA) may transmit packets to more than one receiving wireless communication device (e.g., STA) on the same cluster (e.g., at least one channel within at least one band) in a single aggregated packet (such as being time multiplexed). In such an instance, channel training may be required for all communication links to the respective receiving wireless communication devices (e.g., STAs).

Figure 13:
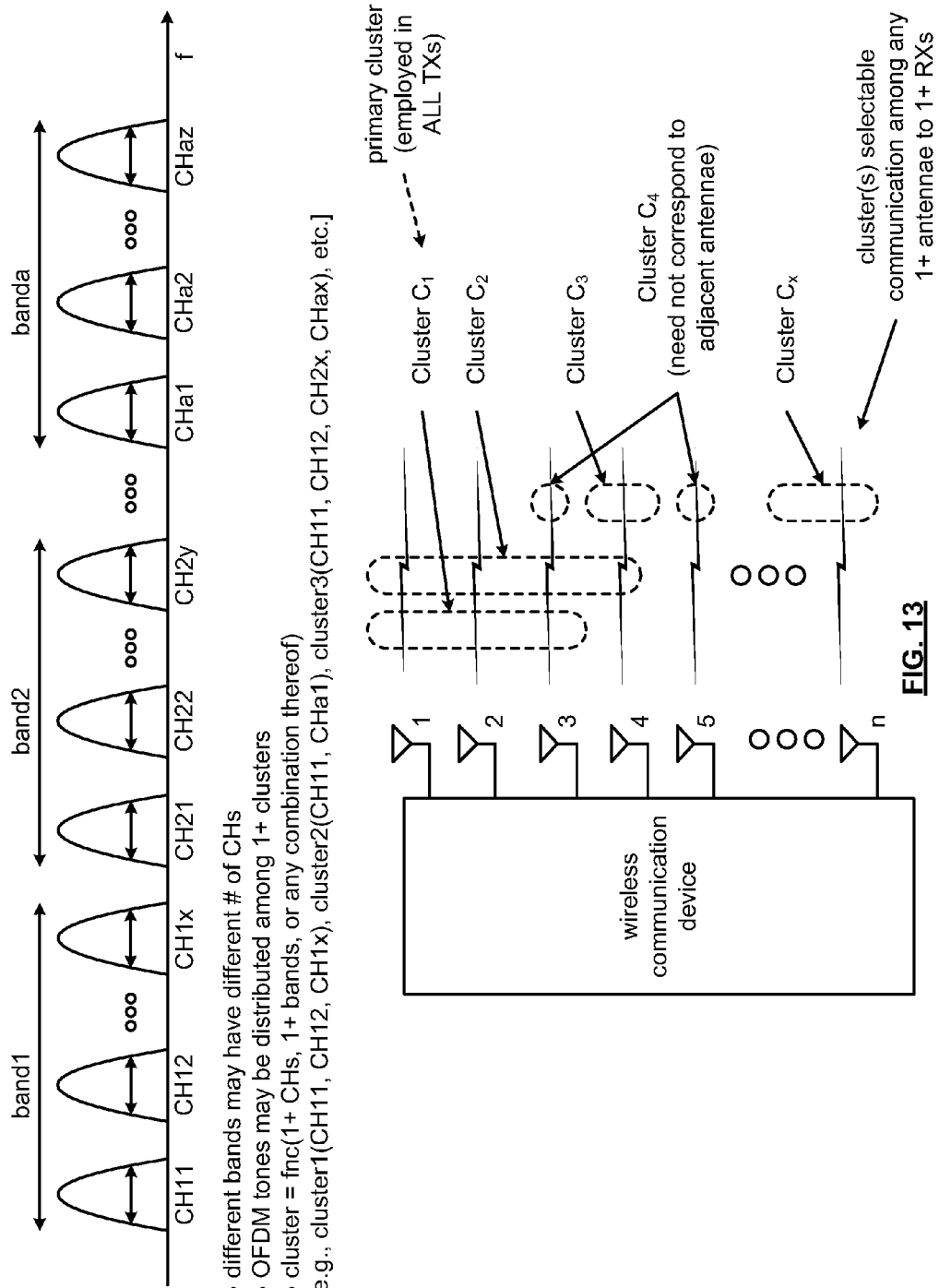
FIG. 13 is a diagram illustrating an embodiment of a wireless communication device, and clusters, as may be employed for supporting communications with at least one additional wireless communication device.

FIG. 13 is a diagram illustrating an embodiment of a wireless communication device, and clusters, as may be employed for supporting communications with at least one additional wireless communication device. Generally speaking, a cluster may be viewed as a depiction of the mapping of tones, such as for an OFDM symbol, within or among one or more channels (e.g., sub-divided portions of the spectrum) that may be situated in one or more bands (e.g., portions of the spectrum separated by relatively larger amounts). As an example, various channels of 20 MHz may be situated within or centered around a 5 GHz band. The channels within any such band may be continuous (e.g., adjacent to one another) or discontinuous (e.g., separated by some guard interval or band gap). Oftentimes, one or more channels may be situated within a given band, and different bands need not necessarily have a same number of channels therein. Again, a cluster may generally be understood as any combination one or more channels among one or more bands.

The wireless communication device of this diagram may be of any of the various types and/or equivalents described herein (e.g., AP, WLAN device, or other wireless communication device including, though not limited to, any of those depicted in FIG. 1, etc.). The wireless communication device includes multiple antennae from which one or more signals may be transmitted to one or more receiving wireless communication devices and/or received from one or more other wireless communication devices.

Such clusters may be used for transmissions of signals via various one or more selected antennae. For example, different clusters are shown as being used to transmit signals respectively using different one or more antennae.

Also, it is noted that, with respect to certain embodiments, general nomenclature may be employed wherein a transmitting wireless communication device (e.g., such as being an Access point (AP), or a wireless station (STA) operating as an 'AP' with respect to other STAs) initiates communications, and/or operates as a network controller type of wireless communication device, with respect to a number of other, receiving wireless communication devices (e.g., such as being STAs), and the receiving wireless communication devices (e.g., such as being STAs) responding to and cooperating with the transmitting wireless communication device in supporting such communications. Of course, while this general nomenclature of transmitting wireless communication device(s) and receiving wireless communication device(s) may be employed to differentiate the operations as performed by such different wireless communication devices within a communication system, all such wireless communication devices within such a communication system may of course support bi-directional communications to and from other wireless communication devices within the communication system. In other words, the various types of transmitting wireless communication device(s) and receiving wireless communication device(s) may all support bi-directional communications to and from other wireless communication devices within the communication system. Generally speaking, such capability, functionality, operations, etc. as described herein may be applied to any wireless communication device.

Various aspects and principles, and their equivalents, of the invention as presented herein may be adapted for use in various standards, protocols, and/or recommended practices (including those currently under development) such as those in accordance with IEEE 802.11x (e.g., where x is a, b, g, n, ac, ad, ae, af, ah, etc.).

For example, the IEEE 802.11ah is a new protocol/standard currently under development and is intended for long range and low rate applications operating in worldwide spectrum below 1 GHz. The available spectrum in each country differs and requires flexible design to accommodate different options. As such, modifications to the IEEE 802.11 standards, protocols, and/or recommended practices may be made to effectuate longer delay spread and lower data rate applications such as may be employed in accordance with the IEEE 802.11ah developing standard.

Herein, certain adaptation and/or modification may be made with respect to IEEE 802.11 ac standards, protocols, and/or recommended practices to provide efficient support for longer delay spread and lower data rate applications.

Figure 14:
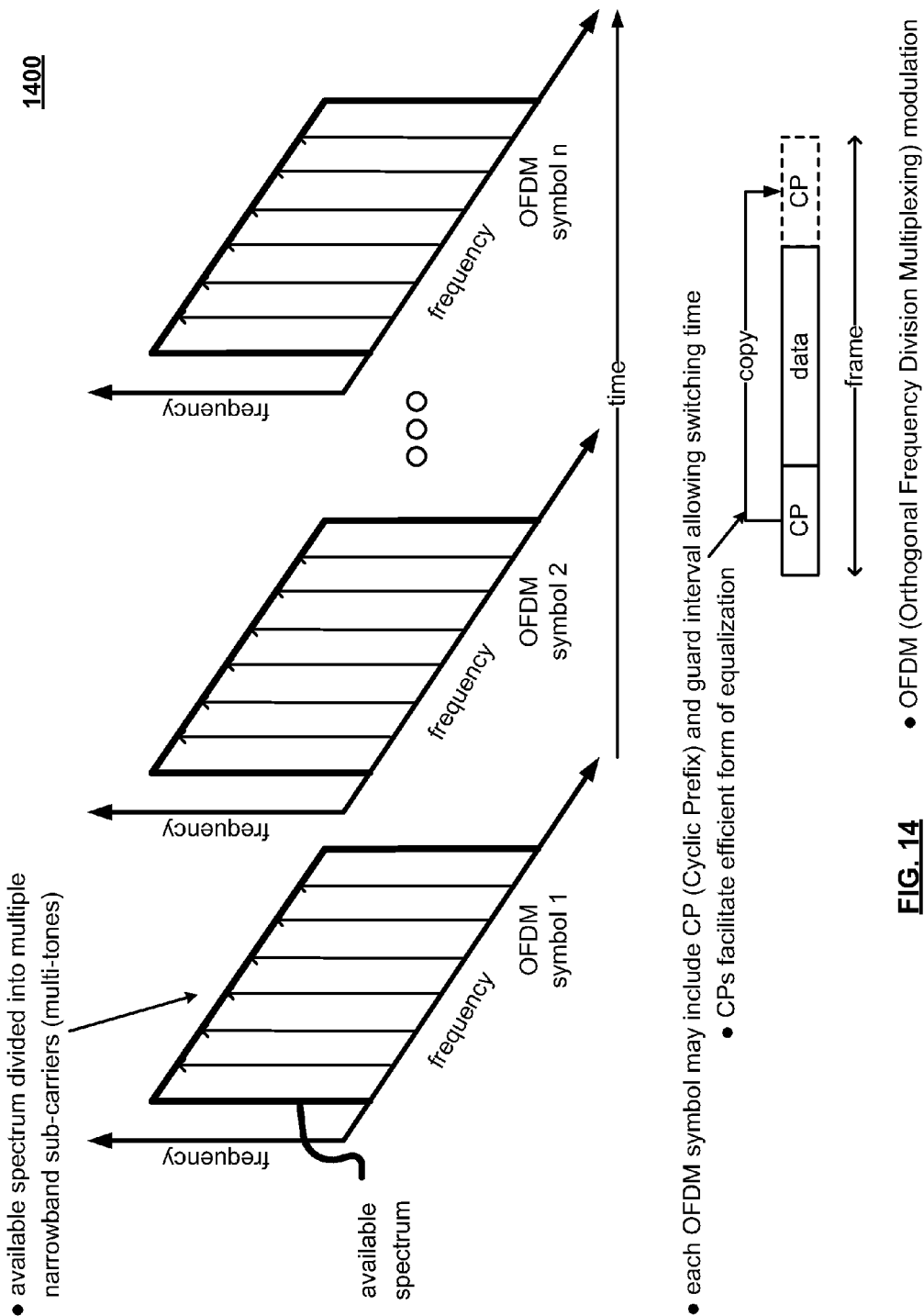
FIG. 14 illustrates an embodiment of OFDM (Orthogonal Frequency Division Multiplexing).

FIG. 14 illustrates an embodiment 1400 of OFDM (Orthogonal Frequency Division Multiplexing). OFDM modulation may be viewed a dividing up an available spectrum into a plurality of narrowband sub-carriers (e.g., lower data rate carriers). Typically, the frequency responses of these sub-carriers are overlapping and orthogonal. Each sub-carrier may be modulated using any of a variety of modulation coding techniques.

OFDM modulation operates by performing simultaneous transmission of a larger number of narrowband carriers (or multi-tones). Oftentimes a guard interval (GI) or guard space is also employed between the various OFDM symbols to try to minimize the effects of ISI (Inter-Symbol Interference) that may be caused by the effects of multi-path within the communication system (which can be particularly of concern in wireless communication systems). In addition, a CP (Cyclic Prefix) may also be employed within the guard interval to allow switching time (when jumping to a new band) and to help maintain orthogonality of the OFDM symbols.

Generally speaking, OFDM system design is based on the expected delay spread within the communication system (e.g., the expected delay spread of the communication channel). The references [1], [2] and [3] indicate delay spread in the order of several μsecs (e.g., in particular, ITU Ped B has maximum delay spread of 3.7 μsecs). Therefore, down clocking of the IEEE 802.11ac physical layer (PHY) by at least a factor of 8 is operative to generate a cyclic prefix (CP)=3.2 μsecs for the 1/8 option and 6.4 μsecs for the 1/4 option allowing for efficient support for most channels using 1/8 CP and support for extreme channels using 1/4 CP. For relatively short indoor channels, support for 1/32 CP is recommended to improve efficiency by 9% relative to 1/8 CP.

However, the available spectrum in the United States of America (USA) (26 MHz), Japan (8 MHz), Korea (6.5 MHz), and China (2/4/8/40 MHz) may be better utilized with 2 MHz channels. In certain embodiments presented herein, channels of bandwidth of 2 MHz are employed, as is described elsewhere herein.

Figure 15:
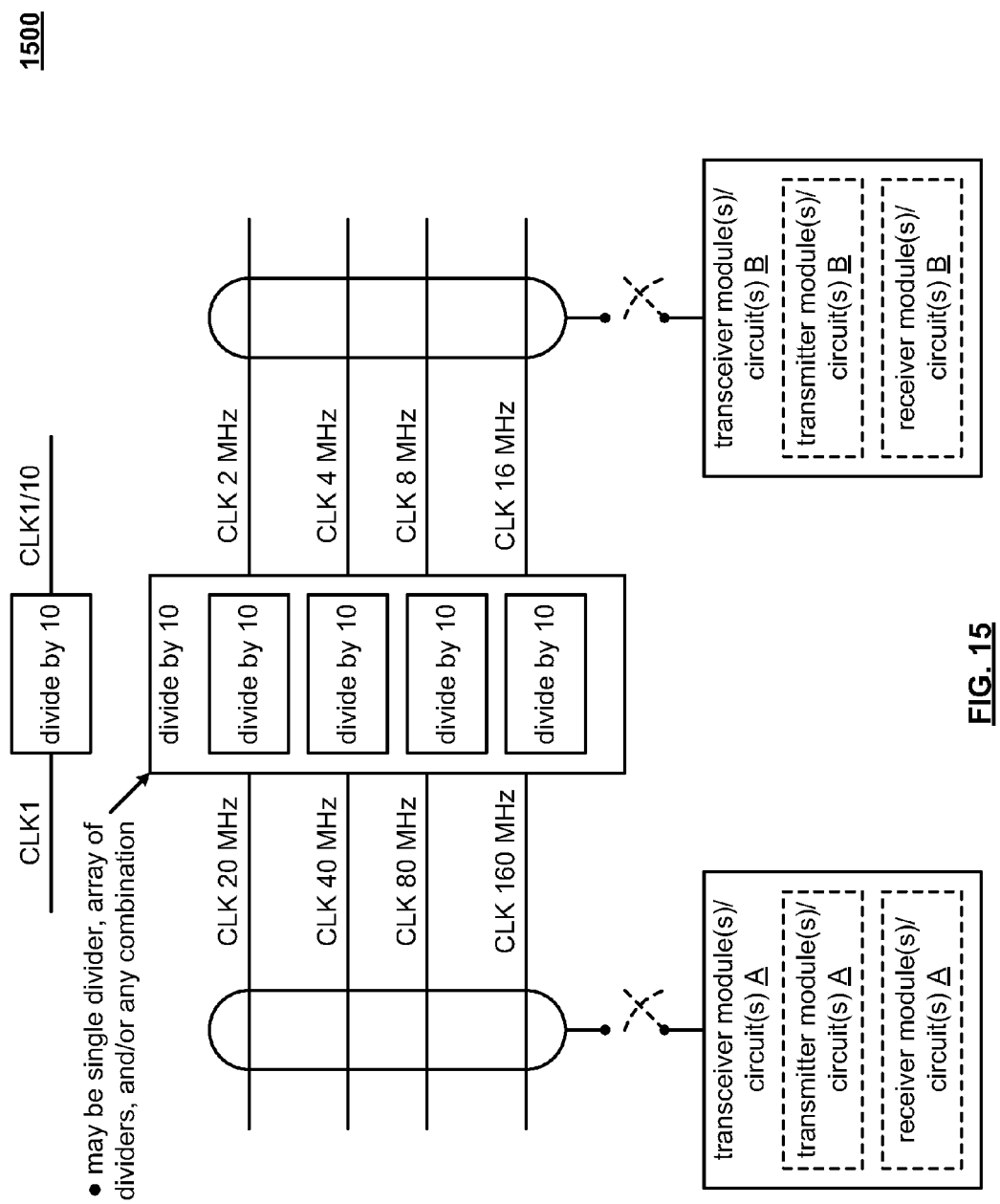
FIG. 15 illustrates an embodiment of down-clocking of signals for use by different respective transceiver sections within a communication device.

FIG. 15 illustrates an embodiment 1500 of down-clocking of signals for use by different respective transceiver sections within a communication device. In this embodiment, a single one down clocking ratio of 10 is operative to generate 2/4/8/16 MHz channels for proposed IEEE 802.11ah in all regions by co-opting the PHY definitions of IEEE 802.11ac (64/128/ 256/512 size fast Fourier transform (FFT)).

Such functionality is operative to support for operation using non-contiguous 8 MHz channels (e.g., 8+8) as well as 4 MHz or 2 MHz sub-channels thereof (e.g., sub-channels or common/uniform or non-uniform bandwidth within the respective channels). The use of frequency selective transmission may be employed to improve diversity of narrowband channels that may undesirably experience deleterious effects such as fading.

This is operative to provide for an adequate CP size of 4 μsecs for 1/8 while allowing for carrier frequency offset estimation of up to 62.5 kHz comfortably above 40 parts per million (ppm) in S1G frequencies.

With respect to channelization, this is operative to support thirteen, six and three 2/4/8 MHz non-overlapping channels respectively in the USA. Three 2 MHz channels may be employed in Korea.

This is operative to allow for 2 channels in the 863-868.6 MHz band in Europe. A slightly more optimized down-clocking by a factor of 11 would be operative to include 3 channels into that band. Currently, Japanese regulatory rules permit up to 1 MHz channels in Japan and this can be achieved by defining a new PHY with an FFT size 32.

As may be seen in the diagram, a first clock having a first frequency (e.g., CLK1) may be divided down by a factor of 10 to generate a second having a second frequency (e.g., CLK1/ 10). Generally, a first set of clock signals each having a respective and different first frequency may be divided down by a factor of 10 to generate a second set of clock signals each having a respective and different second frequency. For example, in one particular embodiment, a first set of clocks respectively having frequencies of 20 MHz, 40 MHz, 80 MHz, and 100 MHz may be divided down by a factor of 10 to generate a second set of clock signals respectively having frequencies of 2 MHz, 4 MHz, 8 MHz, and 10 MHz. The first set of clocks (e.g., 20 MHz, 40 MHz, 80 MHz, and 100 MHz) may be used to operate the PHY of a first one or more transceiver module/circuitry. The first set of clocks (e.g., 2 MHz, 4 MHz, 8 MHz, and 10 MHz) may be used to operate the PHY of a second one or more transceiver module/circuitry. Each of the respective clocks within the various sets may be selectively provided to different portions of the first/second one or more transceiver module/circuitry. That is to say, within the first/second set of clocks, the different clocks therein may be provided to different respective portions of the first/second one or more transceiver module/circuitry (e.g., 20 MHz to a first portion, 40 MHz to a second portion, etc.).

Figure 16:
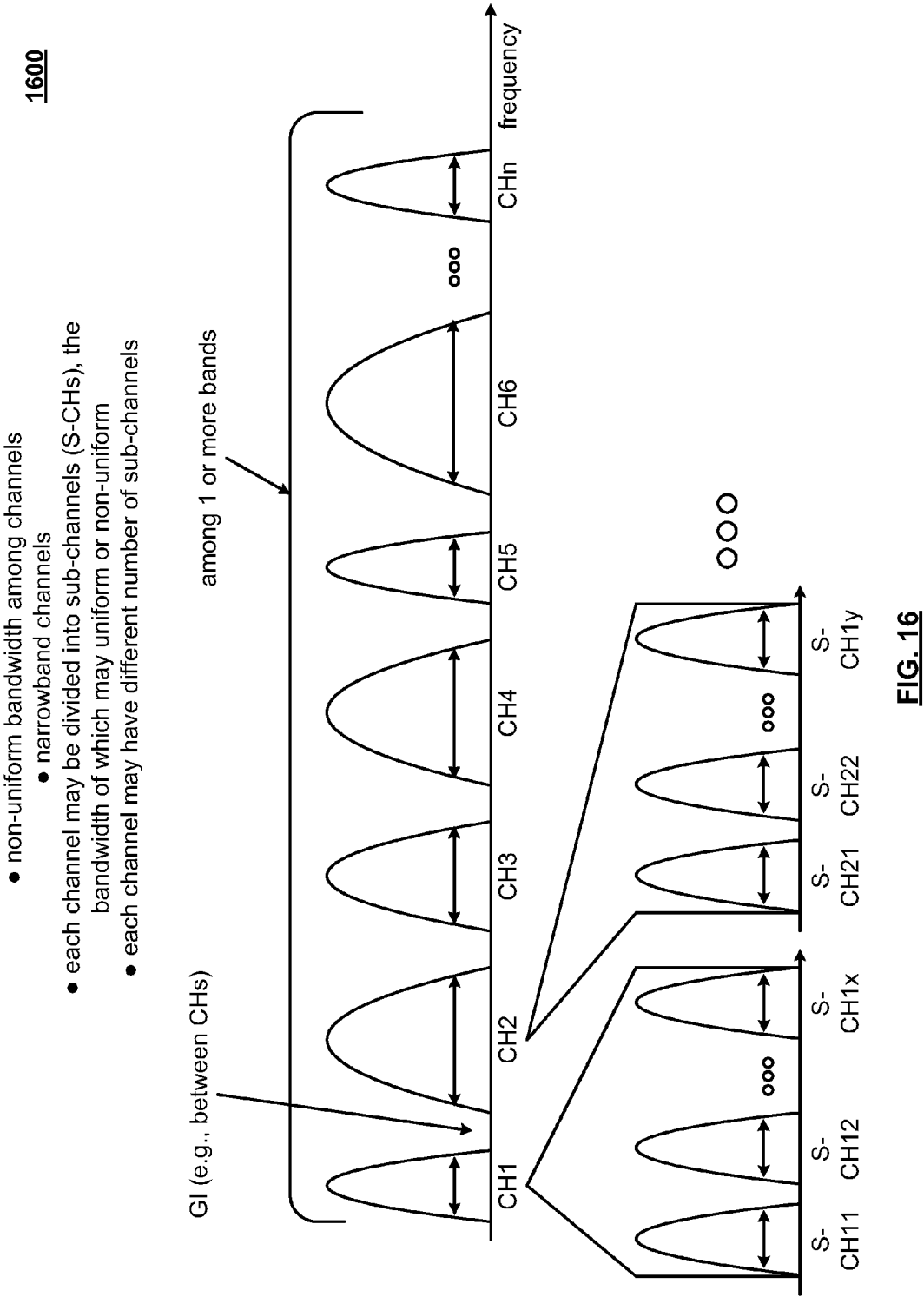
FIG. 16 illustrates an embodiment of bandwidth partitioning into various channels, which may be of different widths, and partitioning of channels into sub-channels.

FIG. 16 illustrates an embodiment 1600 of bandwidth partitioning into various channels, which may be of different widths, and partitioning of channels into sub-channels. This is operative to support for non-contiguous operation, in that, the respective bandwidths of the channels of a used spectrum portion may be non-uniform in spectral width. For example, this is operative to provide support for non-contiguous 8 MHz channels (e.g., using a total of 16 MHz bandwidth by using two respective 8 MHz channel, such as 8+8) such as in accordance with and adapted from IEEE 802.11 ac.

However, due to the narrow bandwidth operation proposed herein for IEEE 802.11ah, support for other combinations such as 8+2 (e.g., combination of an 8 MHz channel and a 2 MHz channel), 4+4 (e.g., combination of two 4 MHz channels), 2+2 (e.g., combination of two 2 MHz channels), 2+4 (e.g., combination of a 4 MHz channel and a 2 MHz channel), etc. is proposed herein as well to provide improved diversity to the narrowband channels and also to provide improve access to the channel by utilizing vacant narrowband channels across the spectrum.

In accordance with this, the encoding process can be done using either of the following two options: (1) one encoder spanning the two non-contiguous channels/bands (e.g., such as may be effectuated with respect to FIG. 19), or (2) employing a separate encoder for each sub-channel/band (e.g., such as may be effectuated with respect to FIG. 20 and FIG. 21).

The radio frequency (RF) front end (e.g., an analog front end (AFE)) can use either of the following two options: (2) one wideband front end covering the two non-contiguous bands and the spectrum in between. Filtering of the undesired band is done in the digital domain, or (2) two separate RF carriers each with its own filters matched to each sub-band or sub-channel.

The extension to 3 or more non-contiguous channels (and any combination thereof) can be done in an analogous manner.

Figure 17:
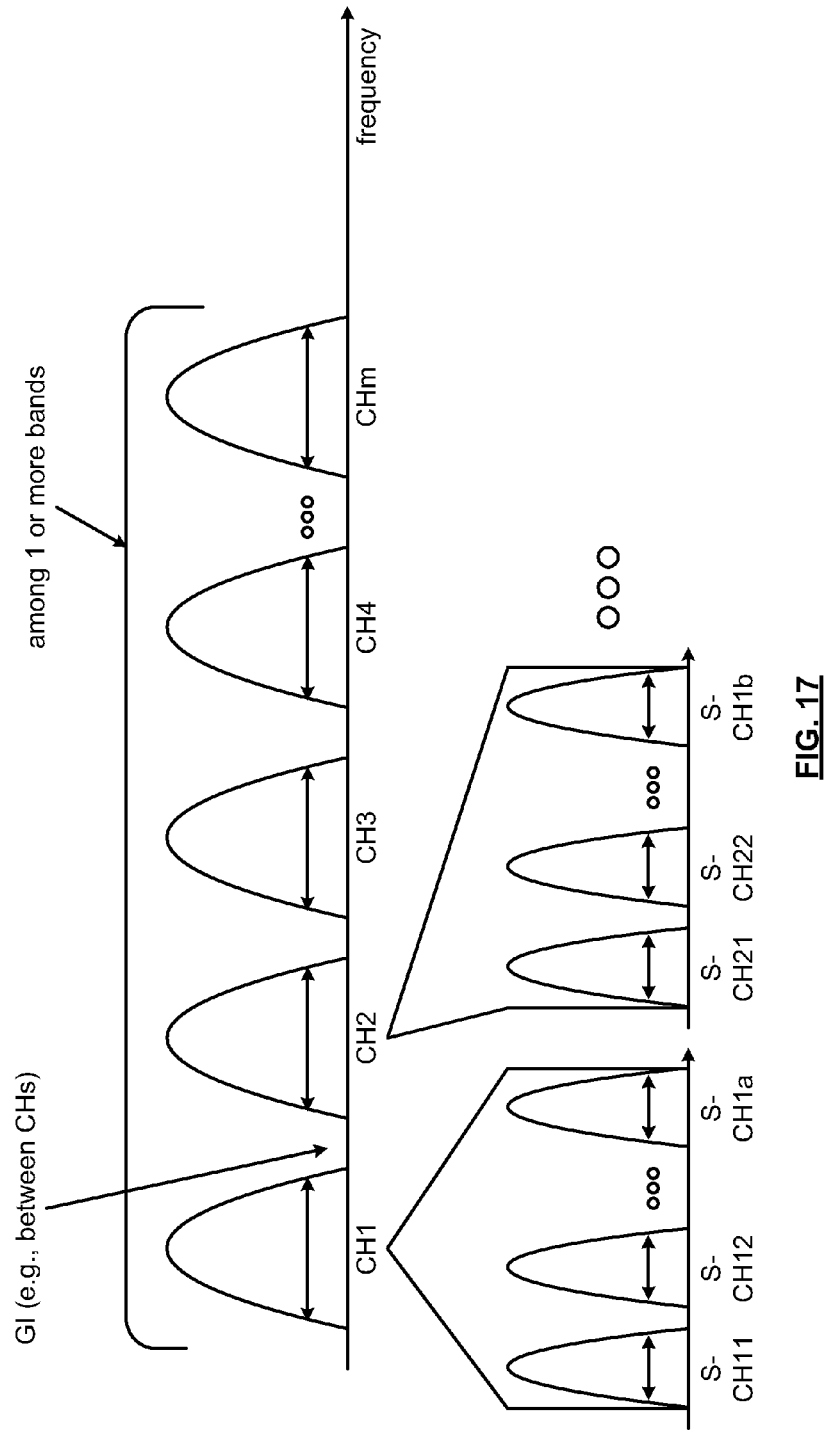
FIG. 17 illustrates an embodiment of bandwidth partitioning into various channels, which may be of common/uniform widths, and partitioning of channels into sub-channels.

FIG. 17 illustrates an embodiment 1700 of bandwidth partitioning into various channels, which may be of common/ uniform widths, and partitioning of channels into sub-channels. This is operative to support for non-contiguous operation, in that, the respective bandwidths of the channels of a used spectrum portion may be uniform in spectral width. For example, this is operative to provide support for non-contiguous channels of a common bandwidth (e.g., each being of 2 MHz, 4 MHz, 8 MHz, or some other common/ uniform width.

As within other embodiments, combinations of various bandwidth channels may also be effectuated (e.g., combination of 2, 3, or more channels) to provide improved diversity to the narrowband channels and also to provide improve access to the channel by utilizing vacant narrowband channels across the spectrum.

In accordance with this, the encoding process can be done using either of the following two options: (1) one encoder spanning the two non-contiguous channels/bands (e.g., such as may be effectuated with respect to FIG. 20), or (2) employing a separate encoder for each sub-channel/band (e.g., such as may be effectuated with respect to FIG. 21 and FIG. 22).

The radio frequency (RF) front end (e.g., an analog front end (AFE)) can use either of the following two options: (2) one wideband front end covering the two non-contiguous bands and the spectrum in between. Filtering of the undesired band is done in the digital domain, or (2) two separate RF carriers each with its own filters matched to each sub-band or sub-channel.

Of course, extension to any number of non-contiguous channels (and any combination thereof) can be done in an analogous manner.

Figure 18:
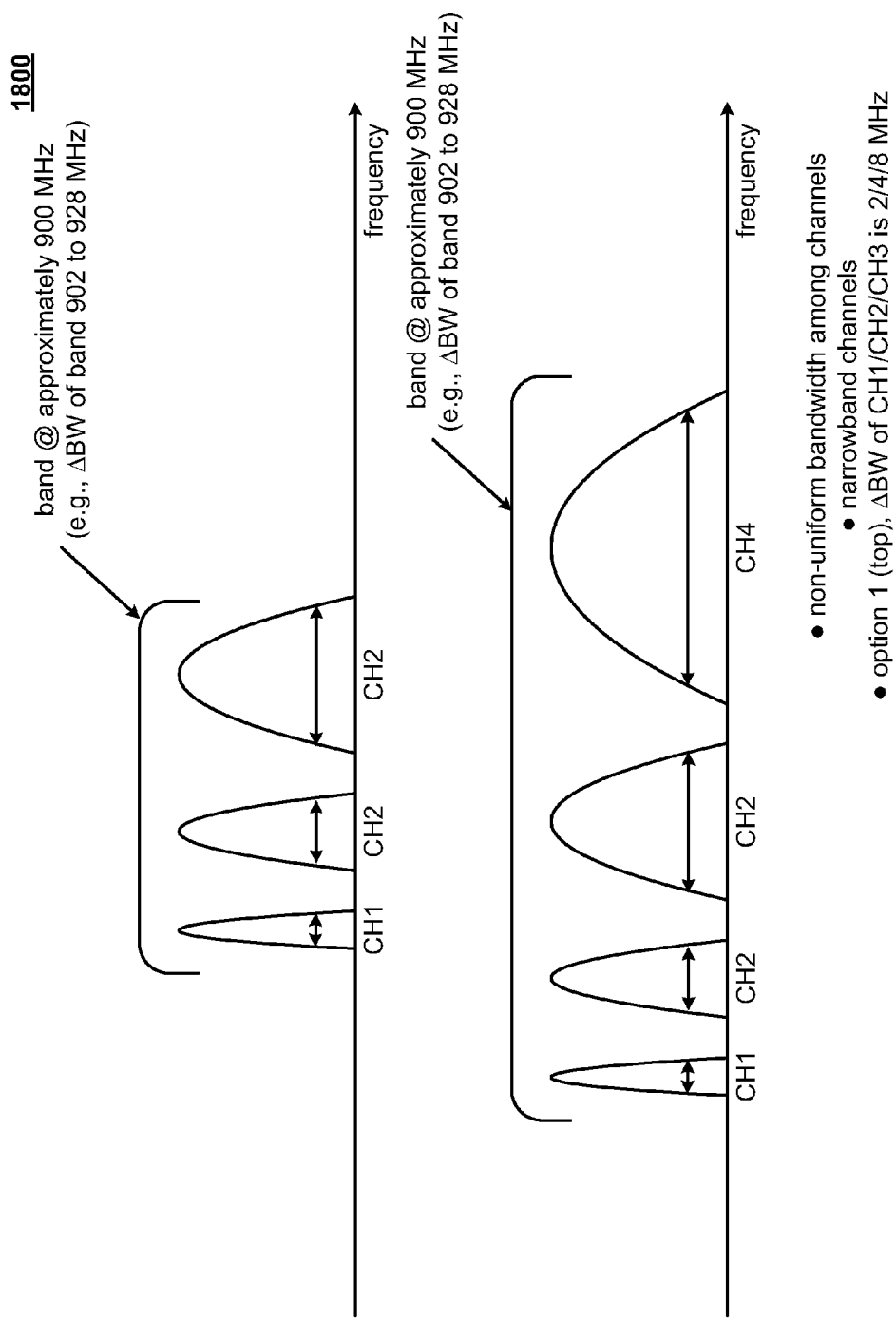
FIG. 18 illustrates an alternative embodiment of bandwidth partitioning into various channels.

FIG. 18 illustrates an alternative embodiment 1800 of bandwidth partitioning into various channels. This top of this diagram shows an embodiment in which the respective bandwidths of the channels of a used spectrum portion (e.g., ΔBW within the range of 902 to 928 MHz) are non-uniform in spectral width (e.g., being 2/4/8 MHz in the top embodiment).

This bottom of this diagram shows an embodiment in which the respective bandwidths of the channels of a used spectrum portion (e.g., ΔBW within the range of 902 to 928 MHz) are non-uniform in spectral width (e.g., being 2/4/8/16 MHz in the bottom embodiment).

Figure 19:
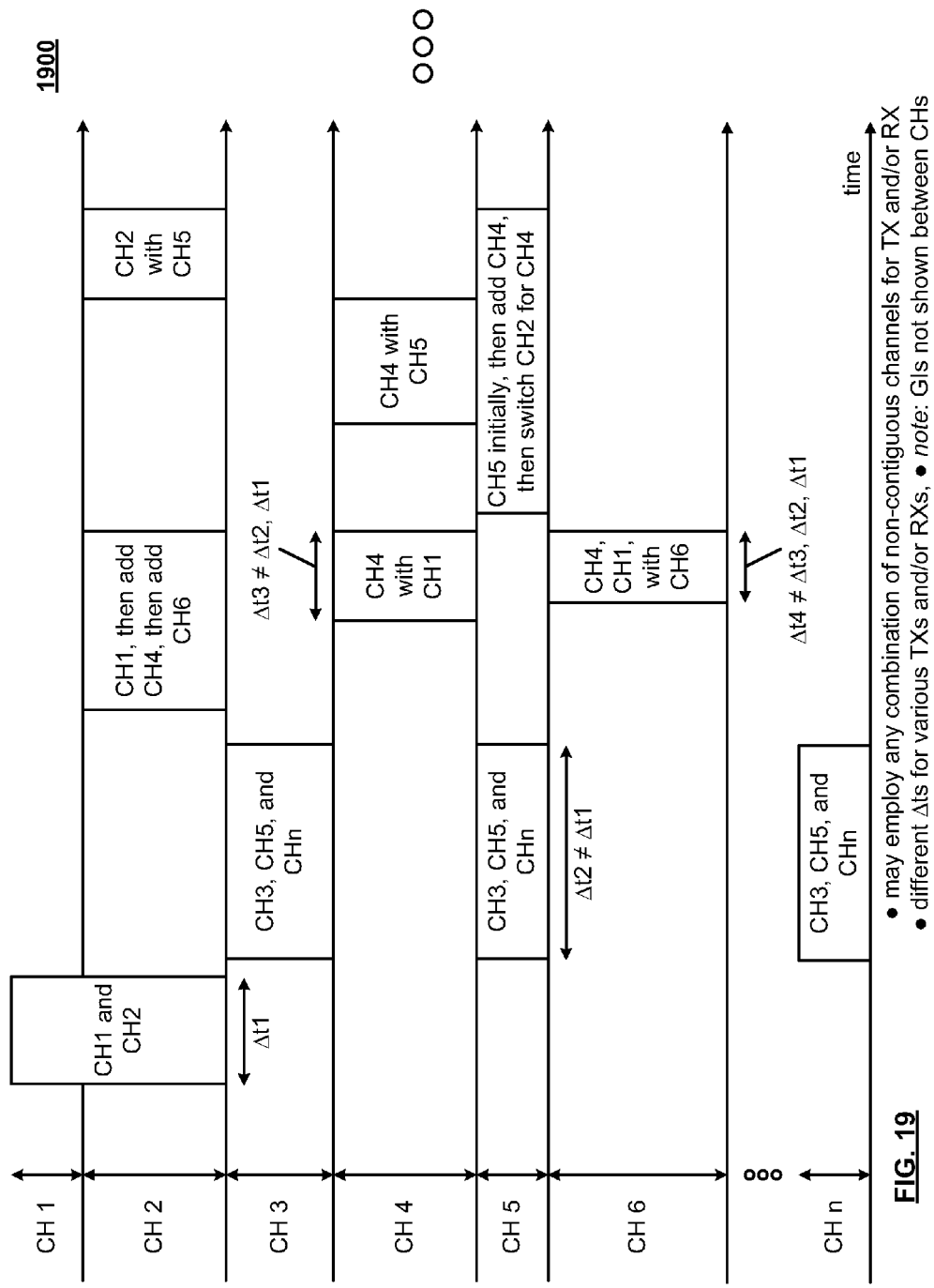
FIG. 19 illustrates an embodiment of bandwidth assignment among various channels for use in transmission and/or reception by various wireless communication devices.

FIG. 19 illustrates an embodiment 1900 of bandwidth assignment among various channels for use in transmission and/or reception by various wireless communication devices. As a function of time, it may be seen that the combination of channels used for transmission and/or reception may vary, and the respective duration of certain communications may vary in duration as well. In some embodiments, such channel assignment may be made by a transmitting wireless communication device (e.g., AP). such a transmitting wireless communication device (e.g., AP) may operate by transmitting some form of control, management, and/or other type of frame transmitting from the transmitting wireless communication device (e.g., AP) to a group or receiving wireless communication devices (e.g., STAs) so that all of the wireless communication devices within the communication system know the channel assignment.

As may be seen, proceeding along the time axis from left to right, a combination of two contiguous channels (e.g., CH1 and CH2) is firstly employed for communications; the duration in which these two contiguous channels are employed is Δt1. Next, a combination of three non-contiguous channels (e.g., CH3, CH5, and CHn) is employed for communications; the duration in which these three non-contiguous channels are employed is Δt2, which is different than t1.

Next, initial communications are performed using CH1, then CH4 is added to grow the channel allocation/assignment/reservation (e.g., in which a combination to two contiguous channels are employed, CH1 and CH4), and then CH6 is added to grow further the channel allocation/assignment/reservation (e.g., in which a combination of three contiguous channels are employed, CH1, CH4, and CH6).

As may be understood with respect to this diagram, any combination of channels may be employed for transmission and/or reception by various wireless communication devices during different respective time intervals (that may differ in terms of duration/length).

Figure 20:
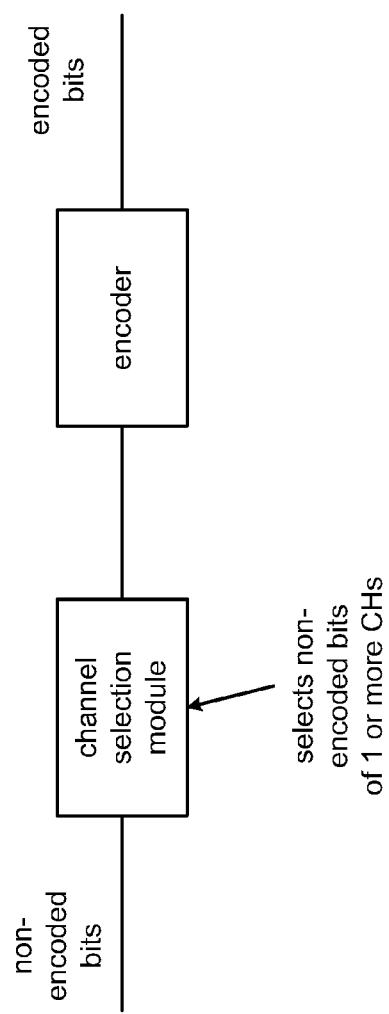
FIG. 20 illustrates an embodiment of a communication device in which bits corresponding respectively to different channels undergo encoding using a common encoder.

FIG. 20 illustrates an embodiment 2000 of a communication device in which bits corresponding respectively to different channels undergo encoding using a common encoder. This diagram shows how differently selected bits (e.g., non-encoded bits) corresponding to different channel combinations (e.g., a combination being any combination of any one or more channels) using a common encoder. However, the different selected bits (e.g., non-encoded bits) may undergo encoding at different times thereby generating different coded bit groups, which may be transmitted respectively at different times.

Figure 21:
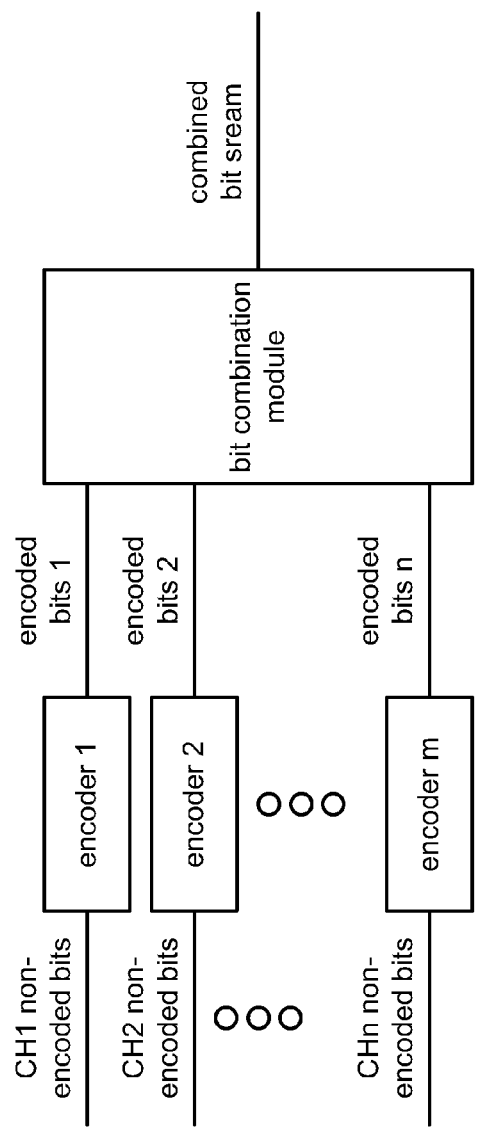
FIG. 21 illustrates an embodiment of a communication device in which bits corresponding respectively to different channels undergo encoding using different respective encoders.

FIG. 21 illustrates an embodiment 2100 of a communication device in which bits corresponding respectively to different channels undergo encoding using different respective encoders. In this embodiment, differently selected bits (e.g., non-encoded bits) corresponding to different channels are respectively provided to different respective encoders (e.g., encoder 1, encoder 2, and so on up to encoder n) thereby generating different coded bit groups (e.g., encoded bits 1, encoded bits 2, and so on up to encoded bits n). The various encoders (e.g., encoder 1, encoder 2, and so on up to encoder n) may each be operative to employ different respective codes (e.g., selected from among turbo, turbo trellis coded modulation (TTCM), LDPC (Low Density Parity Check), Reed-Solomon (RS), BCH (Bose and Ray-Chaudhuri), convolutional, and/or any combination thereof, etc.).

Thereafter, a bit combination module is operative to process the different coded bit groups (e.g., encoded bits 1, encoded bits 2, and so on up to encoded bits n) thereby generating a combined bit stream.

Figure 22:
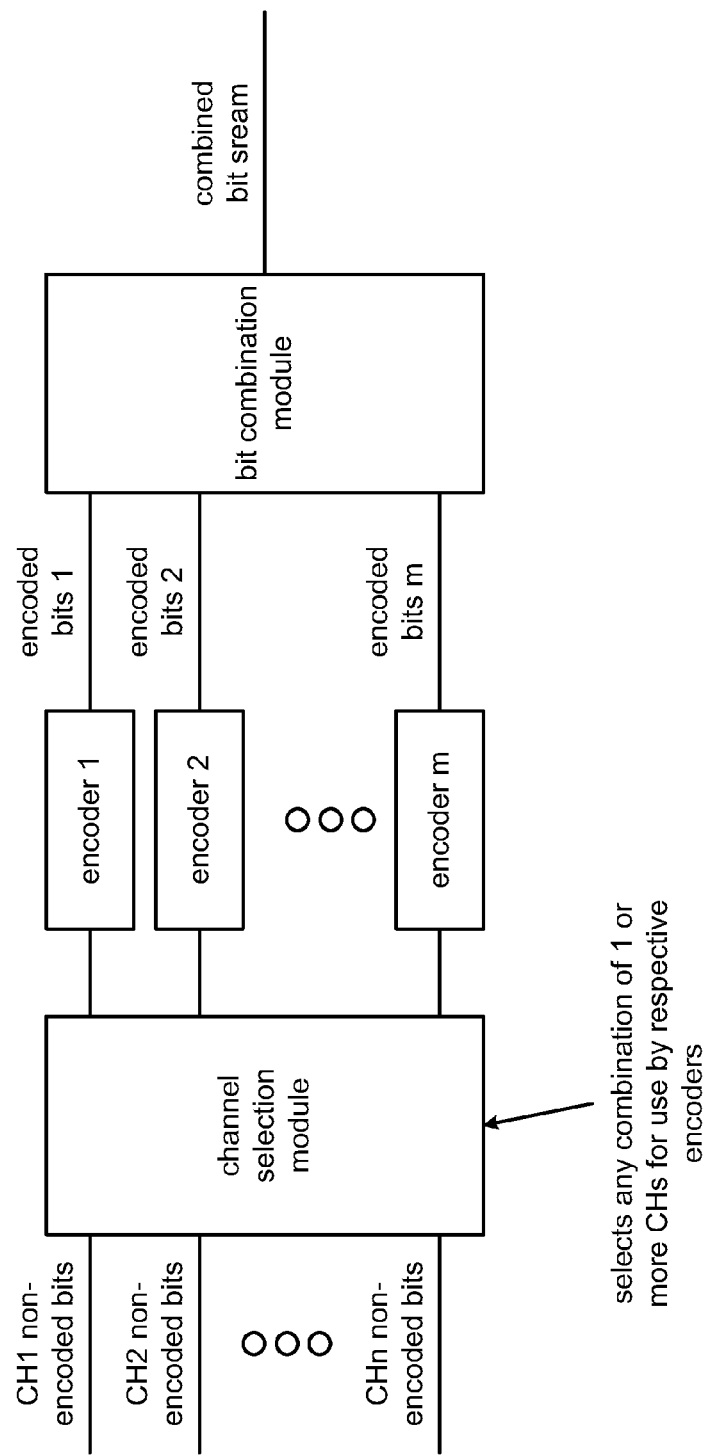
FIG. 22 illustrates an embodiment of a communication device in which any combinations of bits corresponding respectively to different channels undergo encoding using different respective encoders.

FIG. 22 illustrates an embodiment 2200 of a communication device in which any combinations of bits corresponding respectively to different channels undergo encoding using different respective encoders. In this embodiment, differently selected bits (e.g., non-encoded bits) corresponding to different channels are respectively provided to a channel selection module that is operative to select any combination of bits corresponding to any combination of one or more channels thereby generating respective groups of bits.

The respective groups of bits then undergo encoding within different respective encoders (e.g., encoder 1, encoder 2, and so on up to encoder n) thereby generating different coded bit groups (e.g., encoded bits 1, encoded bits 2, and so on up to encoded bits n). Thereafter, a bit combination module is operative to process the different coded bit groups (e.g., encoded bits 1, encoded bits 2, and so on up to encoded bits m) thereby generating a combined bit stream.

FIG. 23 is a diagram illustrating an embodiment 2300 of a wireless communication system in which communications are made between various wireless communication devices therein. Various mechanisms are described herein may be employed for selecting which sub-channels may be employed for respective communications between various wireless communication devices such as between various wireless communication devices within a multi-user (MU) environment.

In some instance, data transmissions may be targeted for reception by multiple individual receiving wireless communication devices (e.g., STAs). Such communications may be made successively (e.g., a first communication to a first receiving wireless communication device (e.g., STA1), a second communication to a second receiving wireless communication device (e.g., STA2), etc.).

Alternatively, such communications may be multi-user multiple input multiple output (MU-MIMO) and/or orthogonal frequency division multiple access (OFDMA) transmissions. In such an embodiment, the transmitter of such a frame may generally be referred to a multi-user transmitter (MU-TXer) such as a transmitting wireless communication device (e.g., AP or a STA). Each intended recipient of at least a portion of such a frame may generally be referred to a multi-user receiver (MU-RXer) such as a receiving wireless communication device (e.g., STA).

The multi-user packet may be any one or combination of data, channel sounding, control or management frames, etc. In one certain desired embodiment, the communications to the receiving wireless communication devices (e.g., STAs) includes sounding symbols.

In one embodiment, the intended MU-RXers of the MU-MIMO or OFDMA (or combination thereof) transmission need to respond to the reception of information with some form of response (often such as requested by the transmitting wireless communication device). Some examples of responses may include acknowledgements (ACK) or block acknowledgements (BAs). For example, some examples of acknowledgments (ACKs) may be either a single acknowledgement or a block acknowledgement. Various response schemes may be operated in accordance with various principles presented herein including slotted, polled, and scheduled response schemes.

A MU-TXer may employ MU-MIMO and/or OFDMA training exchanges (e.g., sounding symbols) to establish data transmission operational parameters (e.g., by using such sounding symbols for channel estimation, channel equalization, selection of which sub-channels for use in subsequent communications, etc.). These training exchanges (e.g., of sounding symbols) require the transmission of feedback from the receiving wireless communication devices (e.g., STAs). The feedback is sent as a response to MU-MIMO/OFDMA training. The feedback can be sent using any of various response schemes including slotted, polled, and scheduled feedback.

Mechanisms by which scheduling information may be conveyed from a transmitting wireless communication device (e.g., AP) to a number of receiving wireless communication devices (e.g., STAs) are presented herein.

For the scheduled response scheme, the MU-RXer response transmission is sent according to a schedule. For example, following a downlink (DL) MU-MIMO transmission, the MU-RXer STAs each respond in turn. That is to say, each receiving wireless communication device (e.g., STA) responds according to a particular schedule.

The following methodologies may be used to carry scheduled information to the receiving stations. A frame may be included with response schedule information in the DL MU-MIMO packet (schedule (SCH) frame). A multi-cast may be transmitted such that is that carries the response schedule information to the participating MU-RXer stations.

Response schedule information may be including within a modified format of the request to send (RTS) frame that precedes the DL MU-MIMO transmission and which becomes part of the complete sequence of frames in the exchange.

A schedule (SCH) frame may be used to carry the scheduled timing information. An individual SCH frame may be used for each MU MU-RXer, containing scheduling information specific for that MU-RXer. The SCH frame can be aggregated in an aggregated MAC data protocol unit (A-MPDU) for each MU-RXer. There may be a distinct SCH frame per MU-RXer. The SCH frame may be a new Control Type and Subtype frame containing the following fields: FC, DUR, RA, TA, 2-octet schedule information for this RA (so as to include a relative timing point from end of MU-DL PPDU).

Figure 24:
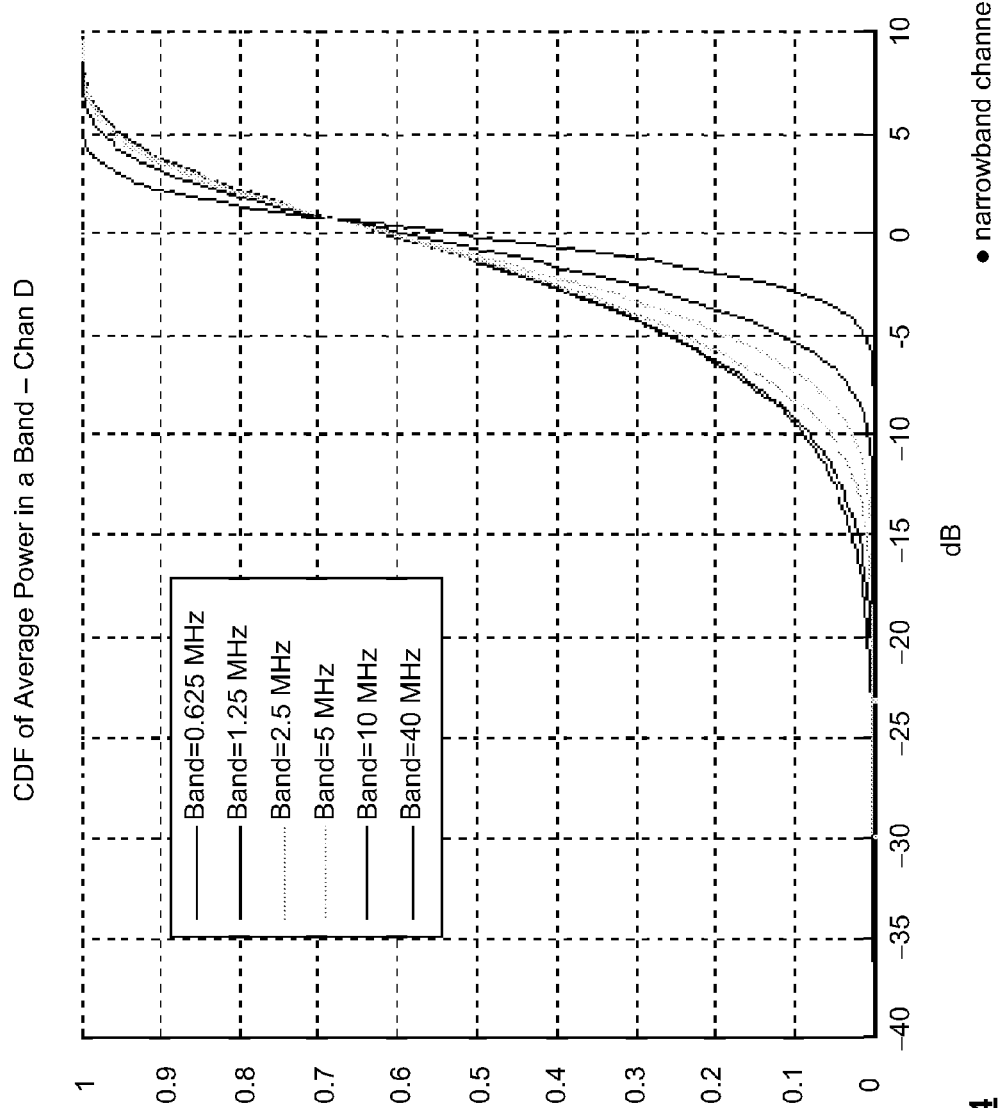
FIG. 24 is a diagram illustrating an embodiment of a cumulative distribution function (CDF) of average power in respective bands in accordance with communications performed at relatively low bandwidths and using relatively narrowband channels.

FIG. 24 is a diagram illustrating an embodiment of a cumulative distribution function (CDF) of average power in respective bands in accordance with communications performed at relatively low bandwidths and using relatively narrowband channels.

From certain perspectives, certain consideration may be made with respect to operation in accordance with narrowband channels. For example, while the use of relatively lower bandwidth is proposed herein (e.g., in accordance with the IEEE 802.11ah developing standard) to improve link budget or enable efficient transmission of very short messages, the use of such relatively lower bandwidth may present some challenges for a transmitting wireless communication device (e.g., AP) to operate solely on narrow channels as this diagram shows. As may be seen, the long tail of the CDF for operation in accordance with narrow bandwidth shows that huge losses in link budget may occur due to channel fading. Generally speaking, it may be preferable to use as wide of a bandwidth as possible in an effort to mitigate such deleterious effects.

Figure 25:
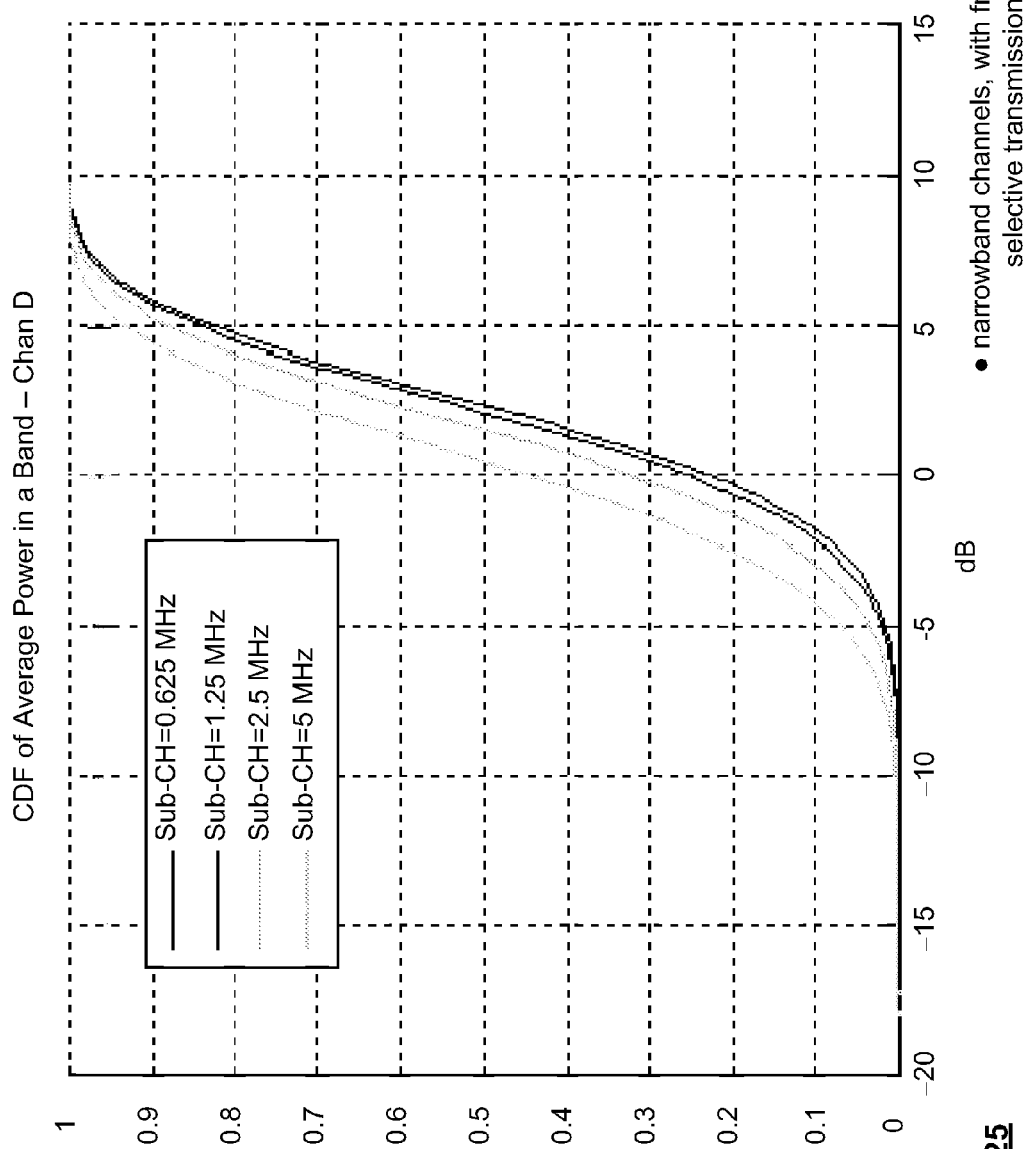
FIG. 25 is a diagram illustrating an embodiment of a CDF of average power in a respective bands in accordance with communications performed at relatively low bandwidths and using relatively narrowband channels, and specifically, in accordance with frequency selective transmissions.

FIG. 25 is a diagram illustrating an embodiment of a CDF of average power in a respective bands in accordance with communications performed at relatively low bandwidths and using relatively narrowband channels, and specifically, in accordance with frequency selective transmissions. As can be seen in accordance with performing transmissions using frequency selective transmission, the CDF of this diagram is generally reversed with respect to the previous diagram with the lowest bandwidth being the best performing. In this embodiment, a transmitting wireless communication device (e.g., AP) is operative to support communications using a 10 MHz channel, and the respective sub-channels therein are 0.625 MHz, 1.25 MHz, 2.5 MHz, and 5 MHz therein (e.g., the sub-channels within the channel being of non-uniform widths).

In various embodiments, one or both of a transmitting wireless communication device (e.g., AP) or the respective receiving wireless communication devices (e.g., STAs) are operative to select which sub-channel(s) may be employed for communications. In one embodiment, each respective receiving wireless communication device (e.g., STA) is operative to select its preferred channel or band as well as which sub-channel(s) therein may be used to effectuate communications. This selection information is then communicated back to the transmitting wireless communication device (e.g., AP) (directly or indirectly/implicitly [such as using those selected channel(s)/sub-channel(s) in a response]) so that the transmitting wireless communication device (e.g., AP) is apprised of which channel(s)/sub-channel(s) are to be employed for subsequent communications.

Of course, the channel(s)/sub-channel(s) selection may be dynamic and/or adaptive (e.g., changed over time, modified in response to any of a variety of events, detected parameter or changes thereof, etc.).

As can be seen in the diagram, there is no long tail and, on average, the power is higher by approximately 5 dB (for this particular channel) when compared to the previous diagram in which frequency selective transmission is not being made.

Figure 26:
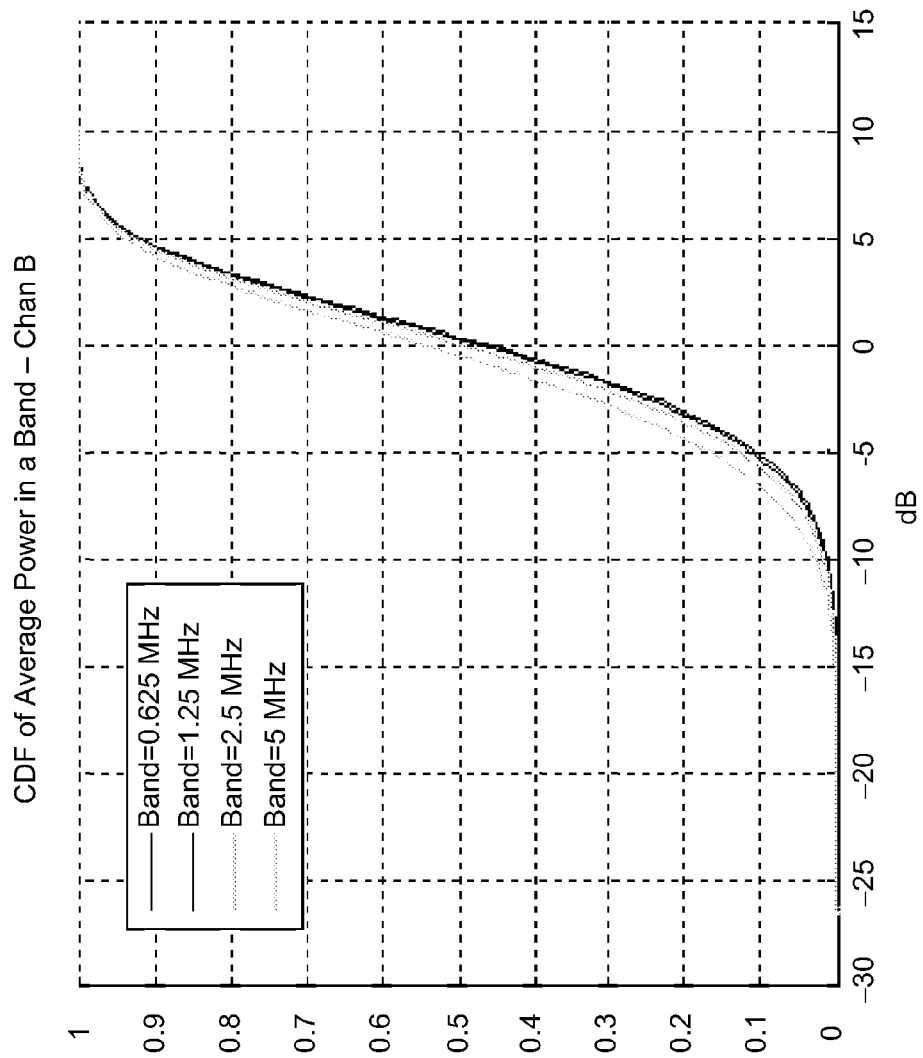
FIG. 26 is a diagram illustrating an embodiment of a CDF of average power in respective bands in accordance with communications performed at relatively low bandwidths and using relatively narrowband channels, and specifically, in accordance with a fading affecting channel.
Figure 27:
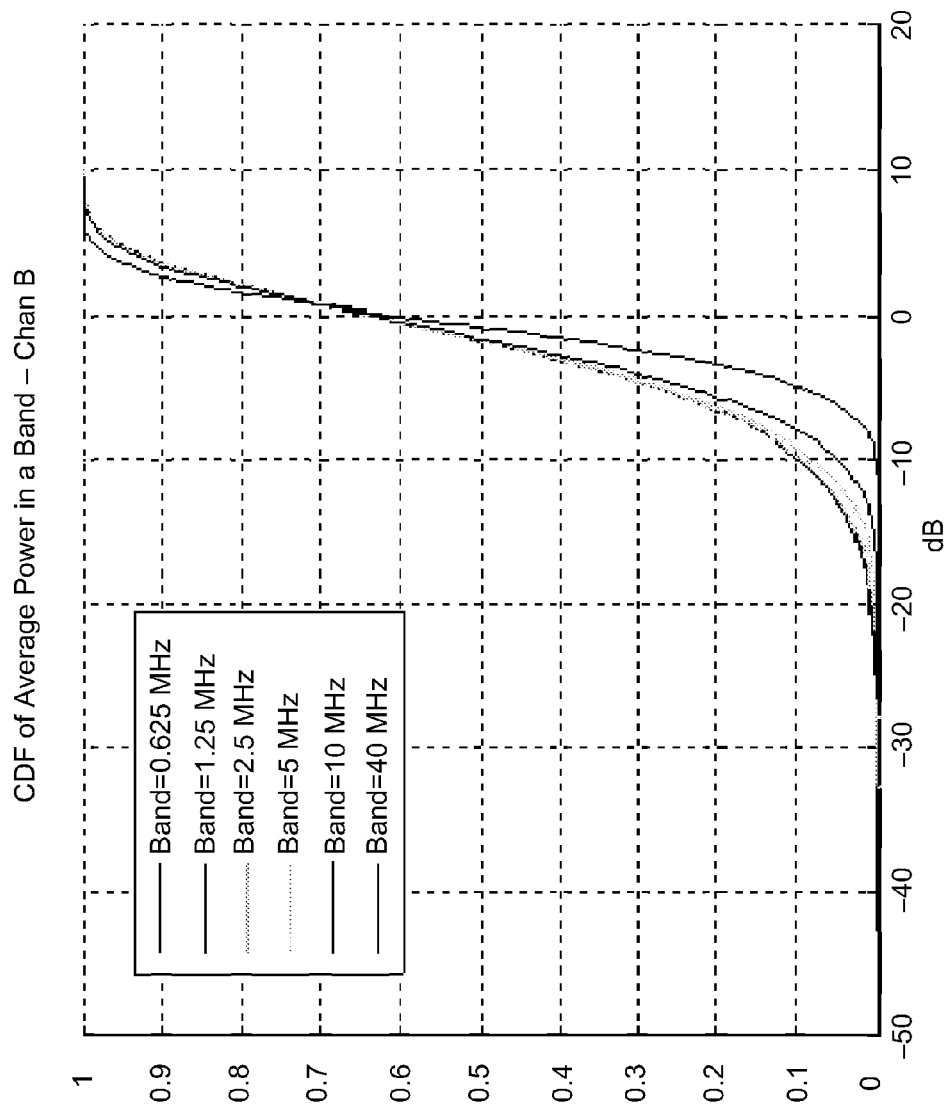
FIG. 27 is a diagram illustrating an alternative embodiment of a CDF of average power in respective bands in accordance with communications performed at relatively low bandwidths and using relatively narrowband channels, and specifically, in accordance with a fading affecting channel.

For shorter delay spread channels such as Channel B, the operation of narrowband channels is even more risky as frequency selective transmission in 10 MHz is not very helpful as shown in FIG. 26 and FIG. 27.

In this embodiment, it may be advantageous for a transmitting wireless communication device (e.g., AP) to use the non-contiguous option of using 2 or more channels (e.g., using 2 channels of 8 MHz bandwidth each, being 8+8; of course, if the available bandwidth allows such operation). Non-contiguous operation can be exploited to provide 4+4 or 2+2 operation to enable diversity in smaller bandwidth channels in even other embodiments.

Consideration operation in accordance with such frequency selective transmissions, each respective wireless communication device (e.g., in some situation, especially the transmitting wireless communication device (e.g., AP)) is operative to support as wide a bandwidth as possible. For example, in one embodiment, a minimum bandwidth of approximately 8 MHz could be supported (e.g., similar to the mandatory 20/40/80 MHz support in accordance with IEEE 802.11 ac).

As described elsewhere herein, the supported bandwidth may be made up of a set of selected sub-channels across one or more channels. A given wireless communication device is then operative to perform reception and/or transmission using any combination of sub-channels. It is also noted that the selected sub-channel(s) employed for reception need not necessarily be the same selected sub-channel(s) employed for transmission. For example, first selected sub-channel(s) may be employed for reception, and second selected sub-channel(s) may be employed for transmission. There may of course be one or more common selected sub-channels within each of the first and second selected sub-channel(s).

While one embodiment employs the channelization of 2/4/8 MHz, it is noted that such various aspects and principles, and their equivalents, of the invention also may be applied to any other channelization (e.g., the number and bandwidth of sub-channels, the dynamic assignment thereof, etc.). Generally speaking, such aspects and principles, and their equivalents, of the invention may be applied for optimal sub-channel selection regardless of the actual bandwidths of the various sub-channels themselves (e.g., which may be of uniform or non-uniform widths, etc.).

In some embodiments, sounding symbols are transmitted across a communication channel from a first wireless communication device to a second wireless communication device. For example, in one embodiment, such sounding symbols are transmitted from the transmitting wireless communication device (e.g., AP) to more than one receiving wireless communication devices (e.g., STAs). Such sounding symbols may be employed for performing channel estimation, channel characterization, channel equalization (e.g., compensation for any deleterious effects), etc.

Generally speaking, in one embodiment herein, sounding symbol(s) which are sent from a transmitting wireless communication device (e.g., AP) to a receiving wireless communication device (e.g., STA) may be used to select which sub-channel(s) on which to operate for subsequent communications. In one particular embodiment, it is a given receiving wireless communication device (e.g., STA) that is operative to estimate preferred sub-channel(s) on which to operate.

Sounding symbols may be transmitted on any subset of sub-channels (e.g., downstream) from a transmitting wireless communication device (e.g., AP) to a number of receiving wireless communication device (e.g., STA) in parallel with one another (e.g., simultaneously with respect to one another). Such sounding symbols send from a given receiving wireless communication device (e.g., STA) to the transmitting wireless communication device (e.g., AP) (e.g., upstream) may itself include indication of which sub-channels are being used for this sounding exchange. The greater the number of sub-channels that are being sounded, then the set of sub-channels to choose from will consequently be larger as well.

The sounding symbol itself can be a separate packet or part of another packet. The sounding symbol(s) may be wideband (e.g., covering all sub-channels in one sounding transmission), or the sounding symbol(s) may be narrowband (e.g., covering any subset of the sub-channels per sounding transmission), to enable reception for receiving wireless communication devices (e.g., STAs) requiring a relatively higher (or highest) link budget and to allow transmission opportunistically in environments with heavy traffic loads. In case of narrowband sounding, successive packets can cover the entire bandwidth.

In some embodiments, such sounding symbol(s) can be sent periodically by the transmitting wireless communication device (e.g., AP). The availability of, and periodicity of, periodic sounding may be announced in beacons or otherwise communicated to potential receiving wireless communication devices (e.g., STAs). Each subsequent sounding transmission can be sent on any subset of the sub-channels, including all of the sub-channels. Over time, the transmitter may send several transmissions using different subsets of the sub-channels, each being less than the entire set of sub-channels (e.g., in accordance with dynamic or adaptive operation), during which a given receiving wireless communication device (e.g., STA) can eventually receive sounding on all sub-channels. Each respective sounding transmission can be on a subset of the sub-channels that is independent of the preceding sounding transmissions sub-channels.

In certain embodiments, sounding symbols(s) can be sent in response to explicit requests (such as made by one of the receiving wireless communication devices (e.g., STAs)) instead of periodically. For example, such non-periodic operation may be made in accordance with the occurrence of a particular event or in accordance with certain parameters and/or changes thereof. Such non-periodic operation may be effectuated based on the channel conditions, the traffic on the channel, etc.

Also, sounding symbol(s) can be sent particularly based on a request from one or more of the receiving wireless communication devices (e.g., STAs). For example, a request from a given receiving wireless communication device (e.g., STA) may be sent on any sub-channel, or on the entire available bandwidth. Then, sounding symbols(s) can be sent immediately after the request is made.

A receiving wireless communication device (e.g., STA) can passively receive sounding that is transmitted to other receiving wireless communication devices (e.g., STAs) on any sub-channel. For example, a given receiving wireless communication device (e.g., STA) can employ a sounding that is transmitted for another intended receiving wireless communication device (e.g., STA). Then, the non-intended receiving wireless communication device (e.g., STA) can use this information to assist in the selection of the preferred sub-channel for communications between itself and the transmitting wireless communication device (e.g., AP).

Ideally, the widest bandwidth supported by the transmitting wireless communication device (e.g., AP) and all receiving wireless communication devices (e.g., STAs) for a sounding PPDU (PLCP (Physical Layer Convergence Procedure) Protocol Data Unit). The receiving wireless communication devices (e.g., STAs) can then receive sounding packets for any given sub-channel while receiving over the entire available bandwidth.

The sounding symbols can be addressed to all receiving wireless communication devices (e.g., STAs) or to a subset of the receiving wireless communication devices (e.g., STAs). For example, when sounding symbol(s) are addressed to all receiving wireless communication devices (e.g., STAs), then each respective receiving wireless communication device (e.g., STA) can choose to examine the sounding symbols and then can make a new sub-channel selection, or any given receiving wireless communication device (e.g., STA) can ignore the sounding.

Alternatively, when sounding symbol(s) are addressed to a sub-set of the receiving wireless communication devices (e.g., STAs), this can allow un-addressed receiving wireless communication devices (e.g., STAs) to save power by completely disregarding the sounding symbol transmission. For example, the sounding communication itself can include the transmitter address (TA) so that the various receiving wireless communication devices (e.g., STAs) know to which wireless communication device to respond (i.e., identifies the transmitting wireless communication device (e.g., AP) so that a given receiving wireless communication device (e.g., STA) knows to which wireless communication device it should respond).

As mentioned, one embodiment provides for a given receiving wireless communication device (e.g., STA) to identify which sub-channel is preferred. Also, a prioritized list may be made such that not only is the first (best) sub-channel combination (e.g., as few as one sub-channel or any combination of available sub-channels). For example, the first (best) sub-channel combination may be identified as well as a second (i.e., second best) sub-channel combination, a third (i.e., third best) sub-channel combination, etc.

In accordance with a manner of indirect/implicit sub-channel selection as may be made with respect to the actual sub-channel(s) used by a receiving wireless communication device (e.g., STA) in a communication made to a transmitting wireless communication device (e.g., AP). For example, a given receiving wireless communication device (e.g., STA) can use its preferred sub-channel(s) for an actual transmission, and those sub-channel(s) used indicate the actual preferred sub-channel(s) (i.e., the communication from the receiving wireless communication device (e.g., STA) to the transmitting wireless communication device (e.g., AP) is made using the preferred sub-channel(s)).

In accordance with such a means of indicating which sub-channel(s) are to be used for communications, there would no need to notify the sounding frame transmitting wireless communication device (e.g., AP) of the preferred sub-channel(s) as the preamble of that communication will occupy only those sub-channel(s) that are used. The sounding frame transmitting wireless communication device (e.g., AP) may be operative to ascertain a given receiving wireless communication device's (e.g., STA's) choice by observing transmissions sent by that particular receiving wireless communication device (e.g., STA). In some embodiments, a given receiving wireless communication device (e.g., STA) can also include the preferred choice of sub-channel(s) in data and management and control frames transmitted on another channel.

In addition, the transmission by the receiving wireless communication device (e.g., STA) can include a message specifying the second or more sub-channel(s) for operation with indication of level of preference for use per sub-channel.

In the case of narrowband sounding, if narrowband sounding was employed, then the receiving wireless communication device (e.g., STA) can wait until it hears all of them before selecting its preferred sub-channel(s) (and possibly including the second or more preferred sub-channel(s) combinations, etc). When narrowband sounding is used, a pre-sounding announcement frame may be implemented to include information as to how many narrowband sounding frames will be sent.

After performing the sounding, when a transmission opportunity arises, a given receiving wireless communication device (e.g., STA) may be operative to transmit its data frames on its preferred sub-channel(s). The sub-channel(s) employed for such a communication then communicates its respective choice of sub-channel(s) to the transmitting wireless communication device (e.g., AP). In an embodiment or situation in which a given receiving wireless communication device (e.g., STA) has no uplink data or response to be transmitted to the transmitting wireless communication device (e.g., AP), that given receiving wireless communication device (e.g., STA) mat transmit a NULL or control frame to the transmitting wireless communication device (e.g., AP) to communicate its preferred choice of sub-channel(s).

For fixed devices (e.g., non-mobile wireless communication devices), the optimum sub-channel(s) may not be expected to change quickly due to the low Doppler effect experienced by such static/non-mobile devices.

In embodiments in which no sounding symbol(s) are sent or to initiate transmission, a given receiving wireless communication device (e.g., STA) may also choose two non-contiguous sub-channels for transmission (e.g., to increase frequency diversity) or one wider bandwidth channel. In accordance with such operation, it is noted that the use of primary and secondary channels need not be performed (e.g., such as in accordance with IEEE 802.11 ac). In accordance with this new mode of operation (e.g., two non-contiguous sub-channels for transmission or one wider bandwidth channel), a given channel or sub-channel (e.g., such as being 2 MHz in bandwidth) may be viewed as being a self contained primary channel and can be used for transmission.

With respect to estimation of which preferred sub-channel(s) are to be employed for communications, as opposed to decoding of data, it is noted that a high signal to noise ratio (SNR) is not required since the approximate/rough average SNR estimate (e.g., single number calculated over a given bandwidth) may be sufficient for many applications. Therefore, even cell edge users or receiving wireless communication device (e.g., STA) that cannot decode the data can nonetheless accurately determine the preferred sub-channel(s). As an example, the average SNR for each sub-channel may be calculated. This may be done by averaging the SNR across all the sub-carriers (e.g., such as in an OFDM context) in that band and while each one of them is noisy, and then averaging reduces noise and is operative to produce a more accurate decision.

For multiple input multiple output (MIMO) configuration, the sounding may be done per transmit antenna such as in accordance with IEEE 802.11ac. In accordance with such per transmit antenna decision-making, a given receiving wireless communication device (e.g., STA) can use any metric (e.g., channel capacity or SNR, to decide on the preferred sub-channel(s) for MIMO communication systems.

Also, a given receiving wireless communication device (e.g., STA) can make estimates and choose preferred sub-channel(s) based on sounding that is received on any subset of the sub-channels (e.g., the receiving wireless communication device (e.g., STA) does not need to wait for reception of sounding on all sub-channels before making a selection of preferred sub-channel).

As additional sounding is received, the receiver can update/modify its preferred sub-channel(s) choice. For example, the preferred selection may be made based on current information. Alternatively, a receiving wireless communication device (e.g., STA) can update its preferred selection as new information is received and can communicate each intermediate selection as it makes each respective new selection.

As also mentioned elsewhere herein, a given receiving wireless communication device (e.g., STA) may communicate new preferred sub-channel(s) selection either explicitly or implicitly. Such preferred sub-channel(s) selection may be provided explicitly through a management frame transmission (or other type of communication) containing indication of a new preferred sub-channel(s) selection. Such preferred sub-channel(s) selection information can also be embedded in regular DATA transmission or control response transmission.

Alternatively, such preferred sub-channel(s) selection may be provided implicitly or indirectly through a frame transmission on the newly selected preferred sub-channel using any desired communication or frame (e.g., DATA, management, and/or control frame). A sounding transmitting wireless communication device (e.g., AP) may then assume that the sub-channel that was used by a given receiving wireless communication device (e.g., STA) for the transmission of the frame is the newly selected preferred sub-channel.

It is also noted that static and dynamic sub-channel use information may be employed by various wireless communication devices within a given basic services set (BSS). For example, clients (e.g., receiving wireless communication device (e.g., STA)) may need information regarding sub-channel use by their own BSS. Such client may receive information in one or more management frames sent by their respective transmitting wireless communication device (e.g., AP). This information may be operative to indicate which sub-channel(s) are being used by other clients in this same BSS. The transmitting wireless communication device (e.g., AP) knows which sub-channel(s) are being used by its respective clients and includes this information in sub-channel use management frames provided to the respective receiving wireless communication device (e.g., STA).

The respective clients may then be operative to examine information contained in a protected low-rate header of received frames (e.g., PHY header information, PHY header contains indication of BSS membership by the transmitting wireless communication device (e.g., AP), and/or PHY header contains an indication of whether BSS member is AP or client).

Information found in management frames and in PHY headers may be used by clients to assist in making sub-channel(s) selection.

This information can be used by a given receiving wireless communication device (e.g., STA) to assist in determining if a sub-channel that is in use is in use by a member of its BSS (e.g., a co-BSS STA). In such an embodiment, a receiving wireless communication device (e.g., STA) could firstly look for sub-channel(s) that are not already being used by a co-BSS STA.

FIG. 26 is a diagram illustrating an embodiment of a CDF of average power in respective bands in accordance with communications performed at relatively low bandwidths and using relatively narrowband channels, and specifically, in accordance with a fading affecting channel.

FIG. 27 is a diagram illustrating an alternative embodiment of a CDF of average power in respective bands in accordance with communications performed at relatively low bandwidths and using relatively narrowband channels, and specifically, in accordance with a fading affecting channel.

It is also noted that the various operations and functions as described with respect to various methods herein may be performed within a wireless communication device, such as using a baseband processing module implemented therein, (e.g., such as in accordance with the baseband processing module as described with reference to FIG. 2). For example, such a baseband processing module can perform such operations and/or any other operations and functions as described herein, etc. or their respective equivalents.

FIG. 28A, FIG. 28B, FIG. 29A, FIG. 29B, FIG. 30A, and FIG. 30B are diagrams illustrating embodiments of methods for operating one or more wireless communication devices.

Referring to method 2800 of FIG. 28A, the method 2800 begins by generating a plurality of sounding symbols for transmission to a plurality of wireless communication devices, as shown in a block 2810. In certain embodiments, the very same sounding symbols may be provided to multiple respective wireless communication devices. In other embodiments, different respective sounding symbols may be respectively provided to different respective wireless communication devices, such that they are selectively and separately provided to different respective wireless communication devices.

The method 2800 continues by transmitting at least one first signal including the plurality of sounding symbols to the plurality of communication devices, as shown in a block 2820. Within a wireless communication system context, at least one antenna of the communication device is employed for such transmission. Of course, there may be instances in which multiple antennae are implemented within a given wireless communication device, and different respective sounding symbols may be respectively provided from different antennae therein.

The method 2800 then operates by receiving at least one second signal from at least one of the plurality of wireless communication devices, as shown in a block 2830. Again, at least one antenna of the communication device is employed for receipt of such one or more signals. In some embodiments, the same one or more antennae employed for transmission of signals are employed for the receipt of signals; and other embodiments, different respective implemented antennae are respectively employed for transmission and receipt of signals.

Based on the at least one second signal (e.g., including one or more portions of information included therein), the method 2800 continues by adaptively determining at least one sub-channel with at least one channel for use at least one subsequent communication with the at least one of the plurality of wireless communication devices, as shown in a block 2840. It is noted that different respective sub-channels employed for communication need not necessarily be within the same respective channel. That is to say, different respective sub-channels from different respective channels may be employed for use in one or more subsequent communications.

Referring to method 2801 of FIG. 28B, the method 2801 begins by receiving a first signal wirelessly from a communication device, as shown in a block 2811.

The method 2801 then operates by processing the first signal to identify at least one sub-channel within at least one channel (e.g., implicitly or explicitly identified within the first signal) for use in at least one subsequent communication with the communication device, as shown in a block 2821.

The method 2801 continues by transmitting a second signal wirelessly to the communication device via the at least one sub-channel within the at least one channel, as shown in a block 2831. As may be understood with respect to this embodiment, a receiver communication device communicates information to a transmitter communication device that is used, at least in part, in the selection of at least one sub-channel within at least one channel for use in a subsequent communication from the transmitter communication device to the receiver communication device.

Referring to method 2900 of FIG. 29A, the method 2900 begins by receiving a first signal wirelessly from a communication device, as shown in a block 2910. The method 2900 continues by processing the first signal to identify a first at least one sub-channel within at least one channel (e.g., implicitly or explicitly identified within the first signal) system for use in at least one subsequent communication with the communication device, as shown in a block 2920. The method 2900 then operates by transmitting a second signal wirelessly to the communication device via the first at least one sub-channel within the at least one channel, as shown in a block 2930.

The method 2900 continues by receiving a third signal wirelessly from the communication device, as shown in a block 2940. The method 2900 then operates by processing the third signal to identify a second at least one sub-channel within at least one channel (e.g., implicitly or explicitly identified within the third signal) system for use in at least one subsequent communication with the communication device, as shown in a block 2950. The method 2900 continues by transmitting a fourth signal wirelessly to the communication device via the second at least one sub-channel within the at least one channel, as shown in a block 2960.

As may be understood with respect to this embodiment, different respective indication, adaptation, selection, etc. of different respective sub-channels and/or channels may be made at or during different respective times, such that communications between the various communication devices may adaptive based on at least communication and interaction between two or more respective communication devices.

Referring to method 2901 of FIG. 29B, the method 2901 begins by transmitting a first signal wirelessly to a first communication device via a first at least one sub-channel within at least one channel, as shown in a block 2911. The method 2901 then operates by transmitting a second signal wirelessly to a second communication device via a second at least one sub-channel within at least one channel, as shown in a block 2921.

As may be understood with respect to this embodiment, different respective signals may be transmitted wirelessly from a given transmitter communication device to different respective receiver communication devices via different respective sub-channels.

Generally speaking, transmission of more than a first signal and a second signal may be effectuated such that the method 2901 may be operative to continue by transmitting an n-th signal wirelessly to an n-th communication device via an n-th at least one sub-channel within at least one channel, as shown in a block 2931.

Referring to method 3000 of FIG. 30A, the method 3000 begins by receiving a first signal wirelessly from a communication device, as shown in a block 3010. The method 3000 continues by processing the first signal to identify sub-channels within at least one channel (e.g., implicitly or explicitly identified within the first signal) for use in at least one subsequent communication with the communication device, such that each sub-channel having a respective ranking, preference, etc. as shown in a block 3020. As may be understood with respect to this embodiment, multiple respective sub-channels are identified such that each respective sub-channel has a corresponding ranking, preference, etc. Generally speaking, such a list may be viewed as including not only a number of possible respective sub-channels that may be employed for communications, but also the relative desirability of them.

The method 3000 then operates by selecting one of the sub-channels based on the rankings, preferences, etc. indicated within the first signal and based on at least one local (and/or remote) operating condition, as shown in a block 3030. That is to say, selection of one of the sub-channels is based not only on information provided from the communication device from which the first signal is received, but also based upon at least one additional consideration.

The method 3000 continues by transmitting a second signal wirelessly to the communication device via a selected at least one of the sub-channels, as shown in a block 3040. It is noted that this selected at least one of the sub-channels need not necessarily be those having the highest rank, preference, etc. indicated within the first signal. That is to say, because the decision-making upon which respective one or more sub-channels are to be employed for communications being based upon more than one consideration, there may be instances in which one of the considerations is relatively weighted or valued relatively higher than another. Moreover, different decision-making may be made such that certain groups of considerations may relatively be weighted or valued higher than other groups of considerations.

Referring to method 3001 of FIG. 30B, the method 3001 begins by receiving a first at least one sounding symbol wirelessly from a communication device, as shown in a block 3011. Based on the first at least one sounding symbol, the method 3001 then operates by adaptively determining a first at least one sub-channel within at least one channel (e.g., which may be based upon rank(s), preference(s), etc.) for use at least one subsequent communication from the communication device, as shown in a block 3021. The method 3001 continues by informing the communication device of the first at least one sub-channel within the at least one channel, as shown in a block 3031. Based upon the communication device being informed of the first at least one sub-channel within the at least one channel, a subsequent received signal may be provided from that communication device via the first at least one sub-channel within at least one channel.

The method 3001 then operates by receiving a second at least one sounding symbol wirelessly from the communication device, as shown in a block 3041. Based on the second at least one sounding symbol, the method 3001 then operates by adaptively determining a second at least one sub-channel within at least one channel (e.g., which may be based upon rank(s), preference(s), etc.) for use at least one subsequent communication from the communication device, as shown in a block 3051.

The method 3001 continues by informing the communication device of the second at least one sub-channel within the at least one channel and/or the at least one additional channel, as shown in a block 3061. Analogously as described above with respect to at least one step, based upon the communication device being informed of the second at least one sub-channel within the at least one channel, a subsequent received signal may be provided from that communication device via the second at least one sub-channel within at least one channel.

It is also noted that the various operations and functions as described with respect to various methods herein may be performed within a wireless communication device, such as using a baseband processing module and/or a processing module implemented therein, (e.g., such as in accordance with the baseband processing module 64 and/or the processing module 50 as described with reference to FIG. 2) and/or other components therein. For example, such a baseband processing module can generate such signals and frames as described herein as well as perform various operations and analyses as described herein, or any other operations and functions as described herein, etc. or their respective equivalents.

In some embodiments, such a baseband processing module and/or a processing module (which may be implemented in the same device or separate devices) can perform such processing to generate signals for transmission using at least one of any number of radios and at least one of any number of antennae to another wireless communication device (e.g., which also may include at least one of any number of radios and at least one of any number of antennae) in accordance with various aspects of the invention, and/or any other operations and functions as described herein, etc. or their respective equivalents. In some embodiments, such processing is performed cooperatively by a processing module in a first device, and a baseband processing module within a second device. In other embodiments, such processing is performed wholly by a baseband processing module or a processing module.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As may also be used herein, the terms "processing module", "module", "processing circuit", and/or "processing unit" (e.g., including various modules and/or circuitries such as may be operative, implemented, and/or for encoding, for decoding, for baseband processing, etc.) may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may have an associated memory and/or an integrated memory element, which may be a single memory device, a plurality of memory devices, and/or embedded circuitry of the processing module, module, processing circuit, and/or processing unit. Such a memory device may be a read-only memory (ROM), random access memory (RAM), volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

The present invention has been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The present invention may have also been described, at least in part, in terms of one or more embodiments. An embodiment of the present invention is used herein to illustrate the present invention, an aspect thereof, a feature thereof, a concept thereof, and/or an example thereof. A physical embodiment of an apparatus, an article of manufacture, a machine, and/or of a process that embodies the present invention may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of the various embodiments of the present invention. A module includes a functional block that is implemented via hardware to perform one or module functions such as the processing of one or more input signals to produce one or more output signals. The hardware that implements the module may itself operate in conjunction software, and/or firmware. As used herein, a module may contain one or more sub-modules that themselves are modules.

While particular combinations of various functions and features of the present invention have been expressly described herein, other combinations of these features and functions are likewise possible. The present invention is not limited by the particular examples disclosed herein and expressly incorporates these other combinations.

Mode Selection Tables:

TABLE 1

2.4 GHz, 20/22 MHz channel BW, 54 Mbps max bit rate

| Rate | Modulation | Code Rate | NBPSC | NCBPS | NDBPS | EVM | Sensitivity | ACR | AACR |
|---|---|---|---|---|---|---|---|---|---|
| 1 | Barker BPSK | | | | | | | | |
| 2 | Barker QPSK | | | | | | | | |
| 5.5 | CCK | | | | | | | | |
| 6 | BPSK | 0.5 | 1 | 48 | 24 | −5 | −82 | 16 | 32 |
| 9 | BPSK | 0.75 | 1 | 48 | 36 | −8 | −81 | 15 | 31 |
| 11 | CCK | | | | | | | | |
| 12 | QPSK | 0.5 | 2 | 96 | 48 | −10 | −79 | 13 | 29 |
| 18 | QPSK | 0.75 | 2 | 96 | 72 | −13 | −77 | 11 | 27 |
| 24 | 16-QAM | 0.5 | 4 | 192 | 96 | −16 | −74 | 8 | 24 |
| 36 | 16-QAM | 0.75 | 4 | 192 | 144 | −19 | −70 | 4 | 20 |
| 48 | 64-QAM | 0.666 | 6 | 288 | 192 | −22 | −66 | 0 | 16 |
| 54 | 64-QAM | 0.75 | 6 | 288 | 216 | −25 | −65 | −1 | 15 |

TABLE 2

Channelization for Table 1

| Channel | Frequency (MHz) |
|---|---|
| 1 | 2412 |
| 2 | 2417 |
| 3 | 2422 |
| 4 | 2427 |
| 5 | 2432 |
| 6 | 2437 |
| 7 | 2442 |
| 8 | 2447 |
| 9 | 2452 |
| 10 | 2457 |
| 11 | 2462 |
| 12 | 2467 |

TABLE 3

Power Spectral Density (PSD) Mask for Table 1
PSD Mask 1

| Frequency Offset | dBr |
|---|---|
| −9 MHz to 9 MHz | 0 |
| +/−11 MHz | −20 |
| +/−20 MHz | −28 |
| +/−30 MHz and greater | −50 |

TABLE 4

5 GHz, 20 MHz channel BW, 54 Mbps max bit rate

| Rate | Modulation | Code Rate | NBPSC | NCBPS | NDBPS | EVM | Sensitivity | ACR | AACR |
|---|---|---|---|---|---|---|---|---|---|
| 6 | BPSK | 0.5 | 1 | 48 | 24 | −5 | −82 | 16 | 32 |
| 9 | BPSK | 0.75 | 1 | 48 | 36 | −8 | −81 | 15 | 31 |
| 12 | QPSK | 0.5 | 2 | 96 | 48 | −10 | −79 | 13 | 29 |
| 18 | QPSK | 0.75 | 2 | 96 | 72 | −13 | −77 | 11 | 27 |
| 24 | 16-QAM | 0.5 | 4 | 192 | 96 | −16 | −74 | 8 | 24 |
| 36 | 16-QAM | 0.75 | 4 | 192 | 144 | −19 | −70 | 4 | 20 |
| 48 | 64-QAM | 0.666 | 6 | 288 | 192 | −22 | −66 | 0 | 16 |
| 54 | 64-QAM | 0.75 | 6 | 288 | 216 | −25 | −65 | −1 | 15 |

TABLE 5

Channelization for Table 4

| Channel | Frequency (MHz) | Country | Channel | Frequency (MHz) | Country |
|---|---|---|---|---|---|
| 240 | 4920 | Japan | | | |
| 244 | 4940 | Japan | | | |
| 248 | 4960 | Japan | | | |
| 252 | 4980 | Japan | | | |
| 8 | 5040 | Japan | | | |
| 12 | 5060 | Japan | | | |
| 16 | 5080 | Japan | | | |
| 36 | 5180 | USA/Europe | 34 | 5170 | Japan |
| 40 | 5200 | USA/Europe | 38 | 5190 | Japan |
| 44 | 5220 | USA/Europe | 42 | 5210 | Japan |
| 48 | 5240 | USA/Europe | 46 | 5230 | Japan |
| 52 | 5260 | USA/Europe | | | |
| 56 | 5280 | USA/Europe | | | |
| 60 | 5300 | USA/Europe | | | |
| 64 | 5320 | USA/Europe | | | |
| 100 | 5500 | USA/Europe | | | |
| 104 | 5520 | USA/Europe | | | |
| 108 | 5540 | USA/Europe | | | |
| 112 | 5560 | USA/Europe | | | |
| 116 | 5580 | USA/Europe | | | |
| 120 | 5600 | USA/Europe | | | |
| 124 | 5620 | USA/Europe | | | |
| 128 | 5640 | USA/Europe | | | |
| 132 | 5660 | USA/Europe | | | |
| 136 | 5680 | USA/Europe | | | |
| 140 | 5700 | USA/Europe | | | |
| 149 | 5745 | USA | | | |
| 153 | 5765 | USA | | | |
| 157 | 5785 | USA | | | |

TABLE 5-continued

Channelization for Table 4

| Channel | Frequency (MHz) | Country | Channel | Frequency (MHz) | Country |
|---|---|---|---|---|---|
| 161 | 5805 | USA | | | |
| 165 | 5825 | USA | | | |

TABLE 6

2.4 GHz, 20 MHz channel BW, 192 Mbps max bit rate

| Rate | TX Antennas | ST Code Rate | Modulation | Code Rate | NBPSC | NCBPS | NDBPS |
|---|---|---|---|---|---|---|---|
| 12 | 2 | 1 | BPSK | 0.5 | 1 | 48 | 24 |
| 24 | 2 | 1 | QPSK | 0.5 | 2 | 96 | 48 |
| 48 | 2 | 1 | 16-QAM | 0.5 | 4 | 192 | 96 |
| 96 | 2 | 1 | 64-QAM | 0.666 | 6 | 288 | 192 |
| 108 | 2 | 1 | 64-QAM | 0.75 | 6 | 288 | 216 |
| 18 | 3 | 1 | BPSK | 0.5 | 1 | 48 | 24 |
| 36 | 3 | 1 | QPSK | 0.5 | 2 | 96 | 48 |
| 72 | 3 | 1 | 16-QAM | 0.5 | 4 | 192 | 96 |
| 144 | 3 | 1 | 64-QAM | 0.666 | 6 | 288 | 192 |
| 162 | 3 | 1 | 64-QAM | 0.75 | 6 | 288 | 216 |
| 24 | 4 | 1 | BPSK | 0.5 | 1 | 48 | 24 |
| 48 | 4 | 1 | QPSK | 0.5 | 2 | 96 | 48 |
| 96 | 4 | 1 | 16-QAM | 0.5 | 4 | 192 | 96 |
| 192 | 4 | 1 | 64-QAM | 0.666 | 6 | 288 | 192 |
| 216 | 4 | 1 | 64-QAM | 0.75 | 6 | 288 | 216 |

TABLE 7

Channelization for Table 6

| Channel | Frequency (MHz) |
|---|---|
| 1 | 2412 |
| 2 | 2417 |
| 3 | 2422 |
| 4 | 2427 |
| 5 | 2432 |
| 6 | 2437 |
| 7 | 2442 |
| 8 | 2447 |
| 9 | 2452 |
| 10 | 2457 |
| 11 | 2462 |
| 12 | 2467 |

TABLE 8

5 GHz, 20 MHz channel BW, 192 Mbps max bit rate

| Rate | TX Antennas | ST Code Rate | Modulation | Code Rate | NBPSC | NCBPS | NDBPS |
|---|---|---|---|---|---|---|---|
| 12 | 2 | 1 | BPSK | 0.5 | 1 | 48 | 24 |
| 24 | 2 | 1 | QPSK | 0.5 | 2 | 96 | 48 |
| 48 | 2 | 1 | 16-QAM | 0.5 | 4 | 192 | 96 |
| 96 | 2 | 1 | 64-QAM | 0.666 | 6 | 288 | 192 |
| 108 | 2 | 1 | 64-QAM | 0.75 | 6 | 288 | 216 |
| 18 | 3 | 1 | BPSK | 0.5 | 1 | 48 | 24 |
| 36 | 3 | 1 | QPSK | 0.5 | 2 | 96 | 48 |
| 72 | 3 | 1 | 16-QAM | 0.5 | 4 | 192 | 96 |
| 144 | 3 | 1 | 64-QAM | 0.666 | 6 | 288 | 192 |
| 162 | 3 | 1 | 64-QAM | 0.75 | 6 | 288 | 216 |
| 24 | 4 | 1 | BPSK | 0.5 | 1 | 48 | 24 |
| 48 | 4 | 1 | QPSK | 0.5 | 2 | 96 | 48 |
| 96 | 4 | 1 | 16-QAM | 0.5 | 4 | 192 | 96 |
| 192 | 4 | 1 | 64-QAM | 0.666 | 6 | 288 | 192 |
| 216 | 4 | 1 | 64-QAM | 0.75 | 6 | 288 | 216 |

TABLE 9 channelization for Table 8

| Channel | Frequency (MHz) | Country | Channel | Frequency (MHz) | Country |
|---|---|---|---|---|---|
| 240 | 4920 | Japan | | | |
| 244 | 4940 | Japan | | | |
| 248 | 4960 | Japan | | | |
| 252 | 4980 | Japan | | | |
| 8 | 5040 | Japan | | | |
| 12 | 5060 | Japan | | | |
| 16 | 5080 | Japan | | | |
| 36 | 5180 | USA/Europe | 34 | 5170 | Japan |
| 40 | 5200 | USA/Europe | 38 | 5190 | Japan |
| 44 | 5220 | USA/Europe | 42 | 5210 | Japan |
| 48 | 5240 | USA/Europe | 46 | 5230 | Japan |
| 52 | 5260 | USA/Europe | | | |
| 56 | 5280 | USA/Europe | | | |
| 60 | 5300 | USA/Europe | | | |
| 64 | 5320 | USA/Europe | | | |
| 100 | 5500 | USA/Europe | | | |
| 104 | 5520 | USA/Europe | | | |
| 108 | 5540 | USA/Europe | | | |
| 112 | 5560 | USA/Europe | | | |
| 116 | 5580 | USA/Europe | | | |
| 120 | 5600 | USA/Europe | | | |
| 124 | 5620 | USA/Europe | | | |
| 128 | 5640 | USA/Europe | | | |
| 132 | 5660 | USA/Europe | | | |
| 136 | 5680 | USA/Europe | | | |
| 140 | 5700 | USA/Europe | | | |
| 149 | 5745 | USA | | | |
| 153 | 5765 | USA | | | |
| 157 | 5785 | USA | | | |
| 161 | 5805 | USA | | | |
| 165 | 5825 | USA | | | |

TABLE 10

5 GHz, with 40 MHz channels and max bit rate of 486 Mbps

| Rate | TX Antennas | ST Code Rate | Modulation | Code Rate | NBPSC |
|---|---|---|---|---|---|
| 13.5 Mbps | 1 | 1 | BPSK | 0.5 | 1 |
| 27 Mbps | 1 | 1 | QPSK | 0.5 | 2 |
| 54 Mbps | 1 | 1 | 16-QAM | 0.5 | 4 |
| 108 Mbps | 1 | 1 | 64-QAM | 0.666 | 6 |
| 121.5 Mbps | 1 | 1 | 64-QAM | 0.75 | 6 |
| 27 Mbps | 2 | 1 | BPSK | 0.5 | 1 |
| 54 Mbps | 2 | 1 | QPSK | 0.5 | 2 |
| 108 Mbps | 2 | 1 | 16-QAM | 0.5 | 4 |
| 216 Mbps | 2 | 1 | 64-QAM | 0.666 | 6 |
| 243 Mbps | 2 | 1 | 64-QAM | 0.75 | 6 |
| 40.5 Mbps | 3 | 1 | BPSK | 0.5 | 1 |
| 81 Mbps | 3 | 1 | QPSK | 0.5 | 2 |
| 162 Mbps | 3 | 1 | 16-QAM | 0.5 | 4 |
| 324 Mbps | 3 | 1 | 64-QAM | 0.666 | 6 |
| 365.5 Mbps | 3 | 1 | 64-QAM | 0.75 | 6 |
| 54 Mbps | 4 | 1 | BPSK | 0.5 | 1 |
| 108 Mbps | 4 | 1 | QPSK | 0.5 | 2 |
| 216 Mbps | 4 | 1 | 16-QAM | 0.5 | 4 |
| 432 Mbps | 4 | 1 | 64-QAM | 0.666 | 6 |
| 486 Mbps | 4 | 1 | 64-QAM | 0.75 | 6 |

TABLE 11

Power Spectral Density (PSD) mask for Table 10
PSD Mask 2

| Frequency Offset | dBr |
|---|---|
| −19 MHz to 19 MHz | 0 |
| +/−21 MHz | −20 |
| +/−30 MHz | −28 |
| +/−40 MHz and greater | −50 |

TABLE 12

Channelization for Table 10

| Channel | Frequency (MHz) | Country | Channel | Frequency (MHz) | County |
|---|---|---|---|---|---|
| 242 | 4930 | Japan | | | |
| 250 | 4970 | Japan | | | |
| 12 | 5060 | Japan | | | |
| 38 | 5190 | USA/Europe | 36 | 5180 | Japan |
| 46 | 5230 | USA/Europe | 44 | 5520 | Japan |
| 54 | 5270 | USA/Europe | | | |
| 62 | 5310 | USA/Europe | | | |
| 102 | 5510 | USA/Europe | | | |
| 110 | 5550 | USA/Europe | | | |
| 118 | 5590 | USA/Europe | | | |
| 126 | 5630 | USA/Europe | | | |
| 134 | 5670 | USA/Europe | | | |
| 151 | 5755 | USA | | | |
| 159 | 5795 | USA | | | |

REFERENCES

[1] 11-11-0251-00-00ah-outdoor-channel_models-for-802-11ah.ppt
[2] 11-11-0436-00-00ah-path-loss-and-delay-spread-models-for-11 ah.pptx
[3] 11-11-0444-00-00af-comments-for-phy.pptx

What is claimed is:

1. An access point (AP) comprising:
a communication interface configured to:
transmit at least one first signal including a plurality of sounding symbols to a plurality of wireless stations (STAs), wherein the plurality of sounding symbols indicate a subset of sub-channels within at least one channel being sounded; and
receive at least one second signal from at least one of the plurality of STAs via one or more sub-channels of the subset of sub-channels;
a processor configured to:
generate the plurality of sounding symbols;
adaptively determine at least one sub-channel from the one or more sub-channels of the subset of sub-channels within the at least one channel for use in at least one subsequent communication with the at least one of the plurality of STAs, wherein receipt of the at least one second signal via the at least one second signal indirectly or implicitly indicates the one or more sub-channels of the subset of sub-channels within the at least one channel being preferred by the at least one of the plurality of STAs over another one or more sub-channels of the subset of sub-channels within the at least one channel not used for receipt of the at least one second signal.

2. The AP of claim 1, wherein the at least one second signal also indicating a plurality of preference levels such that each of the plurality of preference levels corresponding to a respective one of the plurality of sub-channels or a respective one subset of the plurality of sub-channels.

3. The AP of claim 1, wherein the at least one sub-channel within at least one channel including a first sub-channel within a first channel and a second sub-channel within the first channel or within a second channel.

4. The AP of claim 1 further comprising:
the communication interface configured to:
transmit at least a third signal to the at least one of the plurality of STAs via the at least one sub-channel within the at least one channel at or during a first time; and
receive at least one fourth signal from the at least one of the plurality of STAs;
transmit at least a fifth signal to the at least one of the plurality of STAs via at least one additional sub-channel within the at least one channel or within the at least one additional channel at or during a second time; and
the processor configured adaptively configured to determine the at least one additional sub-channel within the at least one channel or at least one additional channel for use in at least one additional subsequent communication with the at least one of the plurality of STAs.

5. An apparatus comprising:
a communication interface configured to:
transmit at least one first signal including the plurality of sounding symbols to a plurality of wireless communication devices, wherein the plurality of sounding symbols indicate a subset of sub-channels within at least one channel being sounded; and
receive at least one second signal from at least one of the plurality of wireless communication devices via one or more sub-channels of the subset of sub-channels; and
a processor configured to:
generate the plurality of sounding symbols; and
select at least one sub-channel from the one or more sub-channels of the subset of sub-channels for use in at least one subsequent communication with the at least one of the plurality of wireless communication devices based on receipt of the at least one second signal via the one or more sub-channels that indicates the one or more sub-channels of the subset of sub-channels being preferred by the at least one of the plurality of wireless communication devices within the subset of sub-channels.

6. The apparatus of claim 5, wherein the at least one second signal from the at least one of the plurality of wireless communication devices indirectly or implicitly indicating the at least one sub-channel within the at least one channel for use in the at least one subsequent communication.

7. The apparatus of claim 5, wherein: the at least one second signal from the at least one of the plurality of wireless communication devices indirectly or implicitly indicating a plurality of sub-channels within the at least one channel, including the at least one sub-channel within the at least one channel, and also indicating a plurality of preference levels such that each of the plurality of preference levels corresponding to a respective one of the plurality of sub-channels or a respective one subset of the plurality of sub-channels.

8. The apparatus of claim 5, wherein:
the at least one channel is one of a plurality of channels; and
each of the plurality of channels has a common or uniform bandwidth.

9. The apparatus of claim 5, wherein:
the at least one channel is one of a plurality of channels;
a first of the plurality of channels has a first bandwidth; and
a second of the plurality of channels has a second bandwidth that is different than the first bandwidth.

10. The apparatus of claim 5, wherein the at least one sub-channel within at least one channel including a first sub-channel within a first channel and a second sub-channel within the first channel or within a second channel.

11. The apparatus of claim 5 further comprising:
the communication interface configured to receive at least one third signal from the at least one of the plurality of wireless communication devices; and
based on the at least one third signal, the processor adaptively configured to determine at least one additional sub-channel within the at least one channel or at least one additional channel for use in the at least one subsequent communication or at least one additional subsequent communication with the at least one of the plurality of wireless communication devices.

12. The apparatus of claim 5 further comprising:
the communication interface configured to:
  transmit at least a third signal to the at least one of the plurality of wireless communication devices via the at least one sub-channel within the at least one channel at or during a first time; and
  receive at least one fourth signal from the at least one of the plurality of wireless communication devices;
  transmit at least a fifth signal to the at least one of the plurality of wireless communication devices via the at least one additional sub-channel within the at least one channel or within the at least one additional channel at or during a second time; and
the processor configured adaptively configured to determine the at least one additional sub-channel within the at least one channel or at least one additional channel for use in at least one additional subsequent communication with the at least one of the plurality of wireless communication devices.

13. The apparatus of claim 5 further comprising:
an access point (AP), wherein the plurality of wireless communication devices include a plurality of wireless stations (STAs).

14. A method for execution by a first communication device, the method comprising:
generating a plurality of sounding symbols for transmission to a plurality of wireless communication devices, wherein the plurality of sounding symbols indicate a subset of sub-channels within at least one channel being sounded; and
via a communication interface of the communication device:
  transmitting at least one first signal including the plurality of sounding symbols to the plurality of wireless communication devices; and
  receiving at least one second signal from at least one of the plurality of wireless communication devices via one or more sub-channels of the subset of sub-channels; and
  selecting at least one sub-channel from the one or more sub-channels of the subset of sub-channels for use in at least one subsequent communication with the at least one of the plurality of wireless communication devices based on receipt of the at least one second signal via the one or more sub-channels that indicates the one or more sub-channels of the subset of sub-channels being preferred by the at least one of the plurality of wireless communication devices within the subset of sub-channels.

15. The method of claim 14, wherein the at least one second signal from the at least one of the plurality of wireless communication devices indirectly or implicitly indicating a plurality of sub-channels within the at least one channel, including the at least one sub-channel within the at least one channel, and also indicating a plurality of preference levels such that each of the plurality of preference levels corresponding to a respective one of the plurality of sub-channels or a respective one subset of the plurality of sub-channels.

16. The method of claim 14, wherein:
the at least one channel is one of a plurality of channels; and
each of the plurality of channels has a common or uniform bandwidth.

17. The method of claim 14, wherein:
the at least one channel is one of a plurality of channels;
a first of the plurality of channels has a first bandwidth; and
a second of the plurality of channels has a second bandwidth that is different than the first bandwidth.

18. The method of claim 14, wherein the at least one sub-channel within at least one channel including a first sub-channel within a first channel and a second sub-channel within the first channel or within a second channel.

19. The method of claim 14 further comprising:
via the communication interface of the communication device:
  transmitting at least a third signal to the at least one of the plurality of wireless communication devices via the at least one sub-channel within the at least one channel at or during a first time; and
  receiving at least one fourth signal from the at least one of the plurality of wireless communication devices;
based on the at least one fourth signal, adaptively determining at least one additional sub-channel within the at least one channel or at least one additional channel for use in at least one additional subsequent communication with the at least one of the plurality of wireless communication devices; and
via the communication interface of the communication device, transmitting at least a fifth signal to the at least one of the plurality of wireless communication devices via the at least one additional sub-channel within the at least one channel or within the at least one additional channel at or during a second time.

20. The method of claim 14, wherein the communication device is an access point (AP), and the at least one additional communication device is a wireless station (STA).

* * * * *